United States Patent
Nam et al.

(10) Patent No.: US 11,496,734 B2
(45) Date of Patent: Nov. 8, 2022

(54) CROSS COMPONENT FILTERING-BASED IMAGE CODING APPARATUS AND METHOD

(71) Applicant: LG Electronics Inc., Seoul (KR)

(72) Inventors: Junghak Nam, Seoul (KR); Jangwon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/683,039

(22) Filed: Feb. 28, 2022

(65) Prior Publication Data

US 2022/0201294 A1 Jun. 23, 2022

Related U.S. Application Data

(63) Continuation of application No. PCT/KR2020/011598, filed on Aug. 31, 2020.

(60) Provisional application No. 62/893,758, filed on Aug. 29, 2019.

(51) Int. Cl.
*H04N 19/00* (2014.01)
*H04N 19/117* (2014.01)
*H04N 19/80* (2014.01)
*H04N 19/169* (2014.01)
*H04N 19/132* (2014.01)
*H04N 19/186* (2014.01)
*H04N 19/46* (2014.01)

(52) U.S. Cl.
CPC ......... *H04N 19/117* (2014.11); *H04N 19/132* (2014.11); *H04N 19/186* (2014.11); *H04N 19/1883* (2014.11); *H04N 19/46* (2014.11); *H04N 19/80* (2014.11)

(58) Field of Classification Search
CPC .. H04N 19/117; H04N 19/132; H04N 19/186; H04N 19/1883; H04N 19/46; H04N 19/80
See application file for complete search history.

(56) References Cited

U.S. PATENT DOCUMENTS

2019/0052875 A1* 2/2019 Son ................... H04N 19/85
2019/0238845 A1* 8/2019 Zhang ............... H04N 19/182

FOREIGN PATENT DOCUMENTS

| KR | 20130050900 | 5/2013 |
| KR | 20130050902 | 5/2013 |
| KR | 20180034665 | 4/2018 |

OTHER PUBLICATIONS

Misra et al., "Cross-Component Adaptive Loop Filter for chroma," JVET-O0636_r1, Presented at Joint Video Experts Team (JVET) of ITU-T SG 16 WP 3 and ISO/IEC JTC 1/SC 29/WG 11, 15th Meeting: Gothenburg, SE, Jul. 3-12, 2019, 9 pages.

* cited by examiner

*Primary Examiner* — Zhihan Zhou
(74) *Attorney, Agent, or Firm* — Fish & Richardson P.C.

(57) ABSTRACT

According to one embodiment of the present document, a cross component adaptive loop filtering (CCALF) process may be performed. The CCALF process can enhance the filtering performance for chroma components and improve the subjective/objective image quality of a picture.

16 Claims, 18 Drawing Sheets

(a)                      (b)

CROSS COMPONENT FILTERING-BASED IMAGE CODING APPARATUS AND METHOD

CROSS-REFERENCE TO RELATED APPLICATIONS

Pursuant to 35 U.S.C. § 119(e), this application is a continuation of International Application No. PCT/KR2020/011598, with an international filing date of Aug. 31, 2020, which claims the benefit of U.S. Provisional Patent Application No. 62/893,758, filed on Aug. 29, 2019, the contents of which are hereby incorporated by reference herein in their entirety.

BACKGROUND OF THE DISCLOSURE

Field of the Disclosure

The present disclosure relates to a cross-component filtering-based image coding apparatus and method.

Related Art

Recently, demand for high-resolution, high-quality image/video such as 4K or 8K or higher ultra high definition (UHD) image/video has increased in various fields. As image/video data has high resolution and high quality, the amount of information or bits to be transmitted increases relative to the existing image/video data, and thus, transmitting image data using a medium such as an existing wired/wireless broadband line or an existing storage medium or storing image/video data using existing storage medium increase transmission cost and storage cost.

In addition, interest and demand for immersive media such as virtual reality (VR) and artificial reality (AR) content or holograms has recently increased and broadcasting for image/video is having characteristics different from reality images such as game images has increased.

Accordingly, a highly efficient image/video compression technology is required to effectively compress, transmit, store, and reproduce information of a high-resolution, high-quality image/video having various characteristics as described above.

In addition, there is a discussion for improving compression efficiency and improving subjective/objective visual quality according to the implementation of a cross component adaptive loop filtering (CCALF) process.

SUMMARY

The present disclosure provides a method and apparatus for increasing image/video coding efficiency.

The present disclosure also provides an efficient filtering application method and apparatus.

The present disclosure also provides an efficient ALF application method and apparatus.

The present disclosure also provides a filtering process of a reconstructed chroma samples which is performed based on reconstructed luma samples.

The present disclosure also provides filtered reconstructed chroma samples which are modified based on reconstructed luma samples.

According to the embodiment of the present disclosure, the information on whether CCALF is enabled in SPS may be signaled.

The present disclosure also provides information on values of cross-component filter coefficients which may be derived from ALF data (normal ALF data or CCALF data).

The present disclosure also provides identifier (ID) information of an APS including ALF data for deriving cross-component filter coefficients which may be signaled in a slice.

The present disclosure also provides information on a filter set index for CCALF which may be signaled in units of CTU (block).

According to an embodiment of the present document, a video/image decoding method performed by a decoding apparatus is provided.

According to an embodiment of the present document, a decoding apparatus for performing video/image decoding is provided.

According to an embodiment of the present document, a video/image encoding method performed by an encoding apparatus is provided.

According to an embodiment of the present document, an encoding apparatus for performing video/image encoding is provided.

According to one embodiment of the present document, there is provided a computer-readable digital storage medium in which encoded video/image information, generated according to the video/image encoding method disclosed in at least one of the embodiments of the present document, is stored.

According to an embodiment of the present document, there is provided a computer-readable digital storage medium in which encoded information or encoded video/image information, causing to perform the video/image decoding method disclosed in at least one of the embodiments of the present document by the decoding apparatus, is stored.

Advantageous Effects

According to an embodiment of the present disclosure, it is possible to increase overall image/video compression efficiency.

According to an embodiment of the present disclosure, it is possible to increase subjective/objective visual quality through efficient filtering.

According to an embodiment of the present disclosure, it is possible to efficiently perform an ALF process and improve filtering performance.

According to an embodiment of the present disclosure, it is possible to modify reconstructed chroma samples filtered based on reconstructed luma samples to improve picture quality and coding accuracy of a chroma component of a decoded picture.

According to an embodiment of the present disclosure, it is possible to efficiently perform a CCALF process.

According to an embodiment of the present disclosure, it is possible to efficiently signal ALF-related information.

According to an embodiment of the present disclosure, it is possible to efficiently signal CCALF-related information.

According to an embodiment of the present disclosure, it is possible to adaptively apply ALF and/or CCALF in units of pictures, slices, and/or coding blocks.

According to an embodiment of the present disclosure, when CCALF is used in an encoding and decoding method and apparatus for a still image or moving image, it is possible to improve filter coefficients for CCALF and an on/off transmission method in units of blocks or CTUs to increase coding efficiency.

DESCRIPTION OF EXEMPLARY EMBODIMENTS

Figure 1:
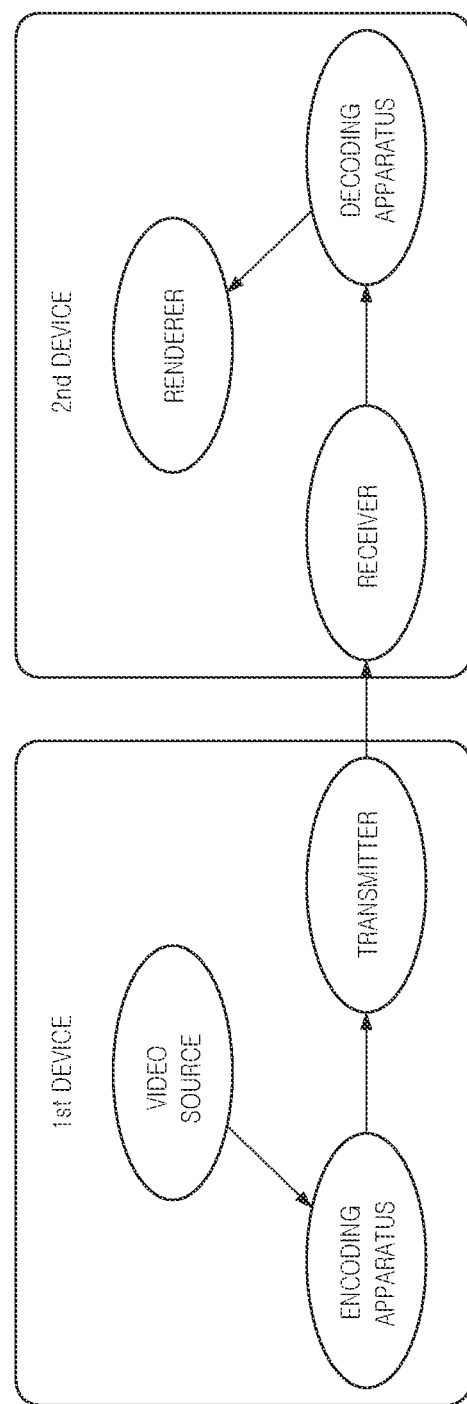
FIG. 1 schematically shows an example of a video/image coding system to which embodiments of the present disclosure may be applied.

Since the present disclosure may be variously modified and have several exemplary embodiments, specific exemplary embodiments will be illustrated in the accompanying drawings and be described in detail in a detailed description. However, this is not intended to limit the present disclosure to specific embodiments. The terms used in the present disclosure are only used to describe specific embodiments, and are not intended to limit the technical idea of the embodiments of the present disclosure. Singular forms are intended to include plural forms unless the context clearly indicates otherwise. It will be further understood that the terms "comprises" or "have" used in this specification, specify the presence of stated features, steps, operations, components, parts mentioned in this specification, or a combination thereof, but do not preclude the presence or addition of one or more other features, numerals, steps, operations, components, parts, or a combination thereof.

Meanwhile, each configuration in the drawings described in the present disclosure is illustrated independently for convenience of description regarding different characteristic functions, and does not mean that each configuration is implemented as separate hardware or separate software. For example, two or more components among each component may be combined to form one component, or one component may be divided into a plurality of components. Embodiments in which each configuration is integrated and/or separated are also included in the scope of the disclosure of the present disclosure.

This document relates to video/image coding. For example, a method/embodiment disclosed in this document may be applied to a method disclosed in a versatile video coding (VVC) standard. In addition, the method/embodiment disclosed in this document may be applied to a method disclosed in an essential video coding (EVC) standard, AOMedia Video 1 (AV1) standard, 2nd generation of audio video coding standard (AVS2), or a next-generation video/image coding standard (e.g., H.267, H.268, etc.).

Various embodiments related to video/image coding are presented in this document, and the embodiments may be combined with each other unless otherwise stated.

In this document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. A tile is a rectangular region of CTUs within a particular tile column and a particular tile row in a picture. The tile column is a rectangular region of CTUs having a height equal to the height of the picture and a width specified by syntax elements in the picture parameter setc. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture that may be exclusively contained in a single NAL unit Meanwhile, one picture may be divided into two or more subpictures. A subpicture may be an rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. Cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

In the present document, "A or B" may mean "only A", "only B" or "both A and B". In other words, "A or B" in the present document may be interpreted as "A and/or B". For example, in the present document, "A, B, or C" means "only A", "only B", "only C", or "any and any combination of A, B, and C".

A slash (/) or comma (comma) used in the present document may mean "and/or". For example, "A/B" may mean "and/or B". Accordingly, "A/B" may mean "only A", "only B", or "both A and B." For example, "A, B, C" may mean "A, B, or C".

In the present document, "at least one of A and B" may mean "only A", "only B", or "both A and B". Further, in the present document, the expression "at least one of A or B" or "at least one of A and/or B" may be interpreted the same as "at least one of A and B".

Further, in the present document, "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in the present specification may mean "for example". Specifically, in the case that "prediction (intra prediction)" is expressed, it may be indicated that "intra prediction" is proposed as an example of "prediction". In other words, the term "prediction" in the present specification is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

In the present specification, technical features individually explained in one drawing may be individually implemented, or may be simultaneously implemented.

Hereinafter, embodiments of the present disclosure will be described in detail with reference to the accompanying drawings. In addition, like reference numerals are used to indicate like elements throughout the drawings, and the same descriptions on the like elements may be omitted.

FIG. 1 illustrates an example of a video/image coding system to which the disclosure of the present document may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
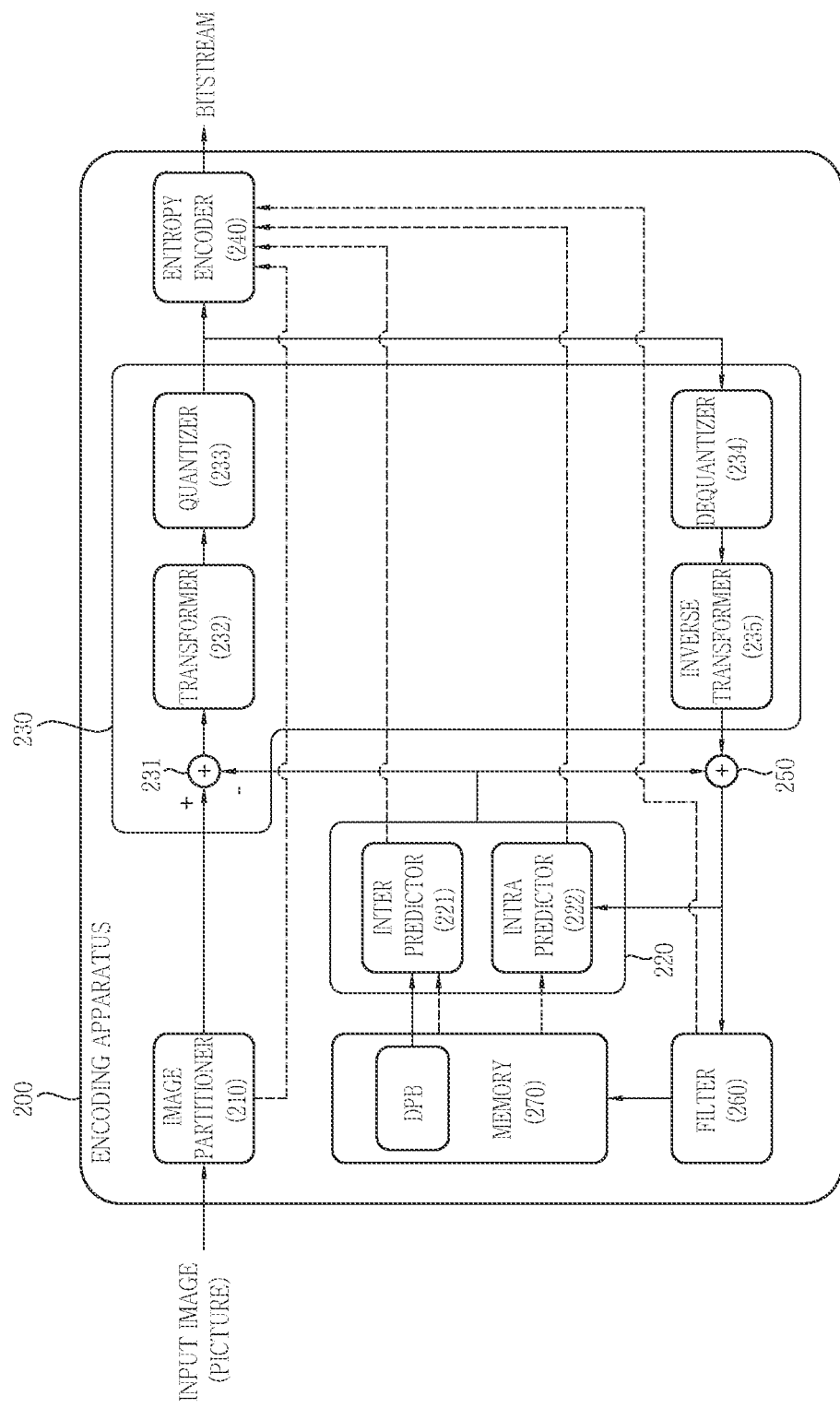
FIG. 2 is a view schematically illustrating the configuration of a video/image encoding apparatus to which embodiments of the present disclosure may be applied.

FIG. 2 is a diagram schematically illustrating the configuration of a video/image encoding apparatus to which the disclosure of the present document may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a predictor (PU) or a transform unit (TU). In this case, each of the predictor and the transform unit may be split or partitioned from the aforementioned final coding unit. The predictor may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The subtractor 231 may generate a residual signal (residual block, residual samples, or residual sample array) by subtracting a prediction signal (predicted block, prediction samples, or prediction sample array) output from the predictor 220 from an input image signal (original block, original samples, or original sample array), and the generated residual signal is transmitted to the transformer 232. The predictor 220 may perform prediction for a processing target block (hereinafter, referred to as a "current block"), and generate a predicted block including prediction samples for the current block. The predictor 220 may determine whether intra prediction or inter prediction is applied on a current block or in a CU unit. As described later in the description of each prediction mode, the predictor may generate various kinds of information related to prediction, such as prediction mode information, and transfer the generated information to the entropy encoder 240. The information on the prediction may be encoded in the entropy encoder 240 and output in the form of a bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may perform an intra block copy (IBC) for prediction of a block. The intra block copy may be used for content image/moving image coding of a game or the like, for example, screen content coding (SCC). The IBC basically performs prediction in the current picture, but may be performed similarly to inter prediction in that a reference block is derived in the current picture. That is, the IBC may use at least one of inter prediction techniques described in the present document.

The prediction signal generated through the inter predictor 221 and/or the intra predictor 222 may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, the GBT means transform obtained from a graph when relationship information between pixels is represented by the graph. The CNT refers to the transform obtained based on a prediction signal generated using all previously reconstructed pixels. In addition, the transform process may be applied to square pixel blocks having the same size, or may be applied to blocks having a variable size rather than a square.

The quantizer 233 may quantize the transform coefficients and transmit them to the entropy encoder 240, and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order, and generate information on the quantized transform coefficients based on the quantized transform coefficients in the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction together with or separately from the quantized transform coefficients (e.g., values of syntax elements and the like). Encoded information (e.g., encoded video/image information) may be transmitted or stored in the unit of a network abstraction layer (NAL) in the form of a bitstream. The video/image information may further include information on various parameter sets, such as an adaptation parameter set (APS), a picture parameter set (PPS), a sequence parameter set (SPS), or a video parameter set (VPS). In addition, the video/image information may further include general constraint information. In the present document, information and/or syntax elements being signaled/transmitted to be described later may be encoded through the above-described encoding procedure, and be included in the bitstream. The bitstream may be transmitted through a network, or may be stored in a digital storage medium. Here, the network may include a broadcasting network and/or a communication network, and the digital storage medium may include various storage media, such as USB, SD, CD, DVD, Blu-ray, HDD, SSD, and the like. A transmitter (not illustrated) transmitting a signal output from the entropy encoder 240 and/or a storage unit (not illustrated) storing the signal may be configured as an internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the predictor 220 to generate a reconstructed signal (reconstructed picture, reconstructed block, reconstructed samples, or reconstructed sample array). If there is no residual for the processing target block, such as a case that a skip mode is applied, the predicted block may be used as the reconstructed block. The generated reconstructed signal may be used for intra prediction of a next processing target block in the current picture, and may be used for inter prediction of a next picture through filtering as described below.

Meanwhile, luma mapping with chroma scaling (LMCS) may be applied during a picture encoding and/or reconstruction process.

The filter 260 may improve subjective/objective image quality by applying filtering to the reconstructed signal. For example, the filter 260 may generate a modified reconstructed picture by applying various filtering methods to the reconstructed picture, and store the modified reconstructed picture in the memory 270, specifically, in a DPB of the memory 270. The various filtering methods may include, for example, deblocking filtering, a sample adaptive offset (SAO), an adaptive loop filter, a bilateral filter, and the like. The filter 260 may generate various kinds of information related to the filtering, and transfer the generated information to the entropy encoder 290 as described later in the description of each filtering method. The information related to the filtering may be encoded by the entropy encoder 290 and output in the form of a bitstream.

The modified reconstructed picture transmitted to the memory 270 may be used as a reference picture in the inter predictor 221. When the inter prediction is applied through the encoding apparatus, prediction mismatch between the encoding apparatus 200 and the decoding apparatus can be avoided and encoding efficiency can be improved.

The DPB of the memory 270 may store the modified reconstructed picture for use as the reference picture in the inter predictor 221. The memory 270 may store motion information of a block from which the motion information in the current picture is derived (or encoded) and/or motion information of blocks in the picture, having already been reconstructed. The stored motion information may be transferred to the inter predictor 221 to be utilized as motion information of the spatial neighboring block or motion information of the temporal neighboring block. The memory 270 may store reconstructed samples of reconstructed blocks in the current picture, and may transfer the reconstructed samples to the intra predictor 222.

Figure 3:
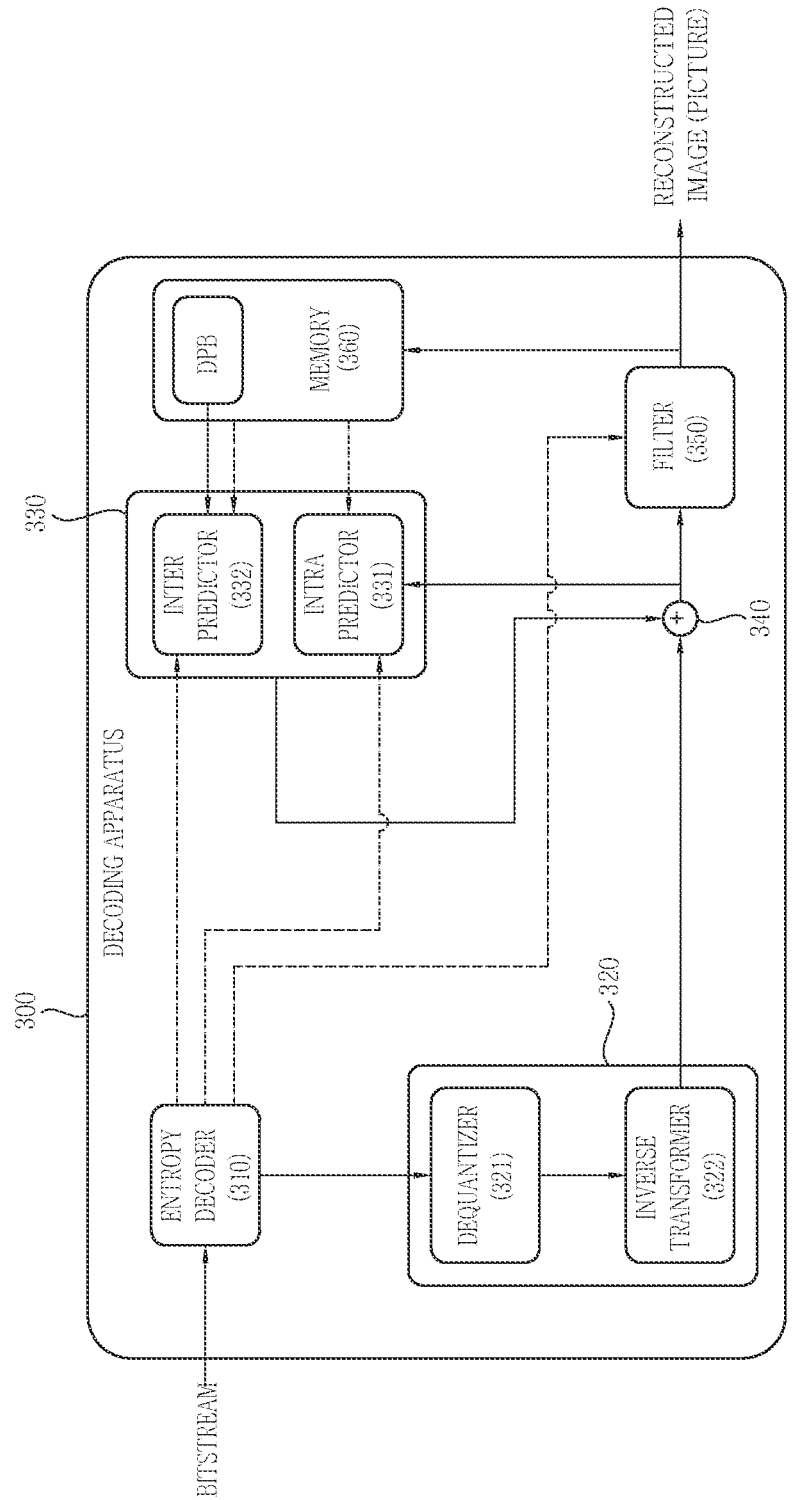
FIG. 3 is a view schematically illustrating the configuration of a video/image decoding apparatus to which embodiments of the present disclosure may be applied.

FIG. 3 is a diagram for schematically explaining the configuration of a video/image decoding apparatus to which the disclosure of the present document may be applied.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model by using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor 330, and information on the residual on which the entropy decoding has been performed in the entropy decoder 310, that is, the quantized transform coefficients and related parameter information, may be input to the dequantizer 321. In addition, information on filtering among information decoded by the entropy decoder 310 may be provided to the filter 350. Meanwhile, a receiver (not illustrated) for receiving a signal output from the encoding apparatus may be further configured as an internal/external element of the decoding apparatus 300, or the receiver may be a constituent element of the entropy decoder 310. Meanwhile, the decoding apparatus according to the present document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the predictor 330, the adder 340, the filter 350, and the memory 360.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may perform an intra block copy (IBC) for prediction of a block. The intra block copy may be used for content image/moving image coding of a game or the like, for example, screen content coding (SCC). The IBC basically performs prediction in the current picture, but may be performed similarly to inter prediction in that a reference block is derived in the current picture. That is, the IBC may use at least one of inter prediction techniques described in the present document.

The intra predictor 332 may predict the current block by referring to the samples in the current picture. The referred samples may be located in the neighborhood of the current block, or may be located apart from the current block according to the prediction mode. In intra prediction, prediction modes may include a plurality of non-directional modes and a plurality of directional modes. The intra predictor 332 may determine the prediction mode to be applied to the current block by using the prediction mode applied to the neighboring block.

The inter predictor 331 may derive a predicted block for the current block based on a reference block (reference sample array) specified by a motion vector on a reference picture. In this case, in order to reduce the amount of motion information being transmitted in the inter prediction mode, motion information may be predicted in the unit of blocks, subblocks, or samples based on correlation of motion information between the neighboring block and the current block. The motion information may include a motion vector and a reference picture index. The motion information may further include information on inter prediction direction (L0 prediction, L1 prediction, Bi prediction, and the like). In case of inter prediction, the neighboring block may include a spatial neighboring block existing in the current picture and a temporal neighboring block existing in the reference picture. For example, the inter predictor 331 may construct a motion information candidate list based on neighboring blocks, and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, or reconstructed sample array) by adding the obtained residual signal to the prediction signal (predicted block or predicted sample array) output from the predictor 330. If there is no residual for the processing target block, such as a case that a skip mode is applied, the predicted block may be used as the reconstructed block.

The adder 340 may be called a reconstructor or a reconstructed block generator. The generated reconstructed signal may be used for the intra prediction of a next block to be processed in the current picture, and as described later, may also be output through filtering or may also be used for the inter prediction of a next picture.

Meanwhile, a luma mapping with chroma scaling (LMCS) may also be applied in the picture decoding process.

The filter 350 may improve subjective/objective image quality by applying filtering to the reconstructed signal. For example, the filter 350 may generate a modified reconstructed picture by applying various filtering methods to the reconstructed picture, and store the modified reconstructed picture in the memory 360, specifically, in a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 331. The memory 360 may store the motion information of the block from which the motion information in the current picture is derived (or decoded) and/or the motion information of the blocks in the picture having already been reconstructed. The stored motion information may be transferred to the inter predictor 331 so as to be utilized as the motion information of the spatial neighboring block or the motion information of the temporal neighboring block. The memory 360 may store reconstructed samples of reconstructed blocks in the current picture, and transfer the reconstructed samples to the intra predictor 332.

In the present specification, the embodiments described in the predictor 330, the dequantizer 321, the inverse transformer 322, and the filter 350 of the decoding apparatus 300 may also be applied in the same manner or corresponding to the predictor 220, the dequantizer 234, the inverse transformer 235, and the filter 260 of the encoding apparatus 200.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

In this document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficient may be called a coefficient or a residual coefficient or may still be called the transform coefficient for uniformity of expression.

In this document, the quantized transform coefficient and the transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on inverse transform (transform) of the scaled transform coefficients. This may be applied/expressed in other parts of this document as well.

The predictor of the encoding apparatus/decoding apparatus may derive prediction samples by performing inter prediction in units of blocks. Inter prediction can be a prediction derived in a manner that is dependent on data elements (e.g., sample values or motion information, etc) of picture(s) other than the current picture. When the inter prediction is applied to the current block, based on the reference block (reference sample arrays) specified by the motion vector on the reference picture pointed to by the reference picture index, the predicted block (prediction sample arrays) for the current block can be derived. In this case, in order to reduce the amount of motion information transmitted in the inter prediction mode, the motion information of the current block may be predicted in units of blocks, subblocks, or samples based on the correlation between the motion information between neighboring blocks and the current block. The motion information may include the motion vector and the reference picture index. The motion information may further include inter prediction type (L0 prediction, L1 prediction, Bi prediction, etc.) information. When the inter prediction is applied, the neighboring blocks may include a spatial neighboring block existing in the current picture and a temporal neighboring block existing in the reference picture. The reference picture including the reference block and the reference picture including the temporal neighboring block may be the same or different. The temporal neighboring block may be called a collocated reference block, a collocated CU (colCU), etc., and a reference picture including the temporally neighboring block may be called a collocated picture (colPic). For example, a motion information candidate list may be constructed based on neighboring blocks of the current block, and a flag or index information indicating which candidate is selected (used) to derive the motion vector and/or the reference picture index of the current block may be signaled. The inter prediction may be performed based on various prediction modes. For example, in the skip mode and the merge mode, the motion information of the current block may be the same as the motion information of a selected neighboring block. In the skip mode, unlike the merge mode, a residual signal may not be transmitted. In the case of a motion vector prediction (MVP) mode, a motion vector of a selected neighboring block may be used as a motion vector predictor, and a motion vector difference may be signaled. In this case, the motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). A motion vector in the L0 direction may be referred to as an L0 motion vector or MVL0, and a motion vector in the L1 direction may be referred to as an L1 motion vector or MVL1. The prediction based on the L0 motion vector may be called L0 prediction, the prediction based on the L1 motion vector may be called the L1 prediction, and the prediction based on both the L0 motion vector and the L1 motion vector may be called a bi-prediction. Here, the L0 motion vector may indicate a motion vector associated with the reference picture list L0 (L0), and the L1 motion vector may indicate a motion vector associated with the reference picture list L1 (L1). The reference picture list L0 may include pictures that are previous than the current picture in output order as reference pictures, and the reference picture list L1 may include pictures that are subsequent than the current picture in output order. The previous pictures may be called forward (reference) pictures, and the subsequent pictures may be called backward (reference) pictures. The reference picture list L0 may further include pictures that are subsequent than the current picture in output order as reference pictures. In this case, the previous pictures may be indexed first, and the subsequent pictures may be indexed next in the reference picture list L0. The reference picture list L1 may further include pictures previous than the current picture in output order as reference pictures. In this case, the subsequent pictures may be indexed first in the reference picture list 1 and the previous pictures may be indexed next. Here, the output order may correspond to a picture order count (POC) order.

Figure 4:
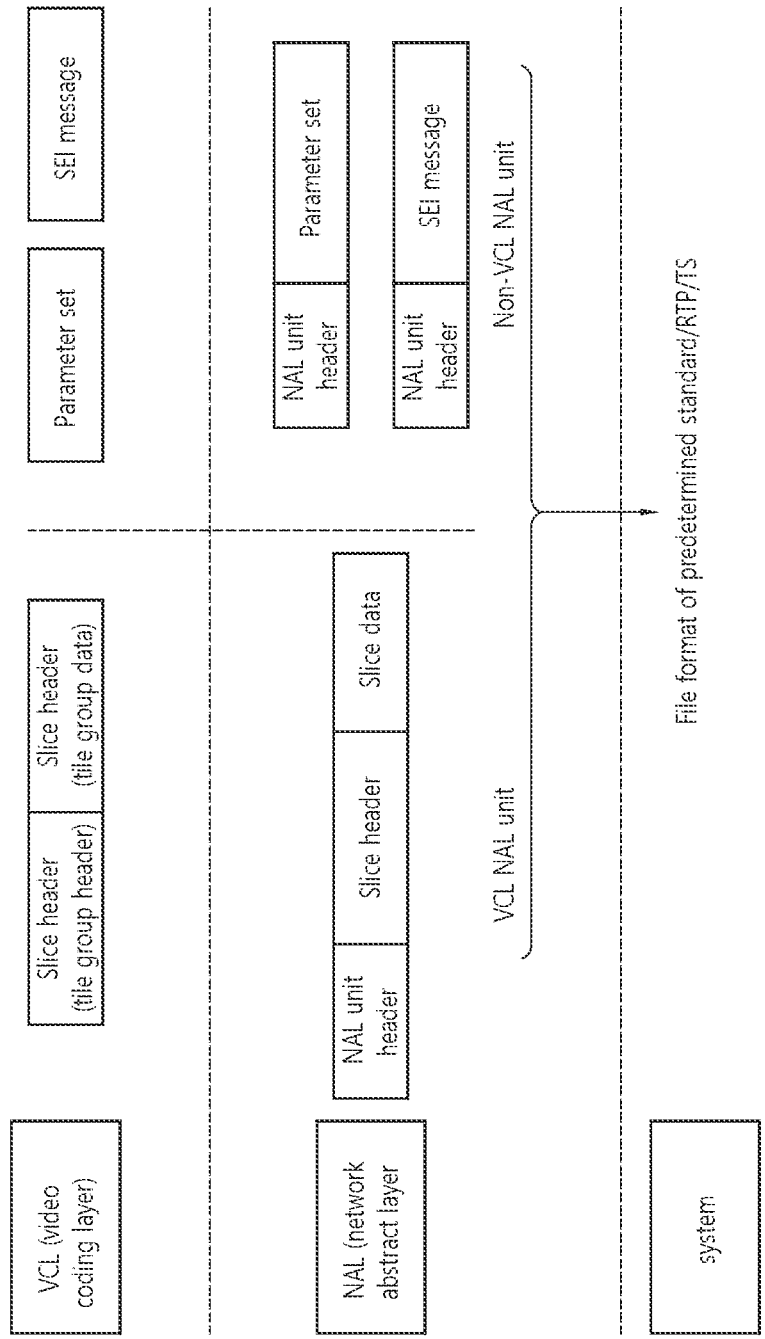
FIG. 4 exemplarily shows a hierarchical architecture for a coded video/image.

FIG. 4 exemplarily shows a hierarchical structure for a coded image/video.

Referring to FIG. 4, the coded image/video is divided into VCL (video coding layer) that deals with an image/video decoding process and itself, a subsystem that transmits and stores the coded information, and a network abstraction layer (NAL) that exists between the VCL and subsystems and is responsible for network adaptation functions.

The VCL may generate VCL data including compressed image data (slice data), or generate parameter sets including a picture parameter set (Picture Parameter Set: PPS), a sequence parameter set (Sequence Parameter Set: SPS), a video parameter set (Video Parameter Set: VPS) etc., or a supplemental enhancement information (SEI) message additionally necessary for the decoding process of an image.

In the NAL, a NAL unit may be generated by adding header information (NAL unit header) to a raw byte sequence payload (RBSP) generated in the VCL. In this case, the RBSP refers to slice data, parameter sets, SEI messages, etc., generated in the VCL. The NAL unit header may include NAL unit type information specified according to RBSP data included in the corresponding NAL unit.

As shown in the figure, the NAL unit may be divided into a VCL NAL unit and a Non-VCL NAL unit according to the RBSP generated in the VCL. The VCL NAL unit may mean a NAL unit including information (sliced data) about an image, and the Non-VCL NAL unit may mean a NAL unit containing information (parameter set or SEI message) necessary for decoding an image.

The above-described VCL NAL unit and Non-VCL NAL unit may be transmitted through a network by attaching header information according to a data standard of the subsystem. For example, the NAL unit may be transformed into a data form of a predetermined standard such as H.266/VVC file format, Real-time Transport Protocol (RTP), Transport Stream (TS), etc., and transmitted through various networks.

As described above, in the NAL unit, the NAL unit type may be specified according to the RBSP data structure included in the corresponding NAL unit, and information on this NAL unit type may be stored and signaled in the NAL unit header.

For example, the NAL unit may be roughly classified into the VCL NAL unit type and the Non-VCL NAL unit type depending on whether the NAL unit includes information about the image (slice data). The VCL NAL unit type may be classified according to property and a type of a picture included in the VCL NAL unit, and the Non-VCL NAL unit type may be classified according to the type of a parameter set.

The following is an example of the NAL unit type specified according to the type of parameter set included in the Non-VCL NAL unit type.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

PH (Picture header) NAL unit: Type for NAL unit including PH

The above-described NAL unit types have syntax information for the NAL unit type, and the syntax information may be stored and signaled in the NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. In this document, a slice may be mixed or replaced with a tile group. Also, in this document, a slice header may be mixed or replaced with a type group header.

The slice header (slice header syntax or slice header information) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to the entire video. The DPS may include information/parameters related to concatenation of a coded video sequence (CVS). In this document, high level syntax (HLS) may include at least one of the APS syntax, PPS syntax, SPS syntax, VPS syntax, DPS syntax, picture header syntax, and slice header syntax.

In this document, the image/video information encoded in the encoding apparatus and signaled in the form of a bitstream to the decoding apparatus may include, as well as picture partitioning-related information in the picture, intra/inter prediction information, residual information, in-loop filtering information, etc., the information included in the slice header, the information included in the picture header, the information included in the APS, the information included in the PPS, the information included in the SPS, the information included in the VPS, and/or the information included in the DPS. In addition, the image/video information may further include information of the NAL unit header.

Meanwhile, in order to compensate for a difference between an original image and a reconstructed image due to an error occurring in a compression encoding process such as quantization, an in-loop filtering process may be performed on reconstructed samples or reconstructed pictures as described above. As described above, the in-loop filtering may be performed by the filter of the encoding apparatus and the filter of the decoding apparatus, and a deblocking filter, SAO, and/or adaptive loop filter (ALF) may be applied. For example, the ALF process may be performed after the deblocking filtering process and/or the SAO process are completed. However, even in this case, the deblocking filtering process and/or the SAO process may be omitted.

Hereinafter, a detailed description of picture reconstruction and filtering will be described. In the image/video coding, the reconstructed block may be generated based on intra prediction/inter prediction for each block, and the reconstructed picture including the reconstructed blocks may be generated. When the current picture/slice is an I picture/slice, the blocks included in the current picture/slice may be reconstructed based only on the intra prediction. Meanwhile, when the current picture/slice is a P or B picture/slice, the blocks included in the current picture/slice may be reconstructed based on the intra prediction or inter prediction. In this case, the intra prediction may be applied to some blocks in the current picture/slice, and the inter prediction may be applied to the remaining blocks.

The intra prediction may represent a prediction for generating prediction samples for the current block based on reference samples in the picture (hereinafter, current picture) to which the current block belongs. In case that the intra prediction is applied to the current block, neighboring reference samples to be used for the intra prediction of the current block may be derived. The neighboring reference samples of the current block may include a sample adjacent to a left boundary of the current block having a size of nW×nH, total 2×nH samples neighboring the bottom-left, a sample adjacent to the top boundary of the current block, total 2×nW samples neighboring the top-right, and one sample neighboring the top-left of the current block. Alternatively, the neighboring reference samples of the current block may include top neighboring sample of plural columns and left neighboring sample of plural rows. Alternatively, the neighboring reference samples of the current block may include total nH samples adjacent to the right boundary of the current block having a size of nW×nH, total nH samples adjacent to the right boundary of the current block, total nW samples adjacent to the bottom boundary of the current block, and one sample neighboring the bottom-right of the current block.

However, some of the neighboring reference samples of the current block may have not yet been decoded or may not be available. In this case, the decoder may configure the neighboring reference samples to be used for the prediction through substitution of available samples for the unavailable samples. Alternatively, the neighboring reference samples to be used for the prediction may be configured through interpolation of the available samples.

When the neighboring reference samples are derived, the prediction sample may be derived based on the average or interpolation of the neighboring reference samples of the current block, and (ii) the prediction sample may be derived based on a reference sample existing in a specific (prediction) direction with respect to a prediction sample among the neighboring reference samples of the current block. The case of (i) may be called a non-directional mode or a non-angular mode, and the case of (ii) may be called a directional mode or an angular mode. Also, the prediction sample may be generated through interpolation between the first neighboring sample and the second neighboring sample located in a direction opposite to the prediction direction of the intra prediction mode of the current block based on the prediction sample of the current block among the neighboring reference samples. The above-described case may be referred to as linear interpolation intra prediction (LIP). In addition, the chroma prediction samples may be generated based on the luma samples using the linear model. This case may be called an LM mode. In addition, the temporary prediction sample of the current block may be derived based on the filtered peripheral reference samples, and the prediction sample of the current block by weighted summing the temporary prediction sample and at least one reference sample derived according to the intra prediction mode among the existing neighboring reference samples, that is, unfiltered neighboring reference samples may be derived. The above-described case may be called position dependent intra prediction (PDPC). In addition, by selecting a reference sample line having the highest prediction accuracy among the multiple neighboring reference sample lines of the current block, the prediction sample may be derived using the reference sample located in the prediction direction in the corresponding line. In this case, the intra prediction encoding may be performed by instructing (signaling) the used reference sample line to the decoding apparatus. The above-described case may be called multi-reference line (MRL) intra prediction or MRL-based intra prediction. In addition, the current block may be divided into vertical or horizontal sub-partitions to perform the intra prediction based on the same intra prediction mode, but the neighboring reference samples may be derived and used in units of the sub-partitions. That is, in this case, the intra prediction mode for the current block may be equally applied to the sub-partitions, but the intra prediction performance may be improved in some cases by deriving and using the peripheral reference samples in units of sub-partitions. This prediction method may be called intra sub-partitions (ISP) or ISP-based intra prediction. The above-described intra prediction methods may be called an intra prediction type to be distinguished from the intra prediction mode in Table of Contents 1.2. The intra prediction type may be referred to by various terms such as an intra prediction technique or an additional intra prediction mode. For example, the intra prediction type (or additional intra prediction mode, etc.) may include at least one of the above-described LIP, PDPC, MRL, and ISP. A general intra prediction method excluding a specific intra prediction type such as the LIP, PDPC, MRL, and ISP may be called a normal intra prediction type. The normal intra prediction type may be generally applied when the above specific intra prediction type is not applied, and the prediction may be performed based on the above-described intra prediction mode. Meanwhile, if necessary, the post-processing filtering may be performed on the derived prediction sample.

Specifically, the intra prediction procedure may include determining an intra prediction mode/type, deriving a peripheral reference sample, and deriving a prediction sample based on an intra prediction mode/type. In addition, if necessary, the post-processing filtering may be performed on the derived prediction sample.

Hereinafter, the intra prediction in the encoding apparatus will be described. The encoding apparatus performs the intra prediction on the current block. The encoding apparatus may derive an intra prediction mode for the current block, derive neighboring reference samples of the current block, and generate prediction samples in the current block based on the intra prediction mode and the neighboring reference samples. Here, the procedures of determining the intra prediction mode, deriving the neighboring reference samples, and generating the prediction samples may be performed simultaneously, or any one procedure may be performed before another procedure. For example, the intra predictor 222 of the encoding apparatus may include a prediction mode/type determiner, a reference sample deriver, and a prediction sample deriver, the prediction mode/type determiner may determine the intra prediction mode/type for the current block, the reference sample deriver may derive neighboring reference samples of the current block, and the prediction sample deriver may derive motion samples of the current block. Meanwhile, although not illustrated, when a prediction sample filtering procedure to be described later is performed, the intra predictor 222 may further include a prediction sample filter. The encoding apparatus may determine a mode applied to the current block from among a plurality of intra prediction modes. The encoding apparatus may compare RD costs for the intra prediction modes and determine an optimal intra prediction mode for the current block.

Meanwhile, the encoding apparatus may perform a prediction sample filtering procedure. The prediction sample filtering may be referred to as post filtering. Some or all of the prediction samples may be filtered by the prediction sample filtering procedure. In some cases, the prediction sample filtering procedure may be omitted.

The encoding apparatus derives residual samples for the current block based on the prediction samples. The encoding apparatus may compare the prediction samples in the original samples of the current block based on the phase and derive the residual samples.

The encoding apparatus may transform/quantize the residual samples to derive quantized transform coefficients, and then perform dequantization/inverse transform processing on the quantized transform coefficients to derive (modified) residual samples. The reason for performing the dequantization/inverse transform again after the transform/quantization is to derive the same residual samples as the residual samples derived from the decoding apparatus as described above.

The encoding apparatus may generate a reconstructed block including reconstructed samples for the current block based on the prediction samples and the (modified) residual samples. A reconstructed picture for the current picture may be generated based on the reconstructed block.

As described above, the encoding apparatus encodes image information including prediction information on the intra prediction (e.g., prediction mode information indicating a prediction mode) and residual information on the intra and residual samples to output the encoded image information into the form of the bitstream. The residual information may include a residual coding syntax. The encoding apparatus may transform/quantize the residual samples to derive the quantized transform coefficients. The residual information may include information on the quantized transform coefficients.

Figure 5:
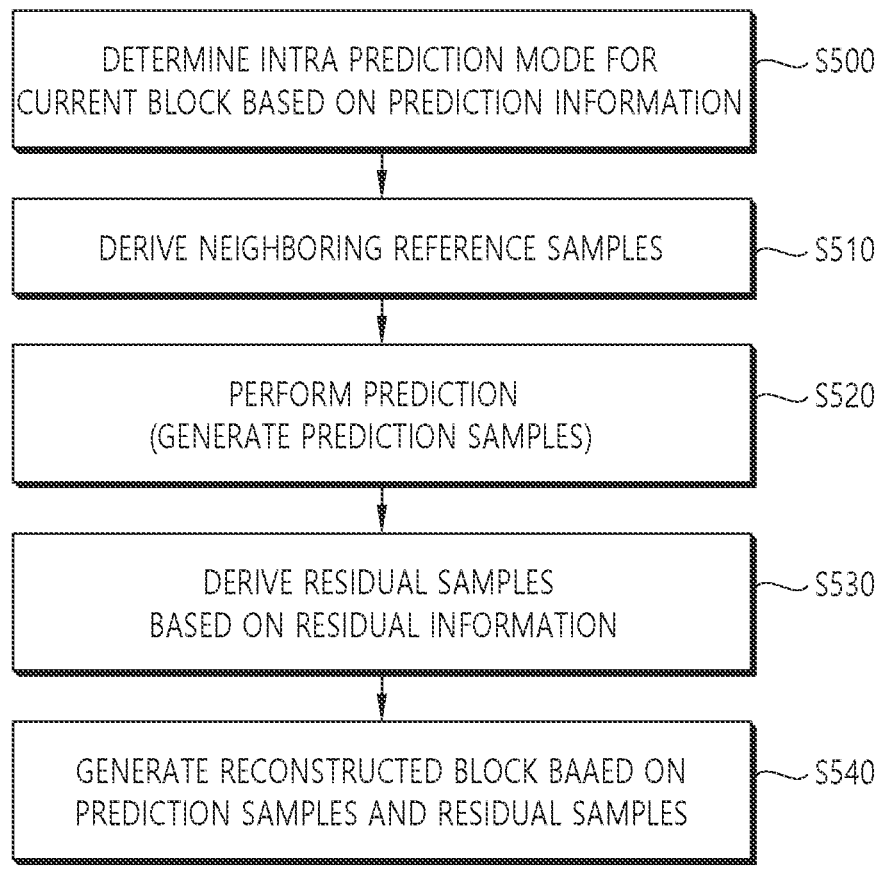
FIG. 5 is a flowchart for describing an intra prediction-based block reconstruction method in a decoding apparatus.
Figure 6:
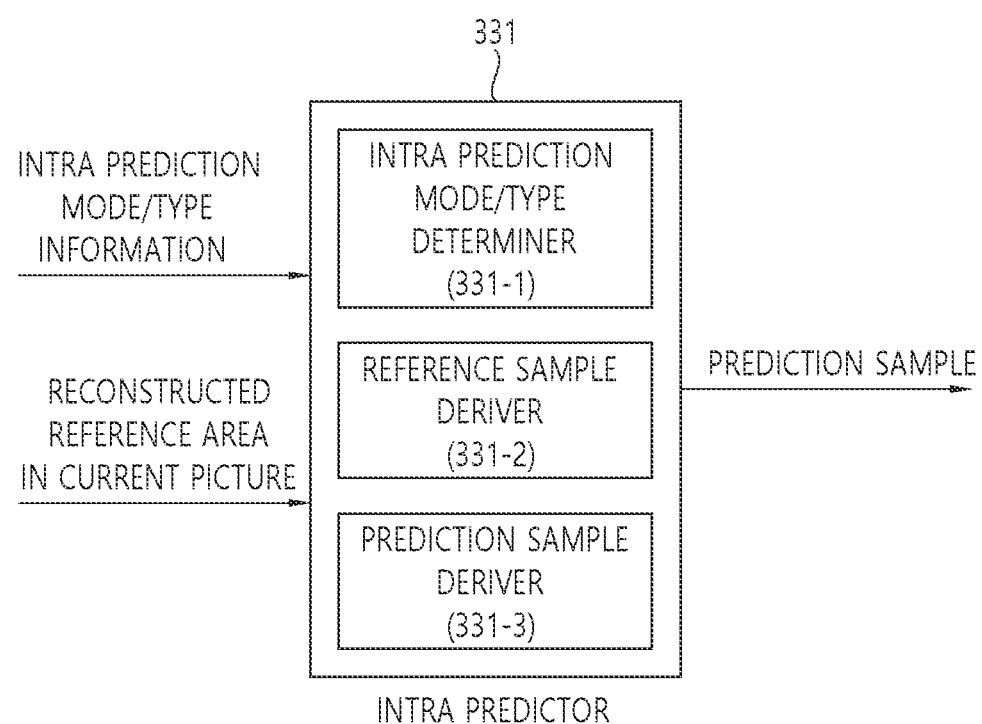
FIG. 6 illustrates an intra predictor in a decoding apparatus.

FIG. 5 is a flowchart for describing an intra prediction-based block reconstruction method in a decoding apparatus. FIG. 6 illustrates an intra predictor in a decoding apparatus.

The decoding apparatus may perform an operation corresponding to the operation performed by the encoding apparatus.

S500 to S520 may be performed by the intra predictor 331 of the decoding apparatus, and the prediction information of S500 and the residual information of S530 may be obtained from the bitstream by the entropy decoder 310 of the decoding apparatus. The residual processor 320 of the decoding apparatus may derive the residual samples for the current block based on the residual information. Specifically, the dequantizer 321 of the residual processing unit 320 may derive the transform coefficients by performing the dequantization based on the quantized transform coefficients derived based on the residual information, and the inverse transform unit 322 of the residual processing unit may derive the residual samples for the current block by performing the inverse transform on the transform coefficients. S540 may be performed by the adder 340 or the reconstructor of the decoding apparatus.

In detail, the decoding apparatus may derive an intra prediction mode for the current block based on the received prediction mode information (S500). The decoding apparatus may derive neighboring reference samples of the current block (S510). The decoding apparatus generates the prediction samples in the current block based on the intra prediction mode and the neighboring reference samples (S520). In this case, the decoding apparatus may perform the prediction sample filtering procedure. The prediction sample filtering may be referred to as post filtering. Some or all of the prediction samples may be filtered by the prediction sample filtering procedure. In some cases, the prediction sample filtering procedure may be omitted.

The decoding apparatus generates the residual samples for the current block based on the received residual information (S530). The decoding apparatus may generate the reconstructed samples for the current block based on the prediction samples and the residual samples, and may derive the reconstructed block including the reconstructed samples (S540). The reconstructed picture for the current picture may be generated based on the reconstructed block.

Here, the intra predictor 331 of the decoding apparatus may include a prediction mode/type determiner 331-1, a reference sample deriver 331-2, and a prediction sample deriver 331-3, the prediction mode/type determiner 331-1 may determine an intra prediction mode for the current block based on prediction mode information obtained from the entropy decoder 310 of the decoding apparatus, the reference sample deriver 331-2 may derive neighboring reference samples of the current block, and the prediction sample deriver 331-3 may derive prediction samples of the current block. Meanwhile, although not shown, when a prediction sample filtering procedure described above is performed, the intra predictor 331 may further include a prediction sample filter unit (not shown).

The prediction information may include intra prediction mode information and/or intra prediction type information. The intra prediction mode information may include, for example, flag information (e.g., intra luma mpm flag) indicating whether a most probable mode (MPM) is applied to the current block or a remaining mode is applied, and when the MPM is applied to the current block, the prediction mode information may further include index information (e.g., intra luma mpm idx) indicating one of the intra prediction mode candidates (MPM candidates). The intra prediction mode candidates (MPM candidates) may be composed of an MPM candidate list or an MPM list. In addition, when the MPM is not applied to the current block, the intra prediction mode information may further include remaining mode information (e.g., intra_luma_mpm_remainder) indicating one of the remaining intra prediction modes except for the intra prediction mode candidates (MPM candidates). The decoding apparatus may determine the intra prediction mode of the current block based on the intra prediction mode information. A separate MPM list may be configured for the above-described MIP In addition, the intra prediction type information may be implemented in various forms. For example, the intra prediction type information may include intra prediction type index information indicating one of the intra prediction types. As another example, the intra-prediction type information may include at least one of reference sample line information (ex intra_luma_ref_idx) indicating whether the MRL is applied to the current block and, when applied, how many reference sample lines are used, ISP flag information indicating whether the ISP is applied to the current block (ex intra_subpartitions_mode_flag), ISP type information indicating a split type of subpartitions when the ISP is applied (ex intra_subpartitions_split_flag), the flag information indicating whether PDCP is applied, or flag information indicating whether the LIP is applied. In addition, the intra prediction type information may include a MIP flag indicating whether MIP is applied to the current block.

The intra prediction mode information and/or the intra prediction type information may be encoded/decoded through the coding method described in the present disclosure. For example, the intra prediction mode information and/or the intra prediction type information may be encoded/decoded through entropy coding (e.g., CABAC, CAVLC) coding based on a truncated (rice) binary code.

The prediction unit of the encoding apparatus/decoding apparatus may derive prediction samples by performing inter prediction in units of blocks. The inter prediction can be a prediction derived in a manner that is dependent on data elements (e.g., sample values or motion information) of picture(s) other than the current picture). When inter prediction is applied to the current block, the predicted block (prediction sample array) for the current block may be derived based on the reference block (reference sample array) specified by the motion vector on the reference picture indicated by the reference picture index. In this case, in order to reduce the amount of motion information transmitted in the inter prediction mode, the motion information of the current block may be predicted in units of blocks, subblocks, or samples based on the correlation between motion information between neighboring blocks and the current block. The motion information may include a motion vector and a reference picture index. The motion information may further include the inter prediction type (L0 prediction, L1 prediction, Bi prediction, etc.) information. When the inter prediction is applied, the neighboring blocks may include spatial neighboring blocks present in the current picture and temporal neighboring blocks present in the reference picture. The reference picture including the reference block and the reference picture including the temporal neighboring block may be the same or different. The temporal neighboring block may be called a collocated reference block, a collocated CU (colCU), etc., and the reference picture including the temporal neighboring block may be called a collocated picture (colPic). For example, a motion information candidate list may be constructed based on neighboring blocks of the current block, and a flag or index information indicating which candidate is selected (used) to derive the motion vector and/or reference picture index of the current block may be signaled. The inter prediction may be performed based on various prediction modes. For example, in the case of a skip mode and a merge mode, the motion information of the current block may be the same as motion information of the selected neighboring block. In the case of the skip mode, unlike the merge mode, a residual signal may not be transmitted. In the case of the motion vector prediction (MVP) mode, the motion vector of the selected neighboring block may be used as a motion vector predictor, and a motion vector difference may be signaled. In this case, the motion vector of the current block may be derived using the sum of the motion vector predictor and the motion vector difference.

Figure 7:
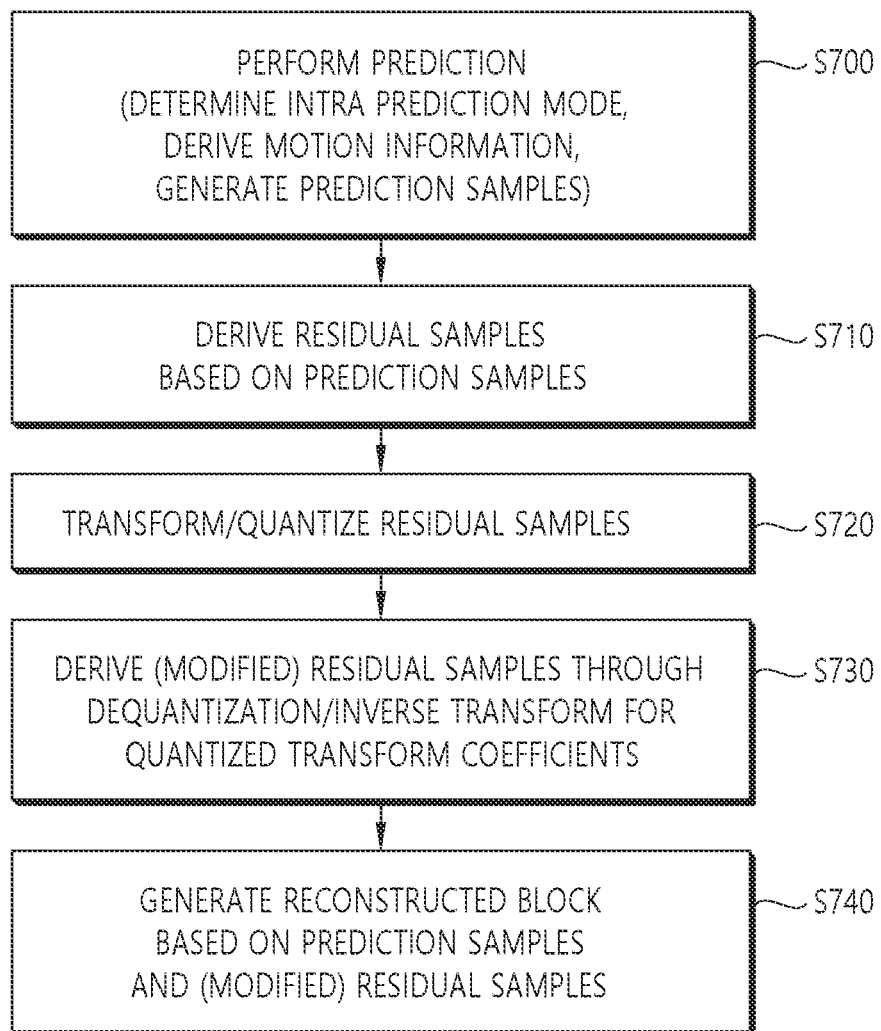
FIG. 7 is a flowchart for describing an inter prediction-based block reconstruction method in an encoding apparatus.

FIG. 7 is a flowchart for describing an inter prediction-based block reconstruction method in an encoding apparatus.

S700 may be performed by the inter predictor 221 of the encoding apparatus, and S710 to S730 may be performed by the residual processor 230 of the encoding apparatus. Specifically, S710 may be performed by the substractor 231 of the encoding apparatus, S720 may be performed by the transformer 232 and the quantizer 233 of the encoding apparatus, and S730 may be performed by the dequantizer 234 and the inverse transformer 235 of the encoding apparatus. In S700, the prediction information may be derived by the inter predictor 221 and encoded by the entropy encoder 240. The residual information may be derived through S710 and S720 and encoded by the entropy encoder 240. The residual information is the information on the residual samples. The residual information may include the information on the quantized transform coefficients for the residual samples. As described above, the residual samples may be derived as the transform coefficients through the transformer 232 of the encoding apparatus, and the transform coefficients may be derived as the quantized transform coefficients through the quantizer 233. The information on the quantized transform coefficients may be encoded by the entropy encoder 240 through the residual coding procedure.

The encoding apparatus performs the inter prediction on the current block (S700). The encoding apparatus may derive the inter prediction mode and motion information of the current block, and generate the prediction samples of the current block. Here, the procedures of determining the inter prediction mode, deriving the motion information, and generating the prediction samples may be performed simultaneously, or any one procedure may be performed before another procedure. For example, the inter predictor 221 of the encoding apparatus may include a prediction mode determiner, a motion information deriver, and a prediction sample deriver, the prediction mode determiner may determine a prediction mode for the current block, the motion information deriver may derive motion information of the current block, and the prediction sample deriver may derive motion samples of the current block. For example, the inter predictor 221 of the encoding apparatus searches for a block similar to the current block within a predetermined area (search area) of reference pictures through motion estimation, and may derive a reference block having a difference from the current block equal to or less than a minimum or a predetermined criterion. Based on this, a reference picture index indicating a reference picture in which the reference block is positioned may be derived, and a motion vector may be derived based on a position difference between the reference block and the current block. The encoding apparatus may determine a mode applied to the current block from among various prediction modes. The encoding apparatus may compare RD costs for the various prediction modes and determine an optimal prediction mode for the current block.

For example, when the skip mode or the merge mode is applied to the current block, the encoding apparatus may construct a merge candidate list to be described later, and derive a reference block having a difference of a minimum or a predetermined criterion or less from a current block among reference blocks indicated by merge candidates included in the merge candidate list. In this case, a merge candidate associated with the derived reference block may be selected, and merge index information indicating the selected merge candidate may be generated and signaled to the decoding apparatus. The motion information of the current block may be derived using motion information of the selected merge candidate.

As another example, when a (A)MVP mode is applied to the current block, the encoding apparatus may construct a (A)MVP candidate list to be described later, and may use a motion vector of an mvp candidate selected from among motion vector predictor (mvp) candidates included in the (A)MVP candidate list as the mvp of the current block. In this case, for example, the motion vector indicating the reference block derived by the above-described motion estimation may be used as the motion vector of the current block, and an mvp candidate having a motion vector having the smallest difference from the motion vector of the current block among the mvp candidates may be the selected mvp candidate. A motion vector difference (MVD), which is a difference obtained by subtracting mvp from the motion vector of the current block, may be derived. In this case, information on the MVD may be signaled to the decoding apparatus. In addition, when the (A)MVP mode is applied, the value of the reference picture index may be separately signaled to the decoding apparatus by constructing the reference picture index information.

The encoding apparatus may derive the residual samples based on the prediction samples (S710). The encoding apparatus may derive the residual samples through the comparison of the prediction samples with the original samples of the current block.

The encoding apparatus may transform/quantize the residual samples to derive quantized transform coefficients (S720), and then perform dequantization/inverse transform processing on the quantized transform coefficients to derive (modified) residual samples (S730). The reason for performing the dequantization/inverse transform again after the transform/quantization is to derive the same residual samples as the residual samples derived from the decoding apparatus as described above.

The encoding apparatus may generate a reconstructed block including reconstructed samples for the current block based on the prediction samples and the (modified) residual samples (S740). The reconstructed picture for the current picture may be generated based on the reconstructed block.

Although not shown, as described above, the encoding apparatus may encode image information including the prediction information and the residual information. The encoding apparatus may output encoded image information in the form of a bitstream. The prediction information is information related to the prediction procedure and may include prediction mode information (eg, skip flag, merge flag, or mode index, etc.) and motion information. The information on the motion information may include candidate selection information (eg, merge index, mvp flag or mvp index) that is information for deriving a motion vector. In addition, the information on the motion information may include the above-described MVD information and/or reference picture index information. Also, the information on the motion information may include information indicating whether L0 prediction, L1 prediction, or bi-prediction is applied. The residual information is information on the residual samples. The residual information may include information on the quantized transform coefficients for the residual samples.

The output bitstream may be stored in a (digital) storage medium and transmitted to the decoding apparatus, or may be transmitted to the decoding apparatus through a network.

Figure 8:
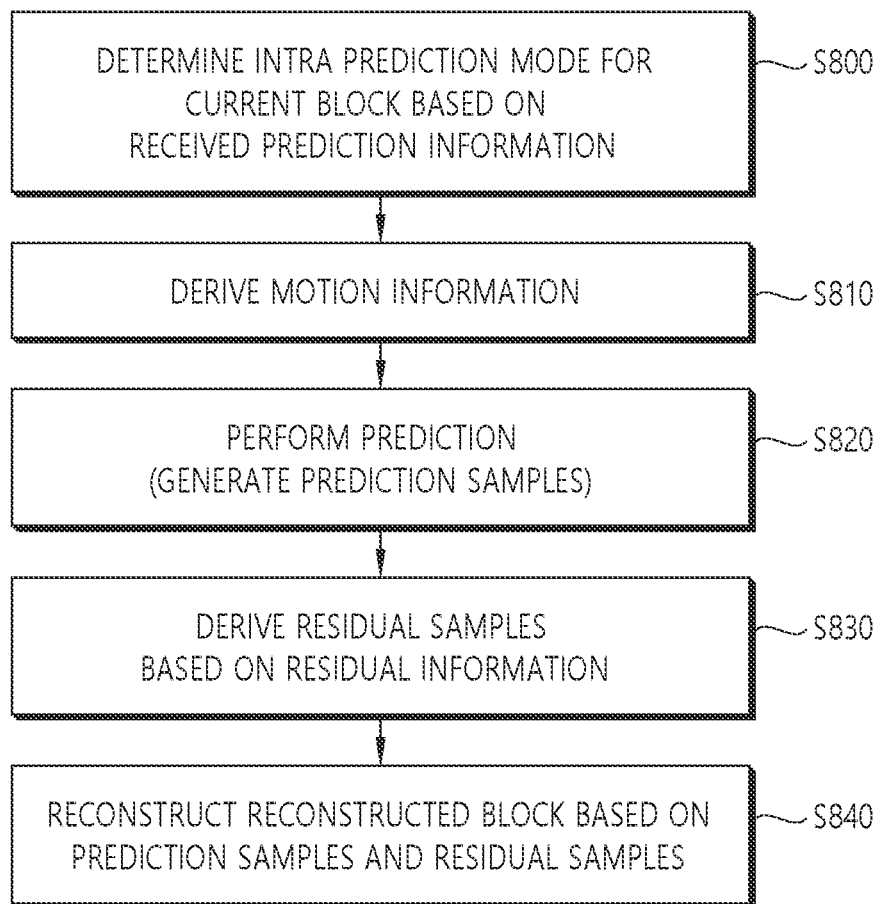
FIG. 8 is a flowchart for describing an inter prediction-based block reconstruction method in a decoding apparatus.
Figure 9:
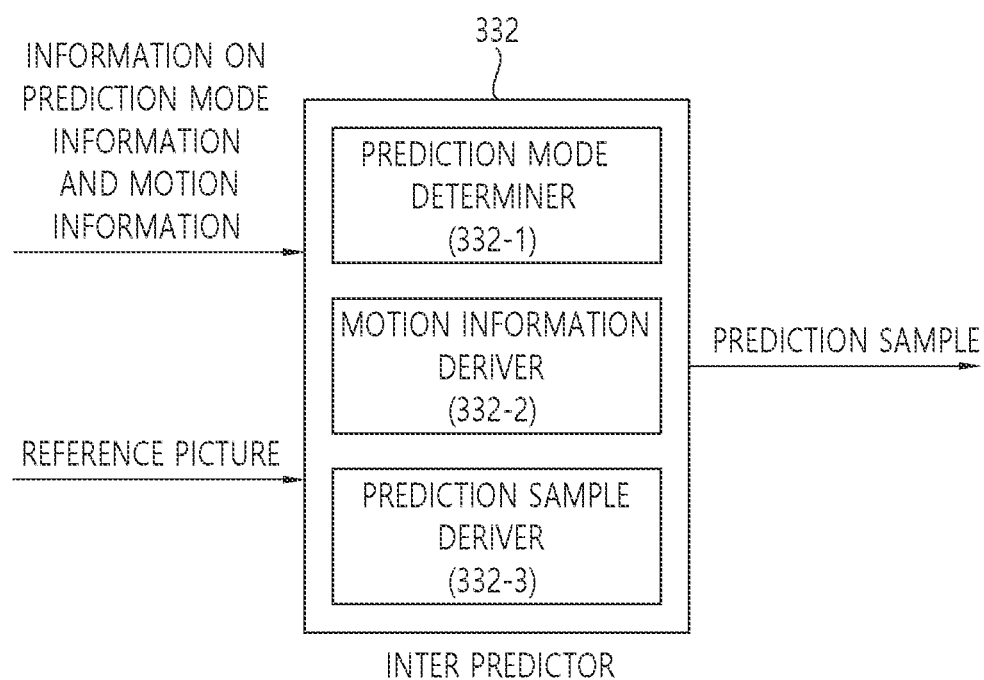
FIG. 9 illustrates an inter predictor in the decoding apparatus.

FIG. 8 is a flowchart for describing an inter prediction-based block reconstruction method in a decoding apparatus. FIG. 9 illustrates an inter predictor in the decoding apparatus.

The decoding apparatus may perform an operation corresponding to the operation performed by the encoding apparatus.

S800 to S820 may be performed by the inter predictor 332 of the decoding apparatus, and the prediction information of S800 and the residual information of S830 may be obtained from the bitstream by the entropy decoder 310 of the decoding apparatus. The residual processor 320 of the decoding apparatus may derive the residual samples for the current block based on the residual information. Specifically, the dequantizer 321 of the residual processing unit 320 may derive the transform coefficients by performing the dequantization based on the quantized transform coefficients derived based on the residual information, and the inverse transform unit 322 of the residual processing unit may derive the residual samples for the current block by performing the inverse transform on the transform coefficients. S840 may be performed by the adder 340 or the reconstructor of the decoding apparatus.

In detail, the decoding apparatus may determine a prediction mode for the current block based on the received prediction mode information (S800). The decoding apparatus may determine which inter prediction mode is applied to the current block based on the prediction mode information in the prediction information.

For example, based on the merge flag, it may be determined whether the merge mode is applied to the current block or whether the (A)MVP mode is determined. Alternatively, one of various inter prediction mode candidates may be selected based on the mode index. The inter prediction mode candidates may include the skip mode, the merge mode, and/or the (A)MVP mode, or may include various inter prediction modes to be described later.

The decoding apparatus may derive the motion information of the current block based on the determined inter prediction mode (S810). For example, when the skip mode or the merge mode is applied to the current block, the decoding apparatus may construct a merge candidate list to be described later and select one merge candidate from among the merge candidates included in the merge candidate list. The selection may be performed based on the above-described selection information (merge index). The motion information of the current block may be derived using the motion information of the selected merge candidate. The motion information of the selected merge candidate may be used as the motion information of the current block.

As another example, when a (A)MVP mode is applied to the current block, the decoding apparatus may construct a (A)MVP candidate list to be described later, and may use a motion vector of an mvp candidate selected from among motion vector predictor (mvp) candidates included in the (A)MVP candidate list as the mvp of the current block. The selection may be performed based on the above-described selection information (mvp flag or mvp index). In this case, the MVD of the current block may be derived based on the information on the MVD, and the motion vector of the current block may be derived based on the mvp and MVD of the current block. Also, the reference picture index of the current block may be derived based on the reference picture index information. The picture indicated by the reference picture index in the reference picture list for the current block may be derived as the reference picture referenced for the inter prediction of the current block.

Meanwhile, as described below, the motion information of the current block may be derived without constructing a candidate list, and in this case, the motion information of the current block may be derived according to the procedure disclosed in the prediction mode to be described later. In this case, the candidate list configuration as described above may be omitted.

The decoding apparatus may generate the prediction samples for the current block based on the motion information of the current block (S820). In this case, the reference picture may be derived based on the reference picture index of the current block, and the prediction samples of the current block may be derived using the samples of the reference block indicated by the motion vector of the current block on the reference picture. In this case, as described below, in some cases, the prediction sample filtering procedure may be further performed on all or some of the prediction samples of the current block.

For example, the inter predictor 332 of the decoding apparatus may include a prediction mode determiner 332-1, a motion information deriver 332-2, and a prediction sample deriver 332-3, in which the prediction mode determiner 332-1 may determine the prediction mode for the current block based on the received prediction mode information, the motion information deriver 332-2 may derive the motion information (motion vector and/or reference picture index, etc.) of the current block based on the received motion information information, and the prediction sample deriver 332-3 may derive the prediction samples of the current block.

The decoding apparatus generates the residual samples for the current block based on the received residual information (S830). The decoding apparatus may generate the reconstructed samples for the current block based on the prediction samples and the residual samples, and may derive the reconstructed block including the reconstructed samples (S840). The reconstructed picture for the current picture may be generated based on the reconstructed block.

Various inter prediction modes may be used for prediction of a current block in a picture. For example, various modes such as a merge mode, a skip mode, a motion vector prediction (MVP) mode, an affine mode, a subblock merge mode, or a merge with MVD (MMVD) mode may be used. In addition, a decoder side motion vector refinement (DMVR) mode, an adaptive motion vector resolution (AMVR) mode, a bi-prediction with CU-level weight, or a bi-directional optical flow (BDOF), etc., may be used in addition or instead as ancillary mods. The affine mode may be called an affine motion prediction mode. The MVP mode may be called an advanced motion vector prediction (AMVP) mode. In the present disclosure, some modes and/or motion information candidates derived by some modes may be included as one of motion information-related candidates of other modes. For example, the HMVP candidate may be added as a merge candidate of the merge/skip mode, or may be added as an mvp candidate of the MVP mode.

The prediction mode information indicating the inter prediction mode of the current block may be signaled from the encoding apparatus to the decoding apparatus. The prediction mode information may be included in the bitstream and received by the decoding apparatus. The prediction mode information may include index information indicating one of a plurality of candidate modes. Alternatively, the inter prediction mode may be indicated through hierarchical signaling of flag information. In this case, the prediction mode information may include one or more flags. For example, the skip flag may be signaled to indicate whether the skip mode is applied, the merge flag may be signaled when the skip mode is not applied to indicate whether to apply the merge mode, and it is indicated that the MVP mode is applied or the flag for additional classification may be further signaled when the merge mode is not applied. The affine mode may be signaled as an independent mode, or may be signaled as a mode dependent on the merge mode or the MVP mode. For example, the affine mode may include an affine merge mode and an affine MVP mode.

Meanwhile, the information indicating whether the above-described list0 (L0) prediction, list1 (L1) prediction, or bi-prediction is used in the current block (current coding unit) may be signaled to the current block. The information may be called the motion prediction direction information, the inter prediction direction information, or the inter prediction indication information, and may be configured/encoded/signaled in the form of, for example, an inter_pred_idc syntax element. That is, the inter_pred_idc syntax element may indicate whether the above-described list0 (L0) prediction, list1 (L1) prediction, or bi-prediction is used for the current block (current coding unit). In the present disclosure, for convenience of description, the inter prediction type (L0 prediction, L1 prediction, or BI prediction) indicated by the inter_pred_idc syntax element may be indicated as a motion prediction direction. The L0 prediction may be indicated by pred_L0, the L1 prediction may be indicated by pred_L1, and the bi prediction may be indicated by pred_BI. For example, prediction types as shown in the following table may be determined according to the value of the inter_pred_idc syntax element.

TABLE 1

| | Name of inter_pred_idc | |
|---|---|---|
| inter_pred_idc | ( cbWidth + cbHeight ) != 8 | ( cbWidth + cbHeight ) = = 8 |
| 0 | PRED_L0 | PRED_L0 |
| 1 | PRED_L1 | PRED_L1 |
| 2 | PRED_BI | n.a. |

As described above, one picture may include one or more slices. The slice may have one of slice types including an intra (I) slice, a predictive (P) slice, and a bi-predictive (B) slice. The slice type may be indicated based on slice type information. For blocks in the I slice, the inter prediction is not used for prediction, and only the intra prediction may be used. Of course, even in this case, the original sample value may be coded and signaled without the prediction. For blocks in the P slice, the intra prediction or the inter prediction may be used, and when the inter prediction is used, only uni prediction may be used. Meanwhile, for blocks in the B slice, the intra prediction or the inter prediction may be used, and when the inter prediction is used, only bi prediction may be used.

L0 and L1 may include reference pictures encoded/decoded before the current picture. For example, L0 may include reference pictures before and/or after the current picture in POC order, and L1 may include the previous pictures after and/or before the current picture in the POC order. In this case, in L0, a relatively lower reference picture index may be allocated to reference pictures before the current picture in POC order, and in L1, a relatively lower reference picture index may be allocated to reference pictures after the current picture in POC order. In the case of the B slice, the bi-prediction may be applied, and even in this case, the unidirectional bi-prediction may be applied, or the bi-directional bi-prediction may be applied. The bi-directional bi-prediction may be called true bi-prediction.

As described above, a residual block (residual samples) may be derived based on a predicted block (prediction samples) derived through the prediction at the encoding stage, and the residual information may be generated by performing the transform/quantization on the residual samples. The residual information may include information on the quantized transform coefficients. The residual information may be included in the video/image information, and the video/image information may be encoded and transmitted to the decoding apparatus in the form of the bitstream. The decoding apparatus may obtain the residual information from the bitstream, and may derive the residual samples based on the residual information. In detail, the decoding apparatus may derive the quantized transform coefficients based on the residual information, and derive the residual block (residual samples) through the dequantization/inverse transform process.

Meanwhile, at least one process of the (inverse) transform and/or (de) quantization may be omitted.

Hereinafter, the in-loop filtering process performed for the reconstructed picture will be described. The modified reconstructed sample, block, and picture (or modified filtered sample, block, picture) may be generated through the in-loop filtering process, and in the decoding apparatus, the modified (modified filtered) reconstructed picture may be output as a decoded picture, and may also be stored in the decoded picture buffer or memory of the encoding apparatus/decoding apparatus and then used as the reference picture in the inter prediction process when encoding/decoding the picture. The in-loop filtering process may include a deblocking filtering process, a sample adaptive offset (SAO) process, and/or an adaptive loop filter (ALF) process, or the like as described above. In this case, one or some of the deblocking filtering process, the sample adaptive offset (SAO) process, the adaptive loop filter (ALF) process, and the bi-lateral filter process may be sequentially applied, or all of them are sequentially may be applied. For example, after the deblocking filtering process is applied to the reconstructed picture, the SAO process may be performed. Alternatively, for example, after the deblocking filtering process is applied to the reconstructed picture, the ALF process may be performed. This may be performed in the encoding apparatus as well.

The deblocking filtering is a filtering technique that removes distortion at the boundary between blocks in the reconstructed picture. The deblocking filtering process may, for example, derive a target boundary from the reconstructed picture, determine boundary strength (bS) for the target boundary, and perform the deblocking filtering on the target boundary based on the bS. The bS may be determined based on a prediction mode of two blocks adjacent to the target boundary, a difference in motion vectors, whether the reference pictures are the same, whether a non-zero significant coefficient exists, and the like.

The SAO is a method of compensating for an offset difference between the reconstructed picture and the original picture in units of samples, and may be applied based on, for example, types such as a band offset and an edge offsetc. According to the SAO, samples may be classified into different categories according to each SAO type, and an offset value may be added to each sample based on the category. The filtering information for SAO may include information on whether the SAO is applied, the SAO type information, the SAO offset value information, and the like. The SAO may be applied to the reconstructed picture after the deblocking filtering is applied.

An adaptive loop filter (ALF) is a technique of filtering a reconstructed picture in units of samples based on filter coefficients according to filter shapes. The encoding apparatus may determine whether to apply the ALF, an ALF shape and/or an ALF filtering coefficient, etc., through comparison of the reconstructed picture and the original picture, and may signal the decoding device. That is, the filtering information for the ALF may include information on whether to apply the ALF, the ALF filter shape information, the ALF filtering coefficient information, and the like. The ALF may be applied to the reconstructed picture after the deblocking filtering is applied.

Figure 10:
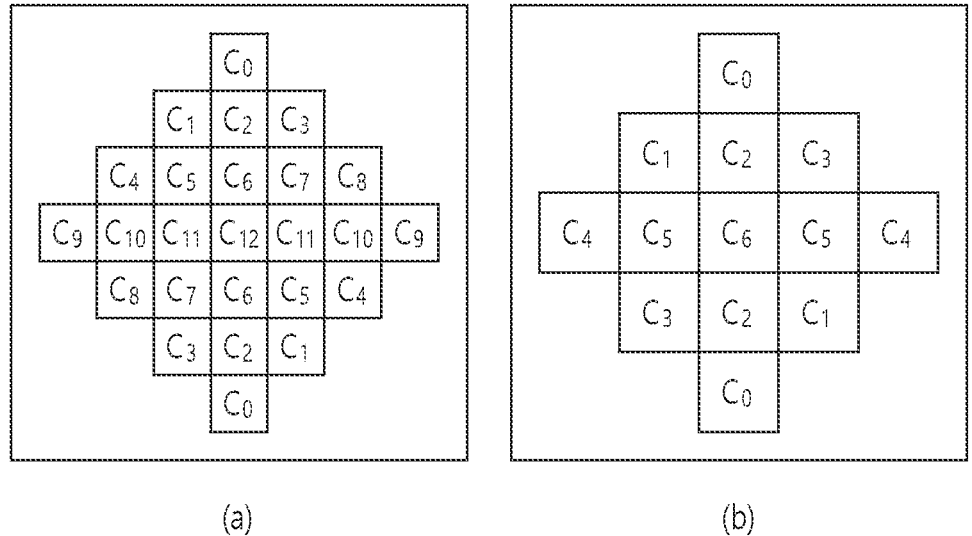
FIG. 10 is a diagram illustrating an example of a shape of an ALF filter.

FIG. 10 shows an example of the shape of the ALF filter. (a) of FIC. 10 shows the shape of a 7×7 diamond filter, (b) of FIG. 10 shows the shape of a 5×5 diamond filter. In FIG. 10, Cn in the filter shape represents a filter coefficient. When n in Cn is the same, this indicates that the same filter coefficients can be assigned. In this document, a position and/or unit to which filter coefficients are assigned according to the filter shape of the ALF may be referred to as a filter tab. In this case, one filter coefficient may be assigned to each filter tap, and the arrangement of the filter taps may correspond to the filter shape. A filter tab located at the center of the filter shape may be referred to as a center filter tab. The same filter coefficients may be assigned to two filter taps of the same n value that exist at positions corresponding to each other with respect to the center filter tap. For example, in the case of the 7×7 diamond filter shape, 25 filter taps are included, and since filter coefficients C0 to C11 are assigned in a centrally symmetric form, filter coefficients can be assigned to the 25 filter taps using only 13 filter coefficients. Also, for example, in the case of the 5×5 diamond filter shape, 13 filter taps are included, and since filter coefficients C0 to C5 are allocated in the centrally symmetrical form, filter coefficients can be allocated to the 13 filter taps using only 7 filter coefficients. For example, in order to reduce the data amount of information about signaled filter coefficients, 12 filter coefficients of the 13 filter coefficients for the 7×7 diamond filter shape are signaled (explicitly), and 1 filter coefficient can be derived (implicitly). Also, for example, 6 coefficients of 7 filter coefficients for the 5×5 diamond filter shape may be signaled (explicitly) and 1 filter coefficient may be derived (implicitly).

According to an embodiment of this document, the ALF parameter used for the ALF process may be signaled through an adaptation parameter set (APS). The ALF parameter may be derived from filter information or ALF data for the ALF.

The ALF is a type of in-loop filtering technique that can be applied in the image/video coding as described above. The ALF may be performed using a Wiener-based adaptive filter. This may be to minimize a mean square error (MSE) between original samples and decoded samples (or reconstructed samples). A high level design for an ALF tool may incorporate syntax elements accessible in the SPS and/or the slice header (or the tile group header).

In one example, before filtering for each 4×4 luma block, geometric transformations such as rotation or diagonal and vertical flipping may be applied to filter coefficients f(k, l) depending on gradient values calculated for the block and the corresponding filter clipping values c(k, l). This is equivalent to applying these transforms to the samples in the filter support area. Creating other blocks to which the ALF is applied may be similar to arranging these blocks according to their directionality.

For example, three transforms, diagonal, vertical flip, and rotation may be performed based on the following equations.

$$\text{Diagonal: } f\_D(k,l)=f(l,k), c\_D(k,l)=c(l,k) \quad \text{[Equation 1]}$$

$$\text{Vertical flip: } f\_V(k,l)=f(k,K-l-1), c\_V(k,l)=c(k,K-l-1) \quad \text{[Equation 2]}$$

$$\text{Rotation: } f\_R(k,l)=f(K-l-1,k), c\_R(k,l)=c(K-l-1,k) \quad \text{[Equation 3]}$$

In Equations 1 to 3, K may be the size of the filter. $0 \leq k$ and $1 \leq K-1$ may be coefficients coordinates. For example, (0, 0) may be upper left corner coordinates, and/or (K−1, K−1) may be lower right corner coordinates. The relationship between the transforms and four gradients in four directions may be summarized as the following table

TABLE 2

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

The ALF filter parameters may be signaled in the APS and slice header. In one APS, up to 25 luma filter coefficients and clipping value indices may be signaled. In one APS, up to 8 chroma filter coefficients and clipping value indices may be signaled. In order to reduce bit overhead, filter coefficients of different classifications for the luma component may be merged. In the slice header, indexes of APSs (referenced by the current slice) used for the current slice may be signaled.

The clipping value indexes decoded from the APS may make it possible to determine clipping values using a luma table of clipping values and a chroma table of clipping values. These clipping values may be dependent on an internal bitdepth. More specifically, the luma table of the clipping values and the chroma table of the clipping values may be derived based on the following equations $$\text{AlfClip}L=\{\text{round}(2^{B(N-n+1)N})\} \text{ for } n \in [1 \ldots N]\} \quad \text{[Equation 4]}$$

$$\text{AlfClip}C=\{\text{round}(2^{(B-8)+8((N-n))/(N-1)})) \text{ for } n \in 1 \ldots N\} \quad \text{[Equation 5]}$$

In the above equations, B may be the internal bitdepth, and N may be the number of allowed clipping values (predetermined number). For example, N may be 4.

In the slice header, up to 7 APS indexes may be signaled to indicate the luma filter sets used for the current slice. The filtering process may be further controlled at the CTB level. For example, the flag indicating whether the ALF is applied to the luma CTB may be signaled. The luma CTB may select one filter set from 16 fixed filter sets and filter sets from the APSs. The filter set index may be signaled for luma CTB to indicate which filter set is applied. The 16 fixed filter sets may be predefined and hard-coded in both the encoder and decoder.

For the chroma component, the APS index may be signaled in the slice header to indicate the chroma filter sets used for the current slice. At the CTB level, when there are two or more chroma filter sets in the APS, a filter index may be signaled for each chroma CTB.

The filter coefficients may be quantized with 128 as the norm. To limit the multiplication complexity, bitstream conformance may be applied, and thus, coefficient values of non-central position may range from 0 to 28 and/or the coefficient values of the remaining positions may range from −27 to 27−1. The center position coefficient may not be signaled in the bitstream and may be previously determined (considered) as 128.

When the ALF is available for the current block, each sample R(i, j) may be filtered, and the filtered result R'(i, j) may be expressed as the following equation.

$$R'(i,j)=R(i,j)+((\Sigma_{k=0}\Sigma_{l=0}f(k,l) \times K(R(i+k,j+l)-R(i,j),c(k,l))+64)>>7) \quad \text{[Equation 6]}$$

In the above equation, f(k, l) may be decoded filter coefficients, K(x, y) may be a clipping function, and c(k, l) may be decoded clipping parameters. For example, the variables k and/or l may vary from −L/2 to L/2. Here, L may represent a filter length. The clipping function K(x, y)=min (y, max(−y, x)) may correspond to the function Clip3(−y, y, x).

In one example, to reduce the line buffer requirement of the ALF, the modified block classification and filtering may be applied for samples adjacent to horizontal CTU boundaries. For this purpose, the virtual boundary may be defined.

Figure 11:
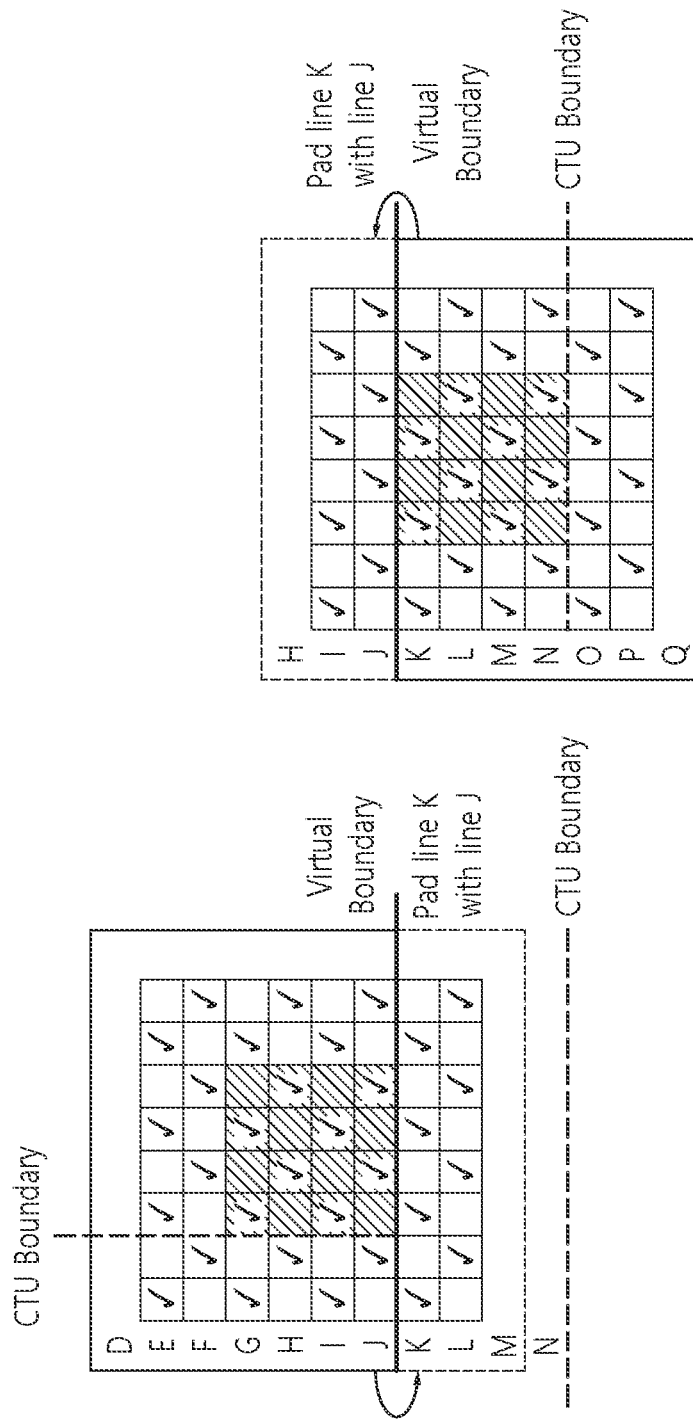
FIG. 11 is a diagram for describing a virtual boundary applied to a filtering process according to an embodiment of the present disclosure.
Figure 12:
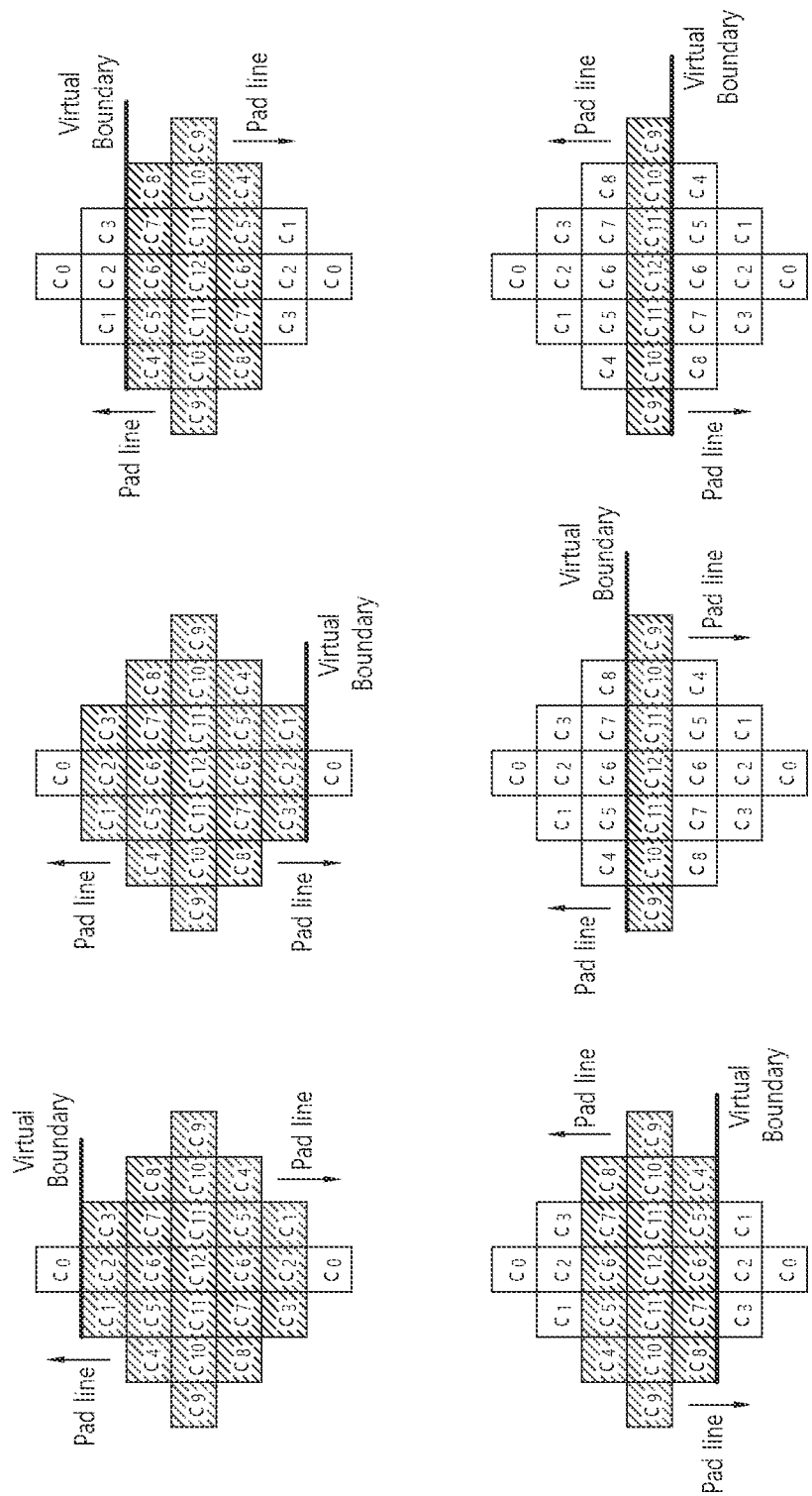
FIG. 12 is a diagram illustrating an example of an ALF process using the virtual boundary according to the embodiment of the present disclosure.

FIG. 11 is a diagram for describing a virtual boundary applied to a filtering process according to an embodiment of the present disclosure. FIG. 12 is a diagram illustrating an example of an ALF process using the virtual boundary according to the embodiment of the present disclosure. FIG. 12 will be described in conjunction with FIG. 11.

Referring to FIG. 11, the virtual boundary may be a line defined by shifting a horizontal CTU boundary by N samples. In one example, N may be 4 for a luma component, and/or N may be 2 for a chroma component.

In FIG. 11, a modified block classification may be applied to the luma component. For 1D Laplacian gradient calculation of a 4×4 block on the virtual boundary, only samples above the virtual boundary may be used. Similarly, for 1D Laplacian gradient calculation of a 4×4 block below the virtual boundary, only samples below the virtual boundary may be used. The quantization of the vitality value A may be scaled by taking into account the reduced number of samples used in the 1D Laplacian gradient calculation.

For the filtering process, a symmetric padding operation at virtual boundaries may be used for the luma and chroma components. Referring to FIG. 12, when the filtered sample is located below the virtual boundary, neighboring samples located above the virtual boundary may be padded. Meanwhile, the corresponding samples on the other side may also be symmetrically padded.

The process described according to FIG. 12 may also be used for boundaries of slices, bricks, and/or tiles when no filter is available across the boundaries. For the ALF block classification, only samples included in the same slice, brick, and/or tile may be used and the vitality value may be scaled accordingly. For the ALF filtering, the symmetrical padding may be applied for each of the horizontal and/or vertical directions relative to the horizontal and/or vertical boundaries.

Figure 13:
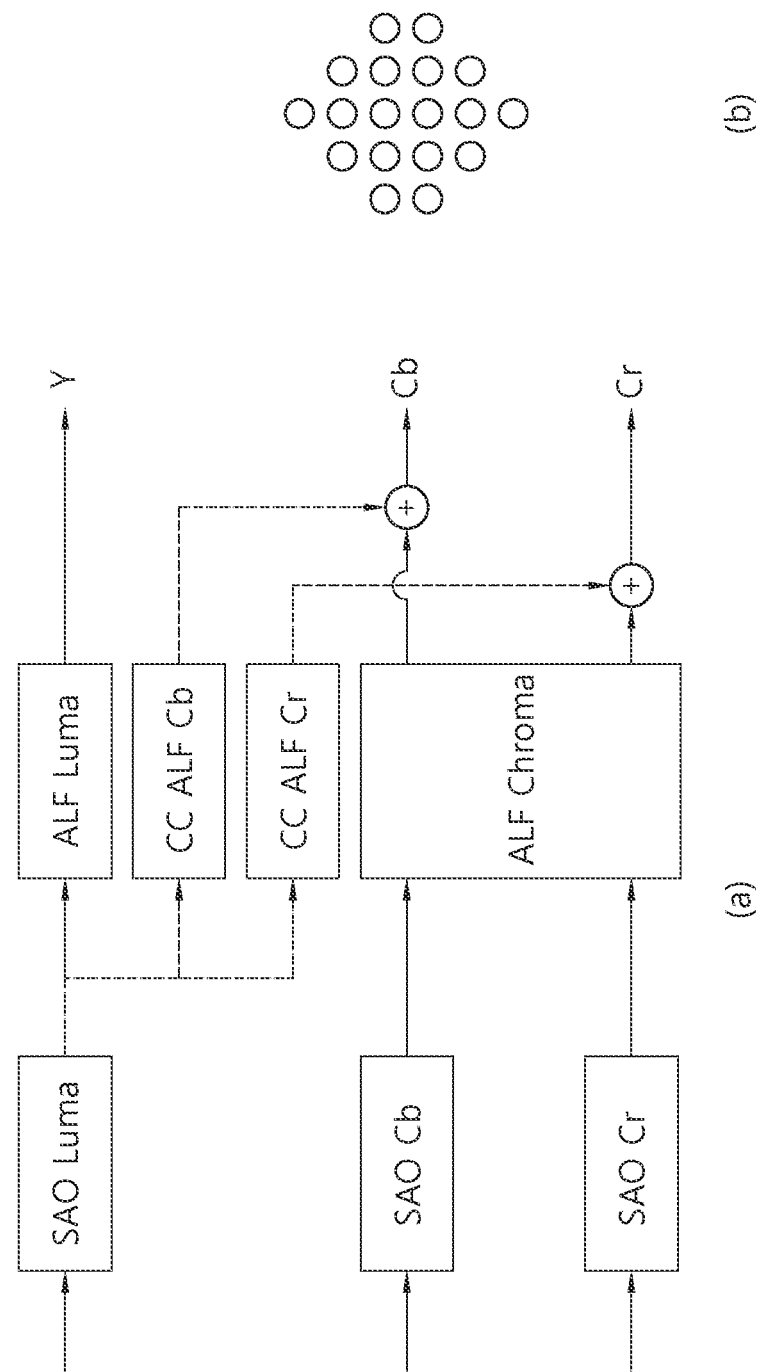
FIG. 13 is a diagram for describing a cross-component adaptive loop filtering (CC-ALF (CCALF)) process according to an embodiment of the present disclosure.

FIG. 13 is a diagram for describing a cross-component adaptive loop filtering (CCALF (CC-ALF)) process according to an embodiment of the present disclosure. The CCALF process may be referred to as a cross-component filtering process.

In one aspect, the ALF process may include a general ALF process and a CCALF process. That is, the CCALF process may be called some processes of the ALF process. In another aspect, the filtering process may include a deblocking process, a SAO process, an ALF process, and/or a CCALF process.

The CC-ALF may refine each chroma component using luma sample values. The CC-ALF is controlled by the (image) information of the bitstream, and the image information may include (a) information on the filter coefficients for each chroma component and (b) information on a mask for controlling filter application to blocks of samples. The filter coefficients may be signaled at the APS, and the block size and mask may be signaled at the slice level.

Referring to FIG. 13, the CC-ALF may operate by applying a linear diamond-shaped filter (FIG. 13B) to the luma channel for each chroma component. The filter coefficients are transmitted to the APS, scaled by a factor of 210, and rounded up for a fixed point representation. The application of the filter may be controlled at a variable block size and signaled by a context coding flag received for blocks of each sample. The block size along with the CC-ALF enable flag may be received at the slice level for each chroma component. The block size (for chroma samples) may be 16×16, 32×32, 64×64, or 128×128.

In the following embodiments, a method of re-filtering or modifying reconstructed chroma samples filtered by the ALF based on reconstructed luma samples will be proposed.

An embodiment of the present disclosure relates to filter on/off transmission and filter coefficient transmission among CC-ALFs. As described above, information (syntax element) in the syntax table disclosed in the present disclosure may be included in image/video information, may be configured/encoded in the encoding apparatus and transmitted to the decoding apparatus in the form of a bitstream. The decoding apparatus may parse/decode information (syntax element) in the corresponding syntax table. The decoding apparatus may perform a picture/image/video decoding process (specifically, for example, the CCALF process) based on the decoded information. Hereinafter, the same applies to other embodiments.

According to an embodiment of the present disclosure, in order to determine whether the CCALF is used (applied), a sequence parameter set (SPS) may include a CCALF enable flag (sps_ccalf_enable_flag). The CCALF enable flag may be transmitted independently of an ALF enabled flag (sps_alf_enabled_flag) for determining whether ALF is used (applied).

The following table shows exemplary syntax of the SPS according to the present embodiment

TABLE 3

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   gdr_enabled_flag | u(1) |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_max_in_luma_samples | ue(v) |
|   pic_height_max_in_luma_samples | ue(v) |
|   subpics_present_flag | u(1) |
|   if( subpics_present_flag ) { | |
|     max_subpics_minus1 | u(8) |
|     subpic_grid_col_width_minus1 | u(v) |
|     subpic_grid_row_height_minus1 | u(v) |
|     for( i = 0; i < NumSubPicGridRows, i++ ) | |
|       for( j = 0; j < NumSubPicGridCols, j++ ) | |
|         subpic_grid_idx[ i ][ j ] | u(v) |
|     for( i = 0; i <= NumSubPics, i++ ) { | |
|       subpic_treated_as_pic_flag[ i ] | u(1) |
|       loop_filter_across_subpic_enabled_flag[ i ] | u(1) |
|     } | |
|   } | |
|   bit_depth_luma_minus8 | ue(v) |
|   bit_depth_chroma_minus8 | ue(v) |
|   min_qp_prime_ts_minus4 | ue(v) |
|   log2_max_pic_order_cnt_lsb_minus4 | ue(v) |
|   if( sps_max_sub_layers_minus1 > 0 ) | |
|     sps_sub_layer_ordering_info_present_flag | u(1) |
|   for( i = ( sps_sub_layer_ordering_info_present_flag ? 0 : | |
|   sps_max_sub_layers_minus1 ); | |
|     i <= sps_max_sub_layers_minus1, i++ ) { | |

TABLE 3-continued

| | Descriptor |
|---|---|
|     sps_max_dec_pic_buffering_minus1[ i ] | ue(v) |
|     sps_max_num_reorder_pics[ i ] | ue(v) |
|     sps_max_latency_increase_plus1[ i ] | ue(v) |
| } | |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++ ) { | |
|     num_ref_pic_lists_in_sps[ i ] | ue(v) |
|     for( j = 0; j < num_ref_pic_lists_in_sps[ i ]; j++) | |
|       ref_pic_list_struct( i, j ) | |
| } | |
| if( ChromaArrayType != 0 ) | |
|     qtbtt_dual_tree_intra_flag | u(1) |
| log2_ctu_size_minus5 | u(2) |
| log2_min_luma_coding_block size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
|     sps_log2_diff_max_bt_min_qt_intra_slice_luma | ue(v) |
|     sps_log2_diff_max_tt_min_qt_intra_slice_luma | ue(v) |
| } | |
| if( sps_max_mtt_hierarchy_depth_inter_slices != 0 ) { | |
|     sps_log2_diff_max_bt_min_qt_inter_slice | ue(v) |
|     sps_log2_diff_max_tt_min_qt_inter_slice | ue(v) |
| } | |
| if( qtbtt_dual_tree_intra_flag ) { | |
|     sps_log2_diff_min_qt_min_cb_intra slice_chroma | ue(v) |
|     sps_max_mtt_hierarchy_depth_intra_slice_chroma | ue(v) |
|     if ( sps_max_mtt_ hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|     } | |
| } | |
| sps_max_luma_transform_size_64_flag | u(1) |
| if( ChromaArrayType != 0 ) { | |
|     same_qp_table_for_chroma | u(1) |
|     for( i = 0; i < same_qp_table_for_chroma ? 1 : 3; i++ ) { | |
|       num_points_in_qp_table_minus1[ i ] | ue(v) |
|       for( j = 0; j <= num_points_in_qp_table_minus1[ i ]; j++ ) { | |
|         delta_qp_in_val_minus1[ i ][ j ] | ue(v) |
|         delta_qp_out_val[ i ][ j ] | ue(v) |
|       } | |
|     } | |
| } | |
| sps_weighted_pred_flag | u(1) |
| sps_weighted_bipred_flag | u(1) |
| sps_sao_enabled_flag | u(1) |
| sps_alf_enabled_flag | u(1) |
| sps_ccalf_enabled_flag | u(1) |
| sps_transform_skip_enabled_flag | u(1) |
| if( sps_transfom_skip_enabled_flag ) | |
|     sps_bdpcm_enabled_flag | u(1) |
| sps_joint_cbcr_enabled_flag | u(1) |
| sps_ref_wraparound_enabled_flag | u(1) |
| if( sps_ref_wraparound_enabled_flag ) | |
|     sps_ref_wraparound_offset_minus1 | ue(v) |
| sps_temporal_mvp_enabled_flag | u(1) |
| if( sps_temporal_mvp_enabled_flag ) | |
|     sps_sbtmvp_enabled_flag | u(1) |
| sps_amvr_enabled_flag | u(1) |
| sps_bdof_enabled_flag | u(1) |
| sps_smvd_enabled_flag | u(1) |
| sps_dmvr_enabled_flag | u(1) |
| if( sps_bdof_enabled_flag \|\| sps_dmvr_enabled_flag) | |
|     sps_bdof_dmvr_slice_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0 ) | |
|     sps_cclm_enabled_flag | u(1) |
|     if( sps_cclm_enabled_flag && chroma_format_idc == 1 ) | |
|       sps_cclm_colocated_chroma_flag | u(1) |

TABLE 3-continued

|  | Descriptor |
|---|---|
| sps_mts_enabled_flag | u(1) |
| if( sps_mts_enabled_flag ) { |  |
|    sps_explicit_mts_intra_enabled_flag | u(1) |
|    sps_explicit_mts_inter_enabled_flag | u(1) |
| } |  |
| sps_sbt_enabled_flag | u(1) |
| if( sps_sbt_enabled_flag ) |  |
|    sps_sbt_max_size_64_flag | u(1) |
| sps_affine_enabled_flag | u(1) |
| if( sps_affine_enabled_flag ) { |  |
|    sps_affine_ type_flag | u(1) |
|    sps_affine_amvr_enabled_flag | u(1) |
|    sps_affine_prof_enabled_flag | u(1) |
| } |  |
| if( chroma_format_idc = = 3 ) |  |
|    sps_palette_enabled_flag | u(1) |
| sps_bcw_enabled_flag | u(1) |
| sps_ibc_enabled_flag | u(1) |
| sps_ciip_enabled_flag | u(1) |
| if( sps_mmvd_enabled_flag ) |  |
|    sps_fpel_mmvd_enabled_flag | u(1) |
| sps_triangle_enabled_flag | u(1) |
| sps_lmcs_enabled_flag | u(1) |
| sps_lfnst_enabled_flag | u(1) |
| sps_ladf_enabled_flag | u(1) |
| if ( sps_ladf_enabled_flag ) { |  |
|    sps_num_ladf_intervals_minus2 | u(2) |
|    sps_ladf_lowest_interval_qp_offset | se(v) |
|    for( i = 0; i < sps_num_ladf_intervals_minus2 + 1; i++ ) { |  |
|      sps_ladf_qp_offset[ i ] | se(v) |
|      sps_ladf_delta_threshold_minus1[ i ] | ue(v) |
|    } |  |
| } |  |
| sps_scaling_list_enabled_flag | u(1) |
| hrd_parameters_present_flag | u(1) |
| if( general_hrd_parameters_present_flag ) { |  |
|    num_units_in_tick | u(32) |
|    time_scale | u(32) |
|    sub_layer_cpb_parameters_present_flag | u(1) |
|    if( sub_layer_cpb_parameters_present_flag ) |  |
|      general_hrd_parameters( 0, sps_max, sub_layers_minus1 ) |  |
|    else |  |
|      general_hrd_parameters( sps_max_sub_layers_minus1, |  |
|      sps_max_sub_layers_minus1 ) |  |
| } |  |
| vui_parameters_present_flag | u(1) |
| if( vui_parameters_present_flag ) |  |
|    vui_parameters( ) |  |
| sps_extension_flag | u(1) |
| if( sps_extension_flag ) |  |
|    while( more_rbsp_data( ) ) |  |
|      sps_extension_data_flag | u(1) |
| rbsp_trailing_bits( ) |  |
| } |  |

The following table shows exemplary semantics regarding the CC-ALF enable flag included in the table. The CC-ALF enable flag may indicate (may be related to) whether the CC-ALF is enabled.

TABLE 4 sps_ccalf_enabled_flag equal to 0 specifies that the cross component adaptive loop filter is disabled.
sps_ccalf_enabled_flag equal to 1 specifies that the cross component adaptive loop filter is enabled.

10

In another example of this embodiment, when the CC-ALF enable flag is transmitted, the condition for ChromaArrayType may be determined as shown in the following table.

TABLE 5

|  | Descriptor |
|---|---|
| seq_parameter_set_rbsp( ) { |  |
|   sps_decoding_parameter_set_id | u (4) |
|   sps_video_parameter_set_id | u (4) |
|   sps_max_sub_layers_minus1 | u (3) |
|   sps_reserved_zero_5bits | u (5) |
|   profile_tier_level( sps_max_sub_layers_minus1 ) |  |
|   gdr_enabled_flag | u (1) |
|   sps_seq_parameter_set_id | ue (v) |
|   chroma_format_idc | ue (v) |
|   if( chroma_format_idc = = 3 ) |  |
|     separate_colour_plane_flag | u (1) |
|   pic_width_max_in_luma_samples | ue (v) |
|   pic_height_max_in_luma_samples | ue (v) |
|   subpics_present_flag | u (1) |
|   if( subpics_present_flag ) { |  |
|     max_subpics_minus1 | u (8) |
|     subpic_grid_col_width_minus1 | u (v) |
|     subpic_grid_row_height_minus1 | u (v) |
|     for( i = 0; i < NumSubPicGridRows; i++ ) |  |
|       for( j = 0; j < NumSubPicGridCols; j++ ) |  |
|         subpic_grid_idx[ i ][ j ] | u (v) |
|     for( i = 0; i <= NumSubPics; i++ ) { |  |
|       subpic_treated_as_pic_flag[ i ] | u (1) |
|       loop_filter_across_subpic_enabled_flag[ i ] | u (1) |
|     } |  |
|   } |  |
|   bit_depth_luma_minus8 | ue (v) |
|   bit_depth_chroma_minus8 | ue (v) |
|   min_qp_prime_ts_minus4 | ue (v) |
|   log2_max_pic_order_cnt_lsb_minus4 | ue (v) |
|   if( sps_max_sub_layers_minus1 > 0 ) |  |
|     sps_sub_layer_ordering_info_present_flag | u (1) |
|   for( i =( sps_sub_layer_ordering_info_present_flag ? 0 : sps_max_sub_layers_minus1 ); |  |
|     i <= sps_max_sub_layers_minus1; i++ ) { |  |
|     sps_max_dec_pic_buffering_minus1[ i ] | ue (v) |
|     sps_max_num_reorder_pics[ i ] | ue (v) |
|     sps_max_latency_increase_plus1[ i ] | ue (v) |
|   } |  |
|   long_term_ref_pics_flag | u (1) |
|   inter_layer_ref_pics_present_flag | u (1) |
|   sps_idr_rpl_present_flag | u (1) |
|   rpl1_same_as_rpl0_flag | u (1) |
|   for( i = 0; i < !rpl1_same_as_rpl0_flag ? 2 : 1; i++ ) } |  |
|     num_ref_pic_lists_in_sps[ i ] | ue (v) |
|     for( j = 0; j < num_ref_pic_lists_in_sps[ i ]; j++ ) |  |
| ref_pic_list_struct( i, j ) |  |
|   } |  |
|   if( ChromaArrag. Type != 0 ) |  |
|     qtbtt_dual_tree_intra_flag | u (1) |
|   log2_ctu_size_minus5 | u (2) |
|   log2_min_luma_coding_block_size_minus2 | ue (v) |
|   partition_constraints_override_enabled_flag | u (1) |
|   sps_log2_diff_min_qt_min_cb_intra_slice_luma | ue (v) |
|   sps_log2_diff_min_qt_min_cb_inter_slice | ue (v) |
|   sps_max_mtt_hierarchy_depth_inter_slice | ue (v) |
|   sps_max_mtt_hierarchy_depth_intra_slice_luma | ue (v) |
|   if( sps_max_mtt_hierarchy_depth_intra_slice_luma != 0 ) { |  |
|     sps_log2_diff_max_bt_min_qt_intra_slice_luma | ue (v) |
|     sps_log2_diff_max_tt_min_qt_intra_slice_luma | ue (v) |

TABLE 5-continued

| | Descriptor |
|---|---|
| } | |
| if( sps_max_mtt_hierarchy_depth_inter_slices != 0 ) { | |
|   sps_log2_diff_max_bt_min_qt_inter_slice | ue (v) |
|   sps_log2_diff_max_tt_min_qt_inter_slice | ue (v) |
| } | |
| if( qtbtt_dual_tree_intra_flag ) { | |
|   sps_log2_diff_min_qt_min_cb_intra_slice_chroma | ue (v) |
|   sps_max_mtt_hierarchy_depth_intra_slice_chroma | ue (v) |
|   if ( sps_max_mtt_hierarchy_depthintra_slice_chroma != 0 ) { | |
|     sps_log2_diff_max_bt_min_qt_intra_slice_chroma | uc (v) |
|     sps_log2_diff_max_tt_min_qt_intra_slice_chroma | ue (v) |
|   } | |
| } | |
| sps_max_luma_transform_size_64_flag | u (1) |
| if( ChromaArrayType != 0 ) { | |
|   same_qp_table_for_chroma | u (1) |
|   for( i = 0; i < same_qp_table_for_chroma ? 1 : 3; i++ ) { | |
|     num_points_in_qp_table_minus1[ i ] | uc (v) |
|     for( j = 0; j <= num_points_in_qp_table_minus1 [ i ]; j++ ) { | |
|       delta_qp_in_val_minus1[ i ][ j ] | ue (v) |
|       delta_qp_out_val[ i ][ j ] | ue (v) |
|     } | |
|   } | |
| } | |
| sps_weighted_pred_flag | u (1) |
| sps_weighted_bipred_flag | u (1) |
| sps_sao_enabled_flag | u (1) |
| sps_alf_enabled_flag | u (1) |
| if (ChromaArrayType != 0 ) | |
|   sps_ccalf_enabled_flag | u (1) |
| sps_transform_skip_enabled_flag | u (1) |
| if( sps_transform_skip_enabled_flag ) | |
|   sps_bdpcm_enabled_flag | u (1) |
| sps_joint_cbcr_enabled_flag | u (1) |
| sps_ref_wraparound_enabled_flag | u (1) |
| if( sps_ref_wraparound_enabled_flag ) | |
|   sps_ref_wraparound_offset_minus1 | ue (v) |
| sps_temporal_mvp_enabled_flag, | u (1) |
| if( sps_temporal_mvp_enabled_flag ) | |
|   sps_sbtmvp_enabled_flag | u (1) |
| sps_amvr_enabled_flag | u (1) |
| sps_bdof_enabled_flag | u (1) |
| sps_smvd_enabled_flag | u (1) |
| sps_dmvr_enabled_flag | u (1) |
| if( sps_bdof_enabled_flag | | sps_dmvr_enabled_flag) | |
|   sps_bdof_dmvr_slice_present_flag | u (1) |
| sps_mmvd_enabled_flag | u (1) |
| sps_isp_enabled_flag | u (1) |
| sps_mrl_enabled_flag | u (1) |
| sps_mip_enabled_flag | u (1) |
| if( ChromaArrayType != 0 ) | |
|   sps_cclm_enabled_flag | u (1) |
|   if( sps_cclm_enabled_flag && chroma_format_idc == 1 ) | |
|     sps_cclm_colocated_chroma_flag | u (1) |
| sps_mts_enabled_flag | u (1) |
| if( sps_mts_enabled_flag ) { | |
|   sps_explicit_mts_intra_enabled_flag | u (1) |
|   sps_explicit_mts_inter_enabled_flag | u (1) |
| } | |
| sps_sbt_enabled_flag | u (1) |
| if( sps_sbt_enabled_flag ) | |
|   sps_sbt_max_size_64_flag | u (1) |
| sps_affine_enabled_flag | u (1) |
| if( sps_affine_enabled_flag ) { | |
|   sps_affine_type_flag | u (1) |
|   sps_affine_amvr_enabled_flag | u (1) |
|   sps_affine_prof_enabled_flag | u (1) |
| } | |
| if( chroma_format_idc == 3 ) | |
| sps_palette_enabled_flag | u (1) |
| sps_bcw_enabled_flag | u (1) |
| sps_ibc_enabled_flag | u (1) |
| sps_ciip_enabled_flag | u (1) |
| if( sps_mmvd_enabled_flag ) | |
|   sps_fpel_mmvd_enabled_flag | u (1) |
| sps_triangle_enabled_flag | u (1) |
| sps_lmcs_enabled_flag | u (1) |
| sps_lfnst_enabled_flag | u (1) |

TABLE 5-continued

| | Descriptor |
|---|---|
| sps_ladf_enabled_flag | u (1) |
| if ( sps_ladf_enabled_flag ) { | |
|   sps_num_ladf_intervals_minus2 | u (2) |
|   sps_ladf_lowest_interval_qp_offset | se (v) |
|   for( i = 0 i < sps_num_ladf_intervals_minus2 + 1; i++ ) { | |
|     sps_ladf_qp_offset[ i ] | se (v) |
|     sps_ladf_delta_threshold_minus1[ i ] | ue (v) |
|   } | |
| } | |
| sps_scaling_list_enabled_flag | u (1) |
| hrd_parameters_present_flag | u (1) |
| if( general_hrd_parameters_present_flag ) { | |
|   num_units_in_tick | u (32) |
|   time_scale | u (32) |
|   sub_layer_cpb_parameters_present_flag | u (1) |
|   if( sub_layer_cpb_parameters_present_flag) | |
|     general_hrd_parameters( 0, sps_max_sub_layers_minus1 ) | |
|   else | |
|     general_hrd_parameters( sps_max_sub_layers_minus1, sps_max_sub_layers_minus1 ) | |
| } | |
| vui_parameters_present_flag | u (1) |
| if( vui_parameters_present_flag) | |
|   vui_parameters( ) | |
| sps_extension_flag | u (1) |
| if( sps_extension_flag ) | |
|   while( more_rbsp_data( ) ) | |
|     sps_extension_data_flag | u (1) |
| rbsp_trailing_bits( ) | |
| } | |

Referring to the table above, when ChromaArrayType is not 0, the SPS may include the CC-ALF enable flag. For example, when ChromaArrayType is not 0, the chroma format may not be monochrome, and in this case, the CCALF enable flag may be transmitted through the SPS.

The following table shows exemplary semantics of the CC-ALF enable flag included in the table.

TABLE 6 sps_ccalf_enabled_flag equal to 0 specifies that the cross component adaptive loop filter is disabled.
sps_ccalf_enabled_flag equal to 1 specifies that the cross component adaptive loop filter is enabled.

The image information may include the SPS. The SPS may include a first ALF enable flag (sps_alf_enabled_flag) related to whether the ALF is enabled. For example, based on the determination that a value of the first ALF enable flag is 1, the SPS may include a CCALF enable flag related to whether the cross-component filtering is enabled.

In an embodiment of the present disclosure, general constraint information for defining a profile and level may include a constraint flag for the CC-ALF. In one example, the syntax of the general constraint information may be expressed as in the following table.

TABLE 7

| | Descriptor |
|---|---|
| general_constraint_info( ) { | |
|   general_progressive_source_flag | u (1) |
|   general_interlaced_source_flag | u (1) |
|   general_non_packed_constrain_flag | u (1) |
|   general_frame_only_constraint_flag | u (1) |
|   intro_only_constraint_flag | u (1) |
|   max_bitdepth_constraint_idc | u (4) |
|   max_chroma_format_constraint_idc | u (2) |
|   frame_only_constraint_flag | u (1) |
|   no_qtbtt_dual_tree_intra_constraint_flag | u (1) |

TABLE 7-continued

| | Descriptor |
|---|---|
|   no_partition_constraints_override_constraint_flag | u (1) |
|   no_sao_constraint_flag | u (1) |
|   no_alf_constraint_flag | u (1) |
|   no_ccalf_constraint_flag | u (1) |
|   no_joint_cber_constraint_flag | u (1) |
|   no_ref_wraparound_constraint_flag | u (1) |
|   no_temporal_mvp_constraint_flag | u (1) |
|   no_sbtmvp_constraint_flag | u (1) |
|   no_amvr_constraint_flag | u (1) |
|   no_bdof_constraint_flag | u (1) |
|   no_dmvr_constraint_flag | u (1) |
|   no_cclm_constraint_flag | u (1) |
|   no_mts_constraint_flag | u (1) |
|   no_sbt_constraint_flag | u (1) |
|   no_affine_motion_constraint_flag | u (1) |
|   no_bcw_constraint_flag | u (1) |
|   no_ibc_constraint_flag | u (1) |
|   no_ciip_constraint_flag | u (1) |
|   no_fpel_mmvd_constraint_flag | u (1) |
|   no_triangle_constraint_flag | u (1) |
|   no_ladf_constraint_flag | u (1) |
|   no_transform_skip_constraint_flag | u (1) |
|   no_bdpcm_constraint_flag | u (1) |
|   no_qp_delta_constraint_flag | u (1) |

TABLE 7-continued

| | Descriptor |
|---|---|
| no_dcp_quant_constraint_flag | u (1) |
| no_sign_data_hiding_constraint_flag | u (1) |
| // ADD reserved bits for future extensions | |
| while( !byte_aligned( ) ) | |
| gci_alignment_zero_bit | f (1) |
| } | |

The following table shows exemplary semantics of the CC-ALF constraint flag included in the table.

TABLE 8 no_ccalf_enabled_flag equal to 1 specifies that sps_ccalf_enabled_flag shall be equal to 0.
no_ccalf_constraint_flag equal to 0 does not impose a constraint.

The image information may include the general constraint information. For example, the general constraint information may include a CCALF constraint flag for constraining the cross-component filtering based on the value of the CCALF enable flag included in the SPS. When the value of the CCALF constraint flag is 0, the CCALF constraint may not be applied. The CCALF constraint flag having a value of 1 may indicate that the value of the CCALF enable flag included in the SPS is 0.

According to an embodiment of the present disclosure, a slice_cross_component_alf_cb_enabled_flag flag may be added in unit of slices to determine whether the CC-ALF is used. The slice_cross_component_alf_cb_enabled_flag flag may be transmitted when the sps_ccalf_enabled_flag flag is 1. Alternatively, the slice_ccalf_enable_flag flag may be transmitted when the sps_ccalf_enabled_flag flag is 1 and ChromaArrayType is not 0.

For example, when the slice_cross_component_alf_cb_enabled_flag flag value is 1, the syntax slice_cross_component_alf_cb_reuse_temporal_layer_filter may be additionally transmitted. When this syntax value is 0, the syntax slice_cross_component_alf_cb_aps_id may be transmitted. The slice_cross_component_alf_cb_log2_control_size_minus4 syntax for the block size for CC-ALF may be transmitted.

The following table is an exemplary syntax of slice header information according to the above-described embodiment.

TABLE 9

| | Descriptor |
|---|---|
| slice_header( ) { | |
|   slice_pic_parameter_set_id | ue (v) |
|   if( rect_slice_flag \| \| NumBricksInPic > 1 ) | |
|     slice_address | u (v) |
|   if( !rect_slice_flag && !single_brick_per_slice_flag ) | |
|     num_bricks_in_slice_minus1 | uc (v) |
|   non_reference_picture_flag | u (1) |
|   slice_type | ue (v) |
|   if( separate_colour_plane_flag = = 1 ) | |
|     colour_plane_id | u (2) |
|   slice_pic_order_cnt_lsb | u (v) |
|   if( nal_unit_type = = GDR_NUT ) | |
|     recovery_poc_cnt | ue (v) |
|   if( nal_unit_type = = IDR_W_RADL \| \| nal_unit_type = = IDR_N_LP \| \| | |
|     nal_unit_type = = CRA_NUT \| \| NalUnitType = = GDR_NUT ) | |
|     no_output_of_prior_pics_flag | u (1) |
|   if( output_flag_present_flag ) | |
|     pic_output_flag | u (1) |
|   if( ( nal_unit_type != IDR_W_RADL && nal_unit_type != IDR_N_LP ) \| \| | |
|     sps_idr_rpl_present_flag ) { | |
|     for( i = 0; i < 2; i++ ) { | |
|       if( num_ref_pic_lists_in_sps[ i ] > 0 && !pps_ref_pic_list_sps_idc[ i ] && | |
|         ( i = = 0 \| \| ( i = = 1 && rpl1_idx_present_flag ) ) ) | |
|         ref_pic_list_sps_flag[ i ] | u (1) |
|       if( ref_pic_list_sps_flag[ i ] ) { | |
|         if( num_ref_pic_lists_in_sps[ i ] > 1 && | |
|           ( i = = 0 \| \| ( i = = 1 && rpl1_idx_present_flag ) ) ) | |
|         ref_pic_list_idx[ i ] | u (v) |
|       } else | |
|         ref_pic_list_struct( i, num_ref_pic_lists_in_sps[ i ] ) | |
|       for( j = 0; j < NumLtrpEntries[ i ][ RplsIdx[ i ] ]; j++ ) { | |
|         if( ltrp_in_slice_fteader_flag[ i ][ RplsIdx[ i ] ] ) | |
|           slice_poc_lsb_lt[ i ][ j ] | u (v) |
|         delta_poc_msb_present_flag[ i ][ j ] | u (1) |
|         if( delta_poc_msb_present_flag[ i ][ j ] ) | |
|           delta_poc_msb_cycle_lt[ i ][ j ] | ue (v) |
|       } | |
|     } | |

TABLE 9-continued

| | Descriptor |
|---|---|
| `if ( ( slice_type != I && num_ref_entries[ 0 ][ RplsIdx[ 0 ] ] > 1 ) ||` | |
| `    ( slice_type = = B && num_ref_entries[ 1 ][ RplsIdx[ 1 ] ] > 1 ) ) {` | |
| `    num_ref_idx_adive_override_flag` | u (1) |
| `    if( num_ref_idx_active_override_flag )` | |
| `        for( i = 0; i < ( slice_type = = B ? 2: 1 ); i++ )` | |
| `            if( num_ref_entries[ i ][ RplsIdx[ i ] ] > 1 )` | |
| `num_ref_idx_active_minus1[ i ]` | ue (v) |
| `    }` | |
| `}` | |
| `if( partition_constraints_override_enabled_flag ) {` | |
| `    partition_constraints_override_flag` | ue (v) |
| `    if( partition_constraints_override_flag ) {` | |
| `        slice_log2_diff_min_qt_min_cb_luma` | ue (v) |
| `        slice_max_mtt_hierarchy_depth_luma` | ue (v) |
| `        if( slice_max_mtt_hierarchy_depth_luma != 0 )` | |
| `            slice_log2_diff_max_bt_min_qt_luma` | ue (v) |
| `            slice_log2_diff_max_tt_min_qt_luma` | ue (v) |
| `        }` | |
| `        if( slice_type = = I && qtbtt_dual_tree_intra_flag ) {` | |
| `            slice_log2_diff_min_qt_min_cb_chroma` | ue (v) |
| `            slice_max_mtt_hierarchy_depth_chroma` | uc (v) |
| `            if( slice_max_mtt_hierarchy_depth_chroma != 0 )` | |
| `                slice_log2_diff_max_ht_min_qt_chroma` | ue (v) |
| `                slice_log2_diff_max_tt_min_qt_chroma` | ue (v) |
| `        }` | |
| `    }` | |
| `}` | |
| `if ( slice_type != I ) {` | |
| `    if( sps_temporal_mvp_enabled_flag && !pps_temporal_mvp_enabled_idc )` | |
| `        slice_temporal_mvp_enabled_flag` | u (1) |
| `    if( slice_type = = B && !pps_mvd_l1_zero_idc )` | |
| `        mvd_l1_zero_flag` | u (1) |
| `    if( cabac_init_present_flag )` | |
| `        cabac_init_flag` | u (1) |
| `    if( slice_temporal_mvp_enabled_flag ) {` | |
| `        if( slice_type = = B && !pps_collocated_from_l0_idc )` | |
| `            collocated_from_l0_flag` | u (1) |
| `        if( ( collocated_from_l0_flag && NumRefIdxActive [ 0 ] > 1 ) ||` | |
| `            ( !collocated_from_l0_flag && NumRefIdxActive[ 1 ] > 1 ) )` | |
| `            collocated_ref_idx` | ue (v) |
| `    }` | |
| `    if( ( pps_weighted_pred_flag && slice_type = = P ) ||` | |
| `        ( pps_weighted_bipred_flag && slice_type = = B ) )` | |
| `        pred_weight_table( )` | |
| `    if( !pps_six_minus_max_num_merge_cand_plus1 )` | |
| `        six_minus_max_num_merge_cand` | u (v) |
| `    if( sps_affine_enabled_flag &&` | |
| `        !pps_five_minus_max_num_subblock_merge_cand_plus1 )` | |
| `        five_minus_max_num_subblock_merge_cand` | ue (v) |
| `    if( sps_fpel_mmvd_enabled_flag )` | |
| `        slice_fpel_mmvd_enabled_flag` | u (1) |
| `    if( sps_bdof_dmvr_slice_present_flag )` | |
| `        slice_disable_bdof_dmvr_flag` | u (1) |
| `    if( sps_triangle_enabled_flag && MaxNumMergeCand >= 2 &&` | |
| `        !pps_max_num_merge_cand_minus_max_num_triangle_card_minus1 )` | |
| `        max_num_merge_cand_minus_max_num_triangle_cand` | ue (v) |
| `}` | |
| `if ( sps_ibc_enabled_flag )` | |
| `    slice_six_minus_max_num_ibc_merge_cand` | ue (v) |
| `if( sps_joint_cbcr_enabled_flag )` | |
| `    slice_joint_cbcr_sign_flag` | u (1) |
| `slice_qp_delta` | se (v) |
| `if( pps_slice_chroma_qp_offsets_present_flag ) {` | |
| `    slice_cb_qp_offset` | se (v) |
| `    slice_cr_qp_offset` | se (v) |
| `    if( sps_joint_cbcr_enabled_flag )` | |
| `        slice_joint_cbcr_qp_offset` | se (v) |
| `}` | |
| `if( sps_sao_enabled_flag ) {` | |
| `    slice_sao_luma_flag` | u (1) |
| `    if( ChromaArrayType != 0 )` | |
| `        slice_sao_chroma_flag` | u (1) |
| `}` | |
| `if( sps_alf_enabled_flag ) {` | |
| `    slice_alf_enabled_flag` | u (I) |
| `    if( slice_alf_enabled_flag ) {` | |
| `        slice_num_alf_aps_ids_luma` | u (3) |

TABLE 9-continued

| | Descriptor |
|---|---|
|     for( i = 0; i < slice_num_alf_aps_ids_luma; i++ ) | |
|       slice_alf_aps_id_luma[ i ] | u (3) |
|     if( ChromaArrayType != 0 ) | |
|       slice_alf_chroma_idc | u (2) |
|     if( slice_alf_chroma_idc ) | |
|       slice_alf_aps_id_chroma | u (3) |
|   } | |
| } | |
| if( sps_ccalf_enabled_flag ) { | |
|   slice_cross_component_alf_cb_enabled_flag | u (1) |
|   if( slice_cross_component_alf_cb_enabled_flag ) { | |
|     slice_cross_component_alf_cb_reuse_temporal_layer_filter | u (1) |
|     if (!slice_cross_component_alf_cb_reuse_temporal_layer_filter ) | |
|       slice_cross_component_alf_cb_aps_id | u (5) |
|     slice_cross_component_alf_cb_log2_control_size_minus4 | ue (v) |
|   } | |
|   slice_cross_component_alf_cr_enabled_flag | u (1) |
|   if( slice_cross_component_alf_cr_enabled_flag ) { | |
|     slice_cross_component_alf_ct_reuse_temporal_layer_filter | u (1) |
|     if (!slice_cross_component_alf_cr_reuse_temporal_layer_filter ) | |
|       slice_cross_component_alf_cr_aps_id | u (5) |
|     slice_cross_component_alf_cr_log2_control_size_minus4 | ue (v) |
|   } | |
| } | |
|   dep_quant_enabled_flag | u (1) |
| if( !dep_quant_enabled_flag ) | |
|   sign_data_hiding_enabled_flag | u (1) |
| if( deblocking_filter_override_enabled_flag ) | |
|   deblocking_filter_override_flag | u (1) |
| if( deblocking_filter_override_flag ) { | |
|   slice_deblocking_filter_disabled_flag | u (1) |
|   if( !slice_deblocking_filter_disabled_flag ) { | |
|   slice_beta_offset_div2 | se (v) |
|   slice_tc_offset_div2 | se (v) |
|   } | |
| } | |
| if( sps_lmcs_enabled_flag ) { | |
|   slice_lmcs_enabled_flag | u (1) |
|   if( slice_lmcs_enabled_flag ) { | |
|     slice_lmcs_aps_id | u (2) |
|     if( ChromaArrayType != 0 ) | |
|       slice_chroma_residual_scale_flag | u (1) |
|   } | |
| } | |
| if( sps_scaling_list_enabled_flag ) { | |
|   slice_scaling_list_present_flag | u (1) |
|   if( slice_scaling_list_present_flag ) | |
|     slice_scaling_list_aps_id | u (3) |
| } | |
| if( entry_point_offsets_present_flag && NumEntryPoints > 0 ) { | |
|   offset_len_minus1 | ue (v) |
|   for( i = 0; 1 < NumEntryPoints; i++ ) | |
|     entry_point_offset_minus1[ i ] | u (v) |
| } | |
| if( slice_header_extension_present_flag ) { | |
|   slice_header_extension_length | ue (v) |
|   for( i = 0; i < slice_header_extension_length; i++ ) | |
|     slice_header_extension_data_byte[ i ] | u (8) |
| } | |
| byte_alignment( ) | |
| } | |

The following table shows exemplary semantics for syntax elements included in the table.

TABLE 10 slice_cross_component_alf_cb_enabled_flag equal to 0 specifies that the cross-component Cb filter is not applied to Cb colour component slice_cross_component_alf_cb_enabled_flag equal to 1 indicates that the cross-component Cb filter is applied to the Cb colour component.

slice_cross_component_alf_cr_enabled_flag equal to 0 specifies that the cross-component Cr filter is not applied to Cr colour component. slice_cross_component_alf_cb_enabled_flag equal to 1 indicates that the cross-component Cr filter is applied to the Cr colour component.

TABLE 10-continued slice_cross_component_alf_cb_reuse_temporal_layer_filter equal to 1 specifies that the cross
component Cb filter coefficients, with j = 0..13, inclusive is set equal to
AlfCCTemporalCoeff$_{Cb}$[ TemporalId ][ j ].
slice_cross_component_alf_cb_reuse_temporal_layer_filter equal to 0 and
slice_cross_component_alf_cb_enabled_flag is equal to 1 specifies that the syntax element
slice_cross_component_alf_cb_aps_id is present in slice header.
When slice_cross_component_alf_cb_enabled_flag is equal to 1, and
slice_cross_component_alf_cb_reuse_temporal_layer_filter is equal to 0, the elements of
AlfCCTemporalCoeff$_{Cb}$[ TemporalId ][ j ], with j = 0..13 are derived as follows:
AlfCCTemporalCoeff$_{Cb}$[ TemporalId ][ j ] =
AlfCCCoeff$_{Cb}$[ slice_cross_component_alf_cb_aps_id ][ j ]
slice_cross_component_alf_cr_reuse_temporal_layer_filter equal to 1 specifies that the cross-
component Cr filter coefficients, with j = 0..13, inclusive is set equal to
AlfCCTemporalCoeff$_{Cr}$[ TemporalId ][ j ].
slice_cross_component_alf_cr_reuse_temporal_layer_filter equal to 0 and
slice_cross_component_alf_cr_enabled_flag is equal to 1 specifies that the syntax element
slice_cross_component_alf_cr_aps_id is present in slice header.
When slice_cross_component_alf_cr_enabled_flag is equal to 1, and
slice_cross_component_alf_cr_reuse_temporal_layer_filter is equal to 0, the elements of
AlfCCTemporalCoeff$_{Cr}$[ TemporalId ][ j ], with j = 0..13 are derived as follows:
AlfCCTemporalCoeff$_{Cr}$[ TemporalId ][ j ] =
AlfCCCoeff$_{Cr}$[ slice_cross_component_alf_cr_aps_id ][ j ]
slice_cross_component_alf_cb_aps_id specifies the adaptation_parameter_set_id that the Cb
colour component of the slice refers to for cross-component Cb filter. When
slice_cross_component_alf_cb_aps_id is not present it is inferred to be equal to
slice_alf_aps_id_luma[ 0 ]. The TemporalId of the ALF APS NAL unit having
adaptation_parameter_set_id equal to slice_cross_component_alf_cb_aps_id shall be less than or
equal to the TemporalId of the coded slice NAL unit.
slice_cross_component_alf_cr_aps_id specifies the alaptation_parameter_set_id that the Cr colour
component of the slice refers to for cross-component Cr filter. When
slice_cross_component_alf_cr_aps_id is not present it is inferred to be equal to
slice_alf_aps_id_luma[ 0 ]. The TemporalId of the ALF APS NAL unit having
aclaptation_parameter_set_id equal to slice_cross_component_alf_cr_aps_id shall be less than or
equal to the TemporalId of the coded slice NAL unit.
slice_cross_component_alf_cb_log2_control_size_minus4 specifies the value of the square block
sizes in number of samples as follows:
AlfCCSamplesCbW = AlfCCSamplesCbH = $2^{(\,slice\_cross\_component\_alf\_cb\_log2\_control\_size\_minus4\, + \,4\,)}$
slice_cross_component_alf_cb_log2_control_size_minus4 shall be in the range 0 to 3, inclusive.
slice_cross_component_alf_cr_log2_control_size_minus4 specifies the value of the square block
sizes in number of samples as follows:
AlfCCSamplesCrW = AlfCCSamplesCrH = $2^{(\,slice\ cross\ component\ alf\ cr\ log2\ control\ size\ minus4\, - \,4\,)}$
slice_cross_component_alf_cr_log2_control_size_minus4 shall be in the range 0 to 3, inclusive.

According to an embodiment of the present disclosure, a slice_ccalf_enable_flag flag may be added in unit of slices to determine whether the CC-ALF is used. The slice_ccalf_enable_flag flag may be transmitted when the sps_ccalf_enabled_flag flag is 1. Alternatively, the slice_ccalf_enable_flag flag may be transmitted when the sps_ccalf_enabled_flag flag is 1 and ChromaArrayType is not 0.

For example, when the slice_ccalf_enable_flag flag value is 1, slice_ccalf_chroma_idc syntax and slice_ccalf_aps_id_chroma syntax may be additionally transmitted. The slice_ccalf_chroma_idc syntax indicates whether Cb or Cr is applied or not, and the slice_ccalf_aps_id_chroma syntax indicates the APS id referenced for the corresponding slice CC-ALF.

The following table shows the syntax of slice header information according to the present embodiment.

TABLE 11

|  | Descriptor |
|---|---|
| slice_header() { |  |
|   slice_pic_parameter_set_id | ue (v) |
|   if( rect_slice_flag \| \| NumBrieksInPic > 1 ) |  |
|     slice_address | u (v) |
|   if( !rect_slice_flag && !single_brick_per_slice_flag ) |  |
|     num_bricks_in_slice_minus1 | ue (v) |
|   non_reference_picture_flag | u (1) |
|   slice_type | ue (v) |
|   if( separate_colour_plane_flag = = 1 ) |  |
|     colour_plane_id | u (2) |

TABLE 11-continued

| | Descriptor |
|---|---|
| slice_pic_order_cnt_lsb | u (v) |
| if( nal_unit_type = = GDR_NUT ) | |
|   recoveq_poc_cnt | ue (v) |
| if( nal_unit_type = = IDR_W_RADL \|\| nal_unit_type = = IDR_N_LP \|\| | |
|   nal_unit_type = = CRA NUT \|\| NalUnitType = = GDR NUT ) | |
|   no_output_of_prior_pics_flag | u (1) |
| if( output_flag_present_flag ) | |
|   pic_output_flag | u (1) |
| if( ( nal_unit_type != IDR_W_RADL && nal_unit_type != IDR_N_LP ) \|\| | |
|   sps_idr_rpl_present_flag ) { | |
|   for( i = 0; i < 2; i++ ) { | |
|     if( num_ref_pic_lists_in_sps[ 1 ] > 0 && !pps_ref_pic_list_sps_idc[ i ] && | |
|         ( i = = 0 \|\| (i = = 1 && rpl1_idx_present_flag ) ) ) | |
|       ref_pic_list_sps_flag[ i ] | u (1) |
|     if( ref_pic_list_sps_flag[ i ]) { | |
|       if( num_ref_pic_lists_in_sps[ i ] > 1 && | |
|         ( i = = 0 \|\| (i = = 1 && rpl1_idx_present_flag ) ) ) | |
|         ref_pic_list_idx[ i ] | u (v) |
|     } else | |
|       ref_pic_list_struct( i, num_ref_pic_lists_in_sps[ i ] ) | |
|     for( j = 0; j < NumLtrpEntries[ i ][ RplsIdx[ i ] ]; j++ ) { | |
|       if( ltrp_in_slice_header_flag[ i ][ RpIsIdx[ i ] ] ) | |
|         slice_poc_lsb_lt[ i ][ j ] | u (v) |
|       delta_poc_msb_present_flag[ i ][ j ] | u (1) |
|       if( delta_poc_msb_present_flag[ i ][ j ]) | |
|         delta_poc_msb_cycle_lt[ i ][ j ] | ue (v) |
|     } | |
|   } | |
|   if( ( slice_type != I && num_ref_entries[ 0 ][ RplsIdx[ 0 ] ] > 1 ) \|\| | |
|     ( slice_type = = B && num_ref_entries[ 1 ][ RplsIdx[ 1 ] ] > 1 ) ) { | |
|     num_ref_idx_active_override_flag | u (1) |
|     if( num_ref_idx_active_override_flag ) | |
|       for( i = 0; i < ( slice_type = = B? 2: 1 ); i++ ) | |
|         if( num_ref_entries[ i ][ RplsIdx[ i ] > 1 ) | |
|           num_ref_idx_active_minus1[ i ] | ue (v) |
|   } | |
| } | |
| if( partition_constraints_override_enabled_flag ) { | |
|   partition_constraints_override_flag | ue (v) |
|   if( partition_constraints_override_flag ) { | |
|     slice_log2_diff_min_qt_min_cb_luma | ue (v) |
|     slice_max_mtt_hierarchy_depth_luma | ue (v) |
|     if( slice_max_mtt_hierarchy_depth_luma != 0 ) | |
|       slice_log2_diff_max_bt_min_qt_luma. | ue (v) |
|       slice_log2_diff_max_tt_min_qt_luma | ue (v) |
|     } | |
|     if( slice_type = = I && qtbtt_dual_tree_intra_flag ) { | |
|       slice_log2_diff_min_qt_min_cb_chroma | ue (v) |
|       slice_max_mtt_hierarchy_depth_chroma | ue (v) |
|       if( slice_max_mtt_hierarchy_depth_chroma != 0 ) | |
|         slice_log2_diff_max_bt_min_qt_chroma | ue (v) |
|         slice_log2_diff_max_tt_min_qt_chroma | ue (v) |
|       } | |
|     } | |
|   } | |
| } | |
| if( slice_type != I ) { | |
|   if( sps_temporal_mvp_enabled_flag && !pps_temporal_mvp_enabled_idc ) | |
|     slice_temporal_mvp_enabled_flag | u (1) |
|   if( slice_type = = B && !pps_mvd_l1_zero_idc ) | |
|     mvd_l1_zero_flag | u (1) |
|   if( cabac_init_present_flag ) | |
|     cabac_init_flag | u (1) |
|   if( slice_temporal_mvp_enabled_flag ) { | |
|     if( slice_type = = B && !pps_collocated_from_l0_idc ) | |
|       collocated_from_l0_flag | u (1) |
|     if( ( collocated_from_l0_flag && NumRefIdxActive[ 0 ] > 1 ) \|\| | |
|       ( !collocaled_from_l0_flag && NumRefIdxActive[ 1 ] > 1 ) ) | |
|       collocated_ref_idx | ue (v) |
|   } | |
|   if( ( pps_weighted_pred_flag && slice_type = = P ) \|\| | |
|     ( pps_weighted_bipred_flag && slice_type = = B ) ) | |
|     pred_weight_table( ) | |
|   if( tpps six_minus_max_num_merge_cand_plus1 ) | |
|     six_minus_max_num_merge_cand | ue (v) |
|   if( sps_affine_enabled_flag && | |
|     !pps_five_minus_max_num_subblock_merge_cand_plus1 ) | |
|     five_minus_max_num_subblock_merge_cand | ue (v) |

TABLE 11-continued

| | Descriptor |
|---|---|
|   if( sps_fpel_mmwd_enabled_flag ) | |
|    slice_fpel_mmvd_enabled_flag | u (1) |
|   if( sps_bdof_dmvr_slice_present_flag ) | |
|    slice_disable_bdof_dmvr_flag | u (1) |
|   if( sps_triangle_enabled_flag && MaxNumMergeCand >= 2 && | |
|    !pps_max_nuna_inerge_cand_minus_max_num_triangle_cand_minus1 ) | |
|    max_num_merge_cand_minus_max_num_triangle_cand | ue (v) |
|  } | |
|  if ( sps_ibc_enabled_flag ) | |
|   slice_six_minus_max_num_ibc_merge_cand | ue (v) |
|  if( sps_joint_cbcr_enabled_flag ) | |
|   slice_joint_cbcr_sign_flag | u (1) |
|  slice_qp_delta | se (v) |
|  if( pps_slice_chroma_qp_offsets_present_flag ) { | |
|   slice_cb_qp_offset | se (v) |
|   slice_cr_qp_offset | se (v) |
|   if( sps_joint_cbcr_enabled_flag ) | |
|    slice_joint_cbcr_qp_offset | se (v) |
|  } | |
|  if( sps_sao_enabled_flag ) { | |
|   slice_sao_luma_flag | u (1) |
|   if( ChromaArrayType != 0 ) | |
|    slice_sao_chroma_flag | u (1) |
|  } | |
|  if( sps_alf_enabled_flag { | |
|   slice_alf_enabled_flag | u (1) |
|   if( slice_alf_enabled_flag ) { | |
|    slice_num_alf_aps_ids_luma | u (3) |
|    for( i = 0; i < slice_num_alf_aps_ids_luma; i++ ) | |
|     slice_alf_aps_id_luma[ i ] | u (3) |
|    if( ChromaArrayType != 0 ) | |
|     slice_alf_chroma_idc | u (2) |
|    if( slice_alf_chroma_idc ) | |
|     slice_alf_aps_id_chroma | u (3) |
|   } | |
|  } | |
|  if( sps_ccalf_enabled_flag ) { | |
|   slice_ccalf_enabled_flag | u (1) |
|   if( slice_ccalf_enabled_flag ) { | |
|    if( ChromaArrayType != 0 ) | |
|     slice_ccalf_chroma_idc | u (2) |
|    if( slice_ccalf_chroma_idc ) | |
|     slice_ccalf_aps_id_chroma | u (3) |
|   } | |
|  } | |
|  dep_quiant_enabled_flag | u (1) |
|  if( !dep_quant_enabled_flag ) | |
|   sign_data_hiding_enabled_flag | u (1) |
|  if( deblocking_filter_override_enabled_flag ) | |
|   deblocking_filter_override_flag | u (1) |
|  if( deblocking_filter_override_flag ) { | |
|   slice_deblocking_filter_disabled_flag | u (1) |
|   if( !slice_deblocking_filter_disabled_flag ) { | |
|    slice_beta_offset_div2 | se (v) |
|    slice_tc_offset_div2 | se (v) |
|   } | |
|  } | |
|  if( sps_lmcs_enabled_flag ) { | |
|   slice_lmcs_enabled_flag | u (1) |
|   if( slice_lmcs_enabled_flag ) { | |
|    slice_lmcs_aps_id | u (2) |
|    if( ChromaArrayType != 0 ) | |
|     slice_chroma_residual_scale_flag | u (1) |
|   } | |
|  } | |
|  if( sps_scaling_list_enabled_flag ) { | |
|   slice_scaling_list_present_flag | u (1) |
|   if( slice_scaling_list_present_flag ) | |
|    slice_scaling_list_aps_id | u (3) |
|  } | |
|  if( entry_point_offsets_present_flag && NumEnt Points > 0 ) { | |
|   offset_len_minus1 | ue (v) |
|   for( i = 0; i NumEntryPoints; i++ ) | |
|    entry_point_offset_minus1 | u (v) |
| if( slice_header_extension_present_flag ) { | |

TABLE 11-continued

| | Descriptor |
|---|---|
| slice_header_extension_length | ue (v) |
| for( i = 0 i < slice_header_extension_length, i++ ) | |
| slice_header_extension_data_byte[ i ][ j ] | u (8) |
| } | |
| byte_alignment( ) | |
| } | |

The following table shows semantics for syntax elements included in the table.

TABLE 12 slice_ccalf_enabled_flag equal to 1 specifies that cross component adaptive loop filter is enabled and may be applied to Cb, or Cr colour component in a slice. slice_ccalf_enabled_flag equal to 0 specifies that cross component adaptive loop filter is disabled for all colour components in a slice.
slice_ccalf_chroma_idc equal to 0 specifies that the cross component adaptive loop filter is not applied to Cb and Cr colour components. slice_ccalf_chroma_idc equal to 1 indicates that the cross component adaptive loop filter is applied to the Cb colour component. slice_ccalf_chroma_idc equal to 2 indicates that the cross component adaptive loop filter is applied to the Cr colour component. slice_ccalf_chroma_idc equal to 3 indicates that the cross component adaptive loop filter is applied to Cb and Cr colour components. When slice_ccalf_chroma_idc is not present, it is inferred to be equal to 0.
slice_ccalf_aps_id_chroma specifies the adaptation_parameter_set_id of the CCALF APS that the chroma component of the slice refers to. The TemporalId of the APS NAL unit having aps_params_type equal to CC_ALF_APS and adaptation_parameter_set_id equal to slice_ccalf_aps_id_chroma shall be less than or equal to the TemporalId of the coded slice NAL unit.
For infra slices and slices in an TRAP picture, slice_ccalf_aps_id_chroma shall not refer to an CCALF APS associated with other pictures rather than the picture containing the intra slices or the IRAP picture.

Alternatively, the syntax element slice_ccalf_chroma_idc in the above table may be described based on the semantics shown in the table below.

TABLE 13 slice_ccalf_chroma_idc equal to 0 indicates that the cross component adaptive loop filter is applied to the Cb colour component. slice_ccalf_chroma_idc equal to 1 indicates that the cross component adaptive loop filter is applied to the Cr colour component. slice_ccalf_chroma_idc equal to 2 indicates that the cross component adaptive loop filter is applied to Cb and Cr colour components. When slice_ccalf_chroma _idc is not present, it is inferred to be equal to 0.

According to an embodiment of the present disclosure, the CC-ALF may be performed without an additional enable flag (or similar information thereto) at the slice level. The following table shows some syntax of slice header information according to the present embodiment.

TABLE 14

| | |
|---|---|
| if( sps_ccalf_enabled_flag ) { | |
|   if( ChromaArrayType != 0) | |
|     slice_ccalf_chroma_idc | u(2) |
|   if( slice_ccalf_chroma_idc ) | |
|     slice_ccalf_aps_id_chroma | u(3) |
| } | |

The following table shows the semantics of the syntax elements included in the table.

TABLE 15 slice_ccalf_chroma_idc equal to 0 specifies that the cross component adaptive loop filter is not applied to Cb and Cr colour components. slice_ccalf_chroma_idc equal to 1 indicates that the cross component adaptive loop filter is applied to the Cb colour component slice_ccalf_chroma_idc equal to 2 indicates that the cross component adaptive loop filter is applied to the Cr colour component. slice_ccalf_chroma_idc equal to 3 indicates that the cross component adaptive loop filter is applied to Cb and Cr colour components. When slice_ccalf_chroma_idc is not present. it is inferred to be equal to 0.
slice_ccalf_aps_id_chroma specifies the adaptation_parameter_set_id of the CCALF APS that the chroma component of the slice refers to. The TemporalId of the APS NAL unit having aps_params_type equal to TABLE 15-continued CC_ALF_APS and adaptation_parameter_set_id equal to slice_ccalf_aps_id_chroma shall be less than or equal to the TemporalId of the coded slice NAL unit.
For intra slices and slices in an IRAP picture, slice_ccalf_aps_id_chroma shall not refer to an CCALF APS associated with other pictures rather than the picture containing the infra slices or the IRAP picture.

According to an embodiment of the present disclosure, a syntax element slice_ccalf_chroma_idc may be included in slice header information based on a condition for ChromaArrayType. The following table shows some syntax of slice header information according to the present embodiment.

TABLE 16

| | |
|---|---|
| if( sps_ccalf_enabled_flag && ChromaArrayType != 0) { | |
|   if( ChromaArrayType != 0) | |
|     slice_ccalf_chroma_idc | u(2) |
|   if( slice_ccalf_chroma_idc ) | |
|     slice_ccalf_aps_id_chroma | u(3) |
| } | |

In an example, the header information (slice_header( )) includes a first flag (slice_cross_component_alf_cb_enabeld_flag or sh_cc_alf_cb_enabeld_flag) related to whether the CCALF is enabled for a Cb color component of the filtered reconstructed chroma samples, and a second flag (slice_cross_component_alf_cr_enabeld_flag or sh_cc_alf_cr_enabeld_flag) related to whether the CCALF is available for a Cr color component of the filtered reconstructed chroma samples.

In an example, based on the determination that the value of the first flag (slice_cross_component_alf_cb_enabeld_flag or sh_cc_alf_cb_enabeld_flag) is 1, the header information may include information (slice_cross_cb_aps_id_id or sh_cc_alf_cb_aps_id) related to an identifier of an APS for deriving the cross-component filter coefficients for the Cb color component.

In one example, based on the determination that the value of the second flag (slice_cross_component_alf_cr_enabeld_flag or sh_cc_alf_cr_enabeld_flag) is 1, the header information may include information (slice_cross_component_id_cross_component_id_flag or sh_cc_alf_cr_aps_id) related to the identifier of the APS for derivation of the cross-component filter coefficients for the Cr color component.

According to an embodiment of the present disclosure, the cross-component filter coefficients for the CC-ALF may be transmitted through the APS. In one example, the APS for the CC-ALF may be defined.

The following table shows exemplary syntax of the APS according to the present embodiment.

TABLE 17

| | Descriptor |
|---|---|
| adaptation_parameter_set_rbsp( ) { | |
|   adaptation_parameter_set_id | u(5) |
|   aps_params_type | u(3) |
|   if( aps_params_type = = ALF_APS ) | |
|     alf_data( ) | |
|   else if( aps_params_type = = LMCS_APS ) | |
|     lmcs_data( ) | |
|   else if( aps_params_type = = SCALING_APS ) | |
|     scaling_list_data( ) | |
|   else if( aps_params_type = = CCALF_APS ) | |
|     ccalf_data( ) | |

TABLE 17-continued

| | Descriptor |
|---|---|
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

In the above table, alf_data( ) may be called general ALF data, and ccalf_data( ) may be called the CCALF data. The ALF data may include general ALF data and/or CCALF data. In one example, the ALF data may be the same as the CCALF data. In another example, the ALF data may be different from the CCALF data.

The following table shows the semantics of the syntax elements included in the table

TABLE 18 adaptation_parameter_set_id provides an identifier for the APS for reference by other syntax elements.
When aps_params_type is equal to ALF_APS or SCALING_APS, the value of adaptation_parameter_set_id shall be in the range of 0 to 7, inclusive.
When aps_params_type is equal to LMCS_APS, the value of adaptation_parameter_set_id shall be in the range of 0 to 3, inclusive.
aps_params_type specifies the type of APS parameters carried in the APS as specified in Table 7-2. When aps_params_type is equal to 1 (LMCS_APS), the value of adaptation_parameter_set_id shall be in the range of 0 to 3, inclusive.

Table 7-2 - APS parameters type codes and types of APS parameters

| aps_params_type | Name of aps_params_type | Type of APS parameters |
|---|---|---|
| 0 | ALF_APS | ALF parameters |
| 1 | LMCS APS | LMCS parameters |
| 2 | SCALING APS | Scaling list parameters |
| 3 | CCALF APS | CCALF parameters |
| 4..7 | Reserved | Reserved |

The ALF data according to the embodiment of the present disclosure may be expressed in the syntax as shown in the following table.

TABLE 19

| | Descriptor |
|---|---|
| ccalf_data( adaptation_parameter_set_id ) { | |
|   alf_cross_component_cb_filter_signal_flag | u(1) |
|   alf_cross_component_cr_filter_signal_flag | u(1) |
|   if( alf_cross_component_cb_filter_signal_flag ) { | |
|     alf_cross_component_cb_min_eg_order_minus1 | ue(v) |
|     for( i = 0; 1 < 3 i++ ) | |
|       alf_cross_component_cb_eg_order_increase_flag[ i ] | u(1) |
|     for ( j = 0; j < 14; j++ ) { | |
|       alf_cross_component_cb_coeff_abs[ j ] | uek(v) |
|       if( alf_cross_component_cb_coeff_abs[ j ]) | |
|         alf_cross_component_cb_coeff_sign[ j ] | u(1) |
|     } | |
|   } | |
|   if( alf_cross_component_cr_filter_signal_flag) { | |

TABLE 19-continued

|  | Descriptor |
| --- | --- |
| alf_cross_component_cr_min_eg_order_minus1 | ue(v) |
| for( i = 0; i < 3; i++ ) | |
|   alf_cross_component_cr_eg_order_increase_flag[ i ] | u(1) |
| for ( j = 0; j < 14; j++ ) { | |
|   alf_cross_component_cr_coeff_abs[ j ] | uek(v) |
|   if( alf_cross_component_cr_coeff_abs[ j ] | |
|     alf_cross_component_cr_coeff_sign[ j ] | u(1) |
|   } | |
| } | |
| } | |

The semantics of the syntax elements included in the table may be expressed as shown in the following table.

TABLE 20 alf_cross_component_cb_filter_signal_flag equal to 1 specifies that a cross-component Cb filter set is signalled. alf_cross_component_cb_filter_signal_flag equal to 0 specifies that a cross component Cb filter set is not signalled. When alf_cross_component_cb_filter_signal_flag is not present it is inferred to be equal 0.
alf_cross_component_cr_filter_signal_flag equal to 1 specifies that a cross component Cr filter set is signalled alf_cross_component_cr_filter_signal_flag equal to 0 specifies that a cross-component Cr filter set is not signalled. When alf_cross_component_cr_filter_signal_flag is not present, it is inferred to be equal 0.
alf_cross_component_cb_min_eg_order_minus1 plus 1 specifies the minimum order of the exp-Golomb code for cross-component Cb filter coefficient signalling. The value of
alf_cross_component_cb_min_eg_order_minus1 shall be in the range of 0 to 9, inclusive.
alf_cross_component_cb_eg_order_increase_flag[ i ] equal to 1 specifies that the minimum order of the exp-Golomb code for cross-component Cb filter coefficient signalling is incremented by 1.
alf_cross_component_cb_eg_order_increase_flag[ i ] equal to 0 specifies that the minimum order of the exp-Golomb code for cross-component Cb filter coefficient signalling is not incremented by 1.
The order expGoOrderCb[ i ] of the exp-Golomb code used to decode the values of
alf_cross_component_cb_coeff_abs[ j ] is derived as follows:
    expGoOrderCb[ i ] = ( i = = 0 ? alf_cross_component_cb_min_eg_order_minus1 + 1 :
expGoOrderCb[ i − 1 ]) + alf_cross_component_cb_eg_order_increase_flag[ i ].
alf_cross_component_cb_coeff_abs[ j ] specifies the absolute value of the j-th coefficient of the signalled cross-component Cb filter. When alf_cross_component_cb_coeff_abs[ j ] is not present, it is inferred to be equal 0.
The order k of the exp-Golomb binarization uek(v) is derived as follows:
    golombOrderIdxCb[ ] = {0,2,2,2,1,2,2,2,2,2,2,1,2,1} [these may be Categorize coefficient into 3 categories, each category uses the same order k exp-Golomb code]
alf_cross_component_cb_coeff_sign[ j ] specifies the sign of the j-th cross-component Cb filter coefficient as follows:
    If alf_cross_component_cb_coeff_sign[ j ] is equal to 0, the corresponding cross-component Cb filter coefficient has a positive value.
    Otherwise(alf_cross_component_cb_coeff_sign[ j] is equal to 1), the corresponding cross-component Cb filter coefficient has a negative value.
    When alf_cross_component_cb_coeff_sign[ j ] is not present it is inferred to be equal to 0.
    The cross-component Cb filter coefficients AlfCCCoeffCb[ adaptation_parameter_set_id] with elements AlfCCCoeffCb[ adaptation_parameter_set_id ][ j ], with j = 0..13 are derived as follows:
      AlfCCCoeff adaptation_parameter_set_id ][ j ] = alf_cross_component_cb_coeff_abs[ j ] *
        ( 1 − 2 * alf_cross_component_cb_coeff_sign[ j ])
It is a requirement of bitstream conformance that the values of
AlfCCCoeffCb[ adaptation_parameter_set_id ][j ] with j = 0..13 shall be in the range of −210 − 1 to 210 − 1, inclusive.
alf_cross_component_cr_min_eg_order_minus1 plus 1 specifies the minimum order of the exp-Golomb code for cross-component Cr filter coefficient signalling. The value of
alf_cross_component_cr_min_eg_order_minus1 shall be in the range of 0 to 9, inclusive
alf_cross_component_cr_eg_order_increase_flag[ i ] equal to 1 specifies that the minimum order of the exp-Golomb code for cross-component Cr filter coefficient signalling is incremented by 1.
alf_cross_component_cr_eg_order_increase_flag[ i ] equal to 0 specifies that the minimum order of the exp-Golomb code for cross-component Cr filter coefficient signalling is not incremented by 1.
The order expGoOrderCb[ i ] of the exp-Golomb code used to decode the values of
alf_cross_component_cb_coeff_abs[ j ] is derived as follows:
    expGoOrderCr[ i ] = ( i = = 0 ? alf_cross_component_cr_min_eg_order_minus1 + 1 :
expGoOrderCr[ i − 1 ]) + alf_cross_component_cr_eg_order_increase_flag[ i ].
alf_cross_component_cr_coefr_abs[ j ] specifies the absolute value of the j-th coefficient of the signalled cross-component Cr filter. When alf_cross_component_cr_coeff abs[ j ] is not present, it is inferred to be equal 0.
    The order k of the exp-Golomb binarization uek(v) is derived as follows.
    golombOrderIdxCr[ ] = {0,1,2,1,0,1,2,2,2,2,2,1,2,1} [these may be Categorize coefficient into 3 categories, each category uses the same order k exp-Golomb code]
alf_cross_component_cr_coeff_sign[ j ] specifies the sign of the j-th cross-component Cr filter coefficient as follows:
    If alf_cross_component_cr_coeff sign[ j ] is equal to 0, the corresponding cross-component Cr filter coefficient has a positive value.
    Otherwise (alf_cross_component_cr_coeff_sign[ j ] is equal to 1), the corresponding cross-component Cr filter coefficient has a negative value.
    When alf_cross_component_cr_coeff sign[ j ] is not present, it is inferred to be equal to 0.

TABLE 20-continued

The cross-component Cr filter coefficients AlfCCCoeffCr[ adaptation_parameter_set_id ] with elements
AlfCCCoeffCr[ adaptation_parameter_set_id ][ j ], with j = 0..13 are derived as follows:
   AlfCCCoeffCr[ adaptation_parameter_set_id ][ j ] = alf_cross_component_cr_coeff_abs[ j ] *
     ( 1 − 2 * alf_cross_component_cr_coeff_sign[ j ])
It is a requirement of bitstream conformance that the values of
AlfCCCoeffCr[ adaptation_parameter_set_id 1 ][ j ] with j =0..13 shall be in the range of −210 − 1 to 210 − 1,
inclusive.

In another example, the syntax related to the ALF data may be expressed as shown in the following table.

TABLE 21

| | Descriptor |
|---|---|
| ccalf_data( adaptation_parameter_set_id ) { | |
|   alf_cross_component_cb_fifter_signal_flag | u(1) |
|   alf_cross_component_cr_filter_signal_flag | u(1) |
|   if( alf_cross_component_cb_filter_signal_flag ) { | |
|     for ( j = 0; j < 14; j++ ) { | |
|       alf_cross_component_cb_coeff_abs[ j ] | uek(v) |
|       if( alf_cross_component_cb_coeff_abs[ j ] ) | |
|         alf_cross_component_cb_coeff_sign[ j ] | u(1) |
|     } | |
| } | |
| if( alf_cross_component_cr_filter_signal_flag ) { | |
|   for ( j = 0; j < 14: j++ ) { | |
|     alf_cross_component_cr_coeff_abs[ j ] | uek(v) |
|     if( alf_cross_component_cr_coeff_abs[ j ]) | |
|       alf_cross_component_cr_coeff_sign[ j ] | u(1) |
|   } | |
| } | |
| } | |

The semantics of the syntax elements included in the table may be as shown in the following table.

TABLE 22 alf_cross_component_cb_filter_signal_flag equal to 1 specifies that a cross-component Cb filter set is sig-
nalled alf_cross_component_cb_filter_signal_flag equal to 0 specifies that a cross component Cb filter set
is not signalled. When alf_cross_component_cb_filter_signal_flag is not present it is inferred to be equal 0.
alf_cross_component_cr_filter_signal_flag equal to 1 specifies that a cross-component Cr filter set is
signalled alf_cross_component_cr filter_signal_flag equal to 0 specifies that a cross-component Cr filter set
is not signalled. When alf_cross_component_cr_filter_signal_flag is not present, it is inferred to be equal 0.
alf_cross_component_cb_coeff_abs[ j ] specifies the absolute value of the j-th coefficient of the signalled
cross-component Cb filter. When alf_cross_component_cb_coeff abs[ j 1] is not present, it is inferred to be
equal 0.
   The order k of the exp-Golomb binarization uek(v) is set equal to 3.
alf_cross_component_cb_coeff_sign[ j ] specifies the sign of the j-th cross-component Cb filter coefficient as
follows:
   If alf_cross_component_cb_coeff_sign[ j ] is equal to 0 the corresponding cross-component Cb filter
coefficient has a positive value.
   Otherwise (alf_cross_component_cb_coeff sign[ j ] is equal to 1), the corresponding cross-component Cb
filter coefficient has a negative value.
   When alf_cross_component_cb_coeff_sign[ j ] is not present, it is inferred to be equal to 0.
   The cross-component Cb filter coefficients AlfCCCoeffCb[ adaptation_parameter_set_id ] with elements
AlfCCCoeffCb[ adaptation_parameter_set_id ][ j ], with j = 0..13 are derived as follows:
   AlfCCCoeffCb[ adaptation_parameter_set_id ][ j ] = alf_cross_component_cb_coeff_abs [ j ] *
     ( 1 − 2 * alf_cross_component_cb_coeff_sign [ j ])
It is a requirement of bitstream conformance that the values of
AlfCCCoeffCb[ adaptation_parameter_set_id ][ j ] with j − 0..13 shall be in the range of −210 − 1 to 210 − 1,
inclusive.
alf_cross_component_cr_coeff_abs [ j ] specifies the absolute value of the j-th coefficient of the signalled
cross-component Cr filter. When alf_cross component_cr_coeff_abs[ j ] is not present, it is inferred to be
equal 0.
   The order k of the exp-Golomb binarization uek(v) is set equal to 3.
alf_cross_component_cr_coeff_sign[ j ] specifies the sign of the j-th cross-component Cr filter coefficient as
follows:
   If alf_cross_component_cr_coeff sign[ j ] is equal to 0, the corresponding cross-component Cr filter
coefficient has a positive value.
   Otherwise (alf_cross_component_cr_coeff sign[ j ] is equal to 1), the corresponding cross-component Cr
filter coefficient has a negative value.
   When alf_cross_component_cr_coeff_sign[ j ] is not present it is inferred to be equal to 0.
The cross-component Cr filter coefficients AlfCCCoeffCr[ adaptation_parameter_set_id ] with elements
AlfCCCoeffCr[ adaptation_parameter_set_id ][ j ], with j = 0..13 are derived as follows:
   AlfCCCoeffCr[ adaptation_parameter_set_id ][ j ] = alf_cross_component_cr_coeff abs[ j ] *
     ( 1 − 2 * alf_cross_component_cr_coeff_sign[ j ])
It is a requirement of bitstream conformance that the values of
AlfCCCoeffCr[ adaptation_parameter_set_id ][ j ] with j = 0..13 shall be in the range of −210 − 1 to 210 − 1,
inclusive.

In the table, the order of exp-Golomb binarization for parsing the alf_cross_component_cb_coeff_abs[j] and alf_cross_component_cr_coeff_abs[j] syntax may be defined as one of 0 to 9 values.

In another example, the syntax related to the ALF data may be expressed as shown in the following table.

TABLE 23

|  | Descriptor |
|---|---|
| ccalf_data( adaptation_parameter_set_id ) { | |
|   alf_cross_component_cb_filter_signal_flag | u(1) |
|   alf_cross_component_cr_filter_signal_flag | u(1) |
|   if( alf_cross_component_cr_filter_signal_flag ) { | |
|     ccalf_cb_num_alt_filters_minus1 | ue(k) |
|     for(altIdx = 0; altIdx <= ccalf_cb_num_alt_filters_minus1; altIdx++) { | |
|       for ( j = 0; j < 14; j++ ) { | |
|         alf_cross_component_cb_coeff_abs[ j ] | uek(v) |
|         if( alf_cross_component_cb_coeff_abs[ j ] ) | |
|           alf_cross_component_cb_coeff_sign[ j ] | u(1) |
|       } | |
|     } | |
|   } | |
|   if( alf_cross_component_cr_ftlter_signal_flag ) { | |
|     ccalf_cr_num_alt_filters_minus1 | ue(k) |
|     for(altIdx = 0, altIdx <= ccalf_cr_num_alt_filters_minus1; altIdx++) { | |
|       for ( j = 0; j < 14; j++ ) { | |
|         alf_cross_component_cr_coeff_abs[ j ] | uek(v) |
|         if( alf_cross_component_cr_coeff_abst[ j ] ) | |
|           alf_cross_component_cr_coeff_sign[ j ] | u(1) |
|       } | |
|     } | |
|   } | |
| } | |

In the table, information related to absolute values of the filter coefficients and/or information related to signs of the filter coefficients may be expressed as a quadratic vector, a quadratic matrix, or a quadratic array (eg, alf_cross_component_cb_coeff_abs[altIdx][j], alf_cross_component_cb_coeff_sign[altIdx][j], alf_cross_component_cr_coeff_abs[altIdx][j], alf_cross_component_cr_coeff_sign[altIdx][j]). In an example, the information on the number of filters, the information related to the absolute values of the filter coefficients, and/or the information related to signs of the filter coefficients may be included in the general ALF data.

The semantics of the syntax elements included in the table may be as shown in the following table.

TABLE 24

| |
|---|
| alf_cross_component_cb_filter signal_flag equal to 1 specifies that a cross-component Cb filter set is signalled. alf_cross_component_cb_filter_signal_flag equal to 0 specifies that a cross-component Cb filter set is not signalled. When alf_cross_component_cb_filter_signal_flag is not present, it is inferred to be equal 0. alf_cross_component_cr_filter_signal_flag equal to 1 specifies that a cross-component Cr filter set is signalled. alf_cross_component_cr_filter_signal_flag equal to 0 specifies that a cross-component Cr filter set is not signalled. When alf_cross_component_cr_filter_signal_flag is not present, it is inferred to be equal 0. alf_cb_num_alt_filters_minus1 plus 1 specifies the number of alternative cross component adaptive loop filters for cb components. alf_cross_component_cb_coeff_abs[ j ] specifies the absolute value of the j-th coefficient of the signalled cross-component Cb filter. When alf_cross_component_cb_coeff abs[ j ] is not present, it is inferred to be equal 0.<br>   The order k of the exp-Golomb binarization uek(v) is set equal to 3.<br>alf_cross_component_cb_coeff_sign[ j ] specifies the sign of the j-th cross-component Cb filter coefficient as follows:<br>   If alf_cross_component_cb_coeff_sign[ j ] is equal to 0, the corresponding cross-component Cb filter coefficient has a positive value.<br>   Otherwise (alf_cross_component_cb_coeff_sign[ j ] is equal to 1), the corresponding cross-component Cb filter coefficient has a negative value.<br>   When alf_cross_component cb_coeff_sign[ j ] is not present, it is inferred to be equal to 0.<br>The cross-component Cb filter coefficients AlfCCCoeffCb[ adaptation_parameter_set_id ] with elements AlfCCCoeffCb[ adaptation_parameter_set_id ][ j ], with j = 0..13 are derived as follows:<br>   AlfCCCoeffCb[ adaptation_parameter_set_id ][ j ] =alf_cross_component_cb_coeff_abs[ j ] *<br>     ( 1 − 2 * alf_cross_component_cb_coeff sign[ j ] )<br>It is a requirement of bitstream conformance that the values of |

TABLE 24-continued

AlfCCCoeffCb[ adaptation_parameter_set_id ][ j ] with j = 0..13 shall be in the range of −210 − 1 to 210 − 1, inclusive.
alf_cr_num_alt_filters_minus1 plus 1 specifies the number of alternative cross component adaptive loop filters for cr components.
alf_cross_component_cr_coeff_abs[ j ] specifies the absolute value of the j-th coefficient of the signalled cross-component Cr filter. When alf_cross_component_cr_coeff_abs[ j ] is not present, it is inferred to be equal 0.
  The order k of the exp-Golomb binarization uek(v) is set equal to 3.
alf_cross_component_cr_coeff_sign[ j ] specifies the sign of the j-th cross-component Cr filter coefficient as follows:
  If alf_cross_component_cr_coeff_sign[ j ] is equal to 0, the corresponding cross-component Cr filter coefficient has a positive value.
  Otherwise (alf_cross_component_cr_coeff_sign[ j ] is equal to 1), the corresponding cross-component Cr filter coefficient has a negative value.
  When alf_cross_component_cr_coeff_sign[ j ] is not present, it is inferred to be equal to 0.
  The cross-component Cr filter coefficients AlfCCCoeffCr[ adaptation_parameter_set_id ] with elements AlfCCCoeffCr[ adaptation_parameter_set_id ][ j ], with j = 0..13 are derived as follows:
    AlfCCCoeffCr[ adaptation_parameter_set_id ][ j ] = alf_cross_component_cr_coeff_abs[ j ] *
      ( 1 − 2 * alf_cross_component_cr_coeff_sign[ j ] )
It is a requirement of bitstream conformance that the values of
AlfCCCoeffCr[ adaptation_parameter_set_id ][ j ] with j = 0..13 skill be in the range of −210 − 1 to 210 − 1, inclusive.

The order of exp-Golomb binarization for parsing the alf_cross_component_cb_coeff_abs[j] and alf_cross_component_cr_coeff_abs[j] syntax may be defined as one of 0 to 9 values.

The cross-component filter coefficients may be called the CCALF filter coefficients. The cross-component filter coefficients may include the cross-component filter coefficients for the Cb color component and the cross-component filter coefficients for the Cr color component. The information on the values of the cross-component filter coefficients for the Cb color component (Cr color component) may include the information on the values of the cross-component filter coefficients for the Cb color component (Cr color component) and/or the information on the signs of the cross-component filter coefficients for the Cb color component (Cr color component).

In one example, the ALF data included in the APS for deriving the cross-component filter coefficients for the Cb color component may include a Cb filter signal flag (alf_cross_component_cb_filter_signal_flag or alf_cc_cb_filter_signal_flag) related to whether the cross-component filters for the Cb color component are signaled. Based on the Cb filter signal flag, the ALF data included in the APS for deriving the cross-component filter coefficients for the Cb color component may include the information (ccalf_cb_num_alt_filters_minus1 or alf_cc_cb_filters_signalled_minus1) related to the number of cross-component filters for the Cb color component. Based on the information related to the number of cross-component filters for the Cb color component, the ALF data included in the APS for deriving the cross-component filter coefficients for the Cb color component may include the information (alf_cross_component_cb_coeff_abs or alf_cc_cb_mapped_coeff_abs) on the absolute values of the cross-component filter coefficients for the Cb color component and the information (alf_cross_component_cb_coeff_sign or alf_cc_cb_coeff_sign) on the signs of the cross-component filter coefficients for the Cb color component. The cross-component filter coefficients (ccalfcoeff or ccalfapscoeff) for the Cb color component may be derived based on the information on the absolute values of the cross-component filter coefficients for the Cb color component and the information on the signs of the cross-component filter coefficients for the Cb color component. For example, the information related to the number of cross-component filters for the Cb color component may be zero-order exponential Golomb ($0^{th}$ EG, ue(v) or ue(k)) coded.

In one example, the ALF data included in the APS for deriving the cross-component filter coefficients for the Cr color component may include a Cr filter signal flag (alf_cross_component_cr_filter_signal_flag or alf_cc_cr_filter_signal_flag) related to whether the cross-component filters for the Cr color component are signaled. Based on the Cr filter signal flag, the ALF data included in the APS for deriving the cross-component filter coefficients for the Cr color component may include the information (ccalf_cr_num_alt_filters_minus1 or alf_cc_cr_filters_signalled_minus1) related to the number of cross-component filters for the Cr color component. Based on the information related to the number of cross-component filters for the Cr color component, the ALF data included in the APS for deriving the cross-component filter coefficients for the Cr color component may include the information (alf_cross_component_cr_coeff_abs or alf_cc_cr_mapped_coeff_abs) on the absolute values of the cross-component filter coefficients for the Cr color component and the information (alf_cross_component_cr_coeff_sign or alf_cc_cr_coeff_sign) on the signs of the cross-component filter coefficients for the Cr color component. The cross-component filter coefficients (ccalfcoeff or ccalfapscoeff) for the Cr color component may be derived based on the information on the absolute values of the cross-component filter coefficients for the Cr color component and the information on the signs of the cross-component filter coefficients for the Cr color component. For example, the information related to the number of cross-component filters for the Cr color component may be zero-order exponential Golomb ($0^{th}$ EG, ue(v) or ue(k)) coded.

According to an embodiment of the present disclosure, the CC-ALF related information may be transmitted in units of CTU (block) to control filter on/off of the CC-ALF.

The following table shows exemplary syntax for a coding tree unit according to the present embodiment.

TABLE 25

| | Descriptor |
|---|---|
| coding_tree_unit( ) { <br>  xCtb = ( CtbAddrIhRs % PicWidthInCtbsY ) << CtbLog2SizeY <br>  yCtb = ( CtbAddrInRs / PicWidthInCtbsY ) << CtbLog2SizeY <br>  if( slice_sao_luma_flag || slice_sao_chroma_flag ) <br>    sao( xCtb >> CtbLog2SizeY, yCtb >> CtbLog2SizeY ) <br>  if( slice_alf_enabled_flag ){ <br>    alf_ctb_flag[ 0 ][ xCtb >> CtbLog2SizeY ][ yCtb >> CtbLog2SizeY ] | ae(v) |
|     if( alf_ctb_flag [ 0 ][ xCtb >> CtbLog2SizeY ][ yCtb >> CtbLog2SizeY ]) { <br>      if( slice_num_alf_aps_ids_luma > 0 ) <br>        alf_ctb_use_first_aps_flag | ae(v) |
|       if( !alf_ctb_use_first_aps_flag ) { <br>        if( slice_num_alf_aps_ids_luma > 1 ) <br>          alf_use_aps_flag | ae(v ) |
|         if( alf_use_aps_flag ) ) { <br>          if( slice_num_alf_aps_ids_luma > 2 ) <br>            alf_luma_prev_filter_idx_minus1 | ae(v) |
|         } else <br>          alf_luma_fixed_filter_idx <br>      } <br>    } <br>  } | ae(v) |
|   if( slice_alf_chroma_idc = = I || slice_alf_chroma_idc = = 3 ) { <br>    alf_ctb_flag[ 1 ][ xCtb >> CtbLog2SizeY ][ yCtb >> CtbLog2SizeY ] | ae(v) |
|     if( alf_ctb_flag[ 1 ][ xCtb >> CtbLog2SizeY ][ yCtb >> CtbLog2SizeY ] <br>      && aps_alf_chroma_num_alt_filters_minus1 > 0 ) <br>      alf_ctb_filter_alt_idx[ 0 ][ xCtb >> CtbLog2SizeY ][ yCtb >> CtbLog2SizeY ] <br>  } | ae(v) |
|   if( slice_all_chroma_idc = = 2 || slice_alf_chroma_idc = = 3) { <br>    alf_ctb_flag[ 2 ][ xCtb >> CtbLog2SizeY ][ yCtb >> CtbLog2SizeY ] | ae(v) |
|     if( alf_ctb_flag[2 ][ xCtb >> CtbLog2SizeY ][ yCtb >> CtbLog2SizeY ] <br>      && aps_alf_chroma_num_alt_filters_minust1 > 0 ) <br>      alf_ctb_filter_alt_idx[ 1 ] [xCtb >> CtbLog2SizeY ][ yCtb >> CtbLog2SizeY ] <br>  } <br>} | ae(v) |
| if( slice_ccalf_enabled_flag ){ <br>  if( slice_ccalf_chroma_idc = = 1 || slice_ccalf_chroma_idc = = 3 ) <br>    ccalf_ctb_flag[ 0 ][ xCtb >> CtbLog2SizeY ][ yCtb >> CtbLog2SizeY ] | ae(v) |
|   if( slice_ccalf chroma_idc ==2 1 1 slice_ccalf chroma_idc ==3 ) <br>    ccalf_ctb_flag[ 1 ][ xCtb >> CtbLog2SizeY ][ yCtb >> CtbLog2SizeY ] <br>} | ae(v) |
| if( slice_type = = I && qtbtt_dual_tree_intra_flag ) <br>  dual_tree_implicit_qt_split ( xCtb, yCtb, CtbSizeY, 0 ) <br>else <br>  coding tree( xCtb, yCtb, CtbSizeY, CtbSizeY, 1, 1, 0, 0, 0, 0, 0, <br>    SINGLE_TREE, MODE_TYPE_ALL ) <br>} | |

The following table shows exemplary semantics of syntax elements included in the table.

TABLE 26 ccalf_ctb_flag[ chromaIdx ] [ xCtb >> CtbLog2SizeY ][ yCtb >> CtbLog2SizeY ] equal to 1 specifies that the cross component adaptive loop filter is applied to the coding tree block of the chroma component indicated by chromaIdx, equal to 0 for Cb and equal 1 for Cr, of the coding tree unit at luma location ( xCtb, yCtb ).
ccaff_ctb_flag[ chromaIdx ][ xCtb >> CtbLog2SizeY ][ yCtb >> CtbLog2SizeY ] equal to 0 specifies that the adaptive loop filter is not applied to the coding tree block of the chroma component indicated by chromaIdx of the coding tree unit at luma location ( xCtb, yCtb ).
When ccalf ctb_flag[ cIdx ][ xCtb >> CtbLog2SizeY ][ yCtb >> CtbLog2SizeY ] is not present, it is inferred to be equal to 0.

In another example of the present embodiment, the syntax regarding the coding tree unit may be expressed as the following table.

| | Descriptor |
|---|---|
| coding_tree_unit( ) { <br>  xCtb = ( CtbAddrInRs % PicWidthInCtbsY ) << CtbLog2SizeY <br>  yClb = ( CtbAddrIntRs / PicWidthInCtbsY ) << CtbLog2SizeY <br>  if( slice_sao_luma_flag || slice_sao_chroma_flag ) <br>    sao( xCtb >> CtbLog2SizeY, yCtb >> CtbLog2SizeY ) <br>  if( slice_alf enabled_flag ){ | |

|  | Descriptor |
|---|---|
| alf_ctb_flag[ 0 ][ xCtb >> CtbLog2SizeY ][ yCtb >> CtbLog2SizeY ] | ae(v) |
| if( alf_ctb_flag[ 0 ][ xCtb >> CtbLog2SizeY ][ yCtb >> CtbLog2SizeY ]) { | |
|   if( slice_num_alf_aps_ids_luma > 0 ) | |
|     alf_ctb_use_first_aps_flag | ae(v) |
|   if( !alf_ctb_use_first_aps_flag) { | |
|     if( slice_num_alf_aps_ids_luma > 1 ) | |
|       alf_use_aps_flag | ae(v) |
|     if( alf_use_aps_flag ) { | |
|       if( slice_num_alf_aps_ids_luma > 2 ) | |
|         alf_luma_prev_filter_idx_minus1 | ae(v) |
|     } else | |
|       alf_luma_fixed_filter_idx | ae(v) |
|   } | |
| } | |
| if( slice_alf_chroma_idc = = 1 || slice_alf_chroma_idc == 3 ) { | |
|   alf_ctb_flag[ 1 ][ xCtb >> CtbLog2SizeY ][ yCtb >> CtbLog2SizeY] | ae(v) |
|   if( alf_ctb_flag[1 ][ xCtb >> CtbLog2SizeY ][ yCtb >> CtbLog2SizeY ] | |
|     && aps_alf_chroma_num_alt_filters_minus1 > 0 ) | |
|     alf_ctb_filter_alt_idx[ 0 ][ xCtb >> CtbLog2SizeY ][ yCtb >> CtbLog2SizeY ] | ae(v) |
| } | |
| if( slice_alf_chroma_idc = = 2 || slice_alf_chroma_idc = = 3 ) { | |
|   alf_ctb_flag[ 2 ][ xCtb >> CtbLog2SizeY ][ yCtb >> CtbLog2SizeY ] | ae(v) |
|   if( alf_ctb_flag[ 2 ][ xCtb >> CtbLog2SizeY ][ yCtb >> CtbLog2SizeY ] | |
|     && aps_alf_chroma_num_alt_filters_minus1 > 0 ) | |
|     alf_ctb_filter_alt_idx[ 1 ][ xCtb >> CtbLog2SizeY ][ yCtb >> CtbLog2SizeY ] | ae(v) |
| } | |
| } | |
| if( slice_ccalf_enabled_flag ){ | |
|   if( slice_ccalf_chroma_idc = = 1 || slice_ccalf_chroma_idc = = 3 ) { | |
|     ccalf_ctb_flag[ 0 ][ xCtb >> CtbLog2SizeY ][ yCtb >> CtbLog2SizeY ] | ae(v) |
|     if( ccalf_ctb_flag[ 0 ][ xCtb >> CtbLog2SizeY ][ yCtb >>0 CtbLog2SizeY ] | |
|       && aps_alf_chroma_num_alt_filters_minus1 > 0 ) | |
|       ccalf_ctb_filter_alt_idx[ 0 ][ xCtb >> CtbLog2SizeY ][ yCtb >> CtbLog2SizeY ] | ae(v) |
|   } | |
|   if( slice_ccalf_chroma_idc = = 2 || slice_ccalf_chroma_idc = = 3 ) { | |
|     ccalf_ctb_flag[ 1 ][ xCtb >> CtbLog2SizeY ][ yCtb >> CtbLog2SizeY ] | ae(v) |
|     if( ccalf_ctb_flag[ 1 ][ xCtb >> CtbLog2SizeY ][ yCtb >> CtbLog2SizeY ] | |
|       && aps_alf_chroma_num_alt_filters_minus1 > 0 ) | |
|       ccalf_ctb_filter_alt_idx[ 1 ][ xCtb >> CtbLog2SizeY ][ yCtb >> CtbLog2SizeY ] | ae(v) |
|   } | |
| } | |
| if( slice_type = =I && qtbtt_dual_tree_intra_flag ) | |
|   dual_tree_implicit_qt_split ( xCtb, yCtb, CtbSizeY, 0) | |
| else | |
|   coding_tree( xCtb, yCtb, CtbSizeY, CtbSiteY, 1, 1, 0, 0, 0, 0, 0, | |
|         SINGLE_TREE, MODE_TYPE_ALL ) | |
| } | |

The following table shows exemplary semantics of syntax elements included in the table.

TABLE 28 ccalf_ctb_flag[ chromaIdx ] [ xCtb >> CtbLog2SizeY ] [ yCtb >> CtbLog2SizeY ] equal to 1 specifies that the cross component adaptive loop filter is applied to the coding tree block of the chroma component indicated by chromaIdx, equal to 0 for Cb and equal 1 for Cr, of the coding tree unit at luma location ( xCtb, yCtb ).
ccalf_ctb_flag[ cIdx ] [ xCtb >> CtbLog2SizeY ] [ yCtb >> CtbLog2SizeY ] equal to 0 specifies that the adaptive loop filter is not applied to the coding tree block of the chrorna component indicated by chromaIdx of the coding tree unit at luma location ( xCtb, yCtb ).
When ccalf_ctb_flag[ cIdx ] [ xCtb >> CtbLog2SizeY ] [ yCtb >> CtbLog2SizeY ] is not present, it is inferred to be equal to 0.
ccalf_ctb_filter_alt_idx[ chromaIdx ] [ xCtb >> CtbLog2SizeY ] [ yCtb >> CtbLog2SizeY ] specifies the index of the alternative cross component adaptive loop filter applied to the coding tree block of the chroma component, with chromaIdx equal to 0 for Cb and chromaIdx equal 1 for Cr, of the coding tree unit at luma location ( xCtb, yCtb ). When ccalf_ctb_filter_alt_idxf chromaIdx ] [ xCtb >> CtbLog2SizeY ] [ yCtb >> CtbLog2SizeY ] is not present, it is infered to be equal to zero.

In an example, the image information may include the information on the coding tree unit (coding_tree_unit( )). The information on the coding tree unit may include the information (ccalf_ctb_flag[0]) on whether the cross-component filter is applied to the current block of the Cb color component, and/or the information (ccalf_ctb_flag[1]) on whether the cross-component filter is applied to the current block of the Cr color component. In addition, the information on the coding tree unit may include the information (ccalf_ctb_filter_alt_idx[0]) on the filter set index of the cross-component filter applied to the current block of the Cb color component, and/or the information (ccalf_ctb_filter_alt_idx[1]) on the filter set index of the cross-component filter applied to the current block of the Cr color component.

Figure 14:
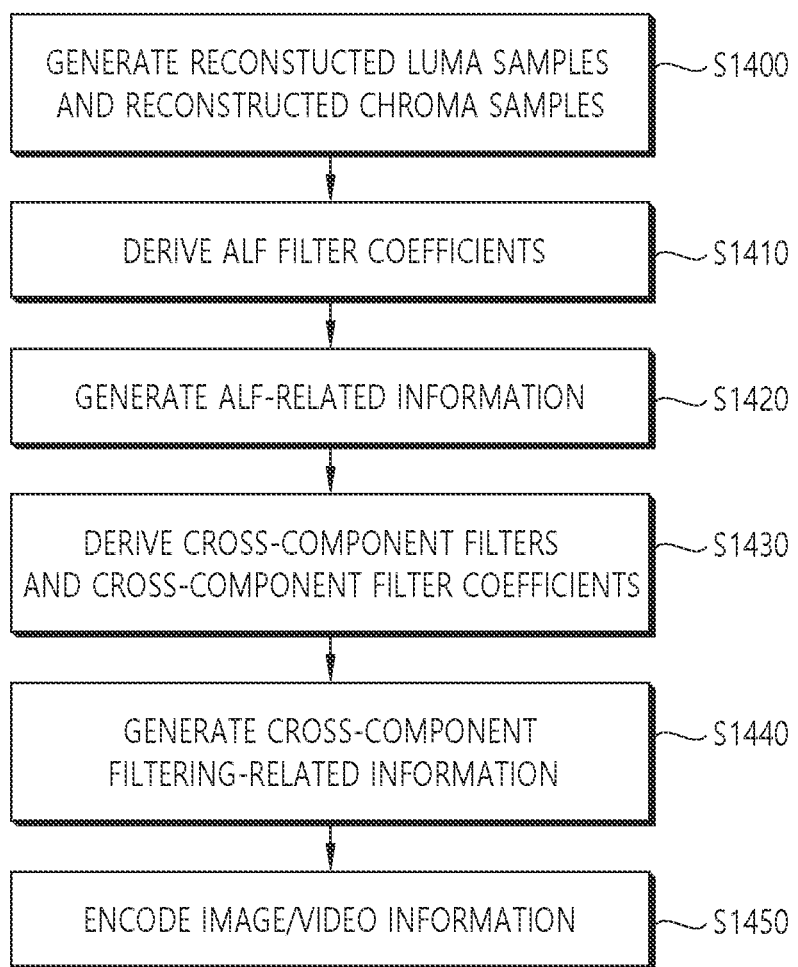
FIGS. 14 and 15 are diagrams schematically illustrating an example of a video/image encoding method and related components according to embodiment(s) of the present disclosure.
Figure 15:
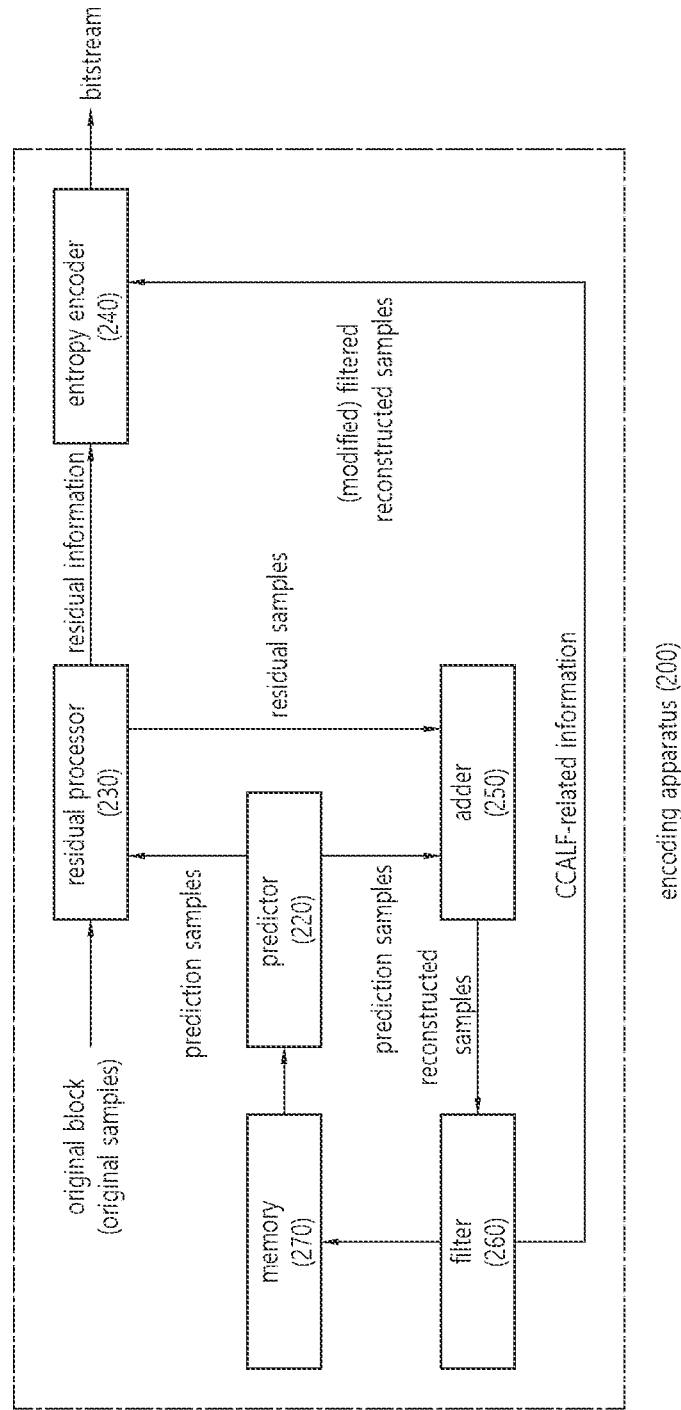

FIGS. 14 and 15 are diagrams schematically illustrating an example of a video/image encoding method and related components according to embodiment(s) of the present disclosure. The method disclosed in FIG. 14 may be performed by the encoding apparatus disclosed in FIG. 2. Specifically, for example, S1400 of FIG. 14 may be performed by the adder 250 of the encoding apparatus, S1410 to S1440 may be performed by the filtering unit 260 of the encoding apparatus, and S1450 may be performed by the entropy encoding unit 240 of the encoding apparatus. The method disclosed in FIG. 14 may include the embodiments described above in the present disclosure.

Referring to FIG. 14, the encoding apparatus may generate reconstructed luma samples and reconstructed chroma samples of the current block (S1400). The encoding apparatus may generate the residual luma samples and/or the residual chroma samples. The encoding apparatus may generate the reconstructed luma samples based on the residual luma samples and may generate the reconstructed chroma samples based on the residual chroma samples.

In an example, the residual samples for the current block may be generated based on the original samples and the prediction samples of the current block. Specifically, the encoding apparatus may generate the prediction samples of the current block based on the prediction mode. In this case, various prediction methods disclosed in the present disclosure, such as the inter prediction or the intra prediction, may be applied. The residual samples may be generated based on the prediction samples and the original samples.

In one example, the encoding apparatus may generate the residual luma samples. The residual luma samples may be generated based on the original luma samples and the predicted luma samples. In one example, the encoding apparatus may generate the residual chroma samples. The residual chroma samples may be generated based on the original chroma samples and the predicted chroma samples.

The encoding apparatus may derive the transform coefficients. The encoding apparatus may derive the transform coefficients based on the transform process for the residual samples. The encoding apparatus may derive the transform coefficients (luma transform coefficients) for the residual luma samples and/or the transform coefficients (chroma transform coefficients) for the residual chroma samples. For example, the transform process may include at least one of DCT, DST, GBT, or CNT.

The encoding apparatus may derive the (quantized) transform coefficients. The encoding apparatus may derive the quantized transform coefficients based on the quantization process for the transform coefficients. The quantized transform coefficients may have a one-dimensional vector form based on a coefficient scan order. The quantized transform coefficients may include the quantized luma transform coefficients and/or the quantized chroma transform coefficients.

The encoding apparatus may generate the residual information. The encoding apparatus may generate the residual information indicating (including) the quantized transform coefficients. The residual information may be generated through various encoding methods such as exponential Golomb, CAVLC, and CABAC.

The encoding apparatus may generate prediction-related information. The encoding apparatus may generate the prediction-related information based on the prediction samples and/or a mode applied to the prediction samples. The prediction-related information may include information on various prediction modes (e.g., merge mode, MVP mode, etc.), MVD information, and the like.

The encoding apparatus may derive the ALF filter coefficients for the ALF process (S1410). The ALF filter coefficients may include the ALF luma filter coefficients for the reconstructed luma samples and the ALF chroma filter coefficients for the reconstructed chroma samples. The filtered reconstructed luma samples and/or the filtered reconstructed chroma samples may be generated based on the ALF filter coefficients.

The encoding apparatus may generate ALF-related information (S1420). The encoding apparatus may generate the ALF-related information based on the ALF filter coefficients. The encoding apparatus derives an ALF-related parameter, which may be applied for filtering on the reconstructed samples, and generates the ALF-related information. For example, the ALF-related information may include the ALF-related information described above in the present disclosure.

The encoding apparatus may derive cross-component filters (CCALF filter) and/or cross-component filter coefficients (CCALF filter coefficients) (S1430). The cross-component filters and/or cross-component filter coefficients may be used in the CCALF process. The modified filtered reconstructed chroma samples may be generated based on the cross-component filters and/or the cross-component filter coefficients.

The encoding apparatus may generate the cross-component filtering-related information (or CCALF-related information) (S1440). In an example, the cross-component filtering-related information may include information on the number of cross-component filters and information on the cross-component filter coefficients. The cross-component filters may include cross-component filters for the Cb color component and cross-component filters for the Cr color component.

In an example, the cross-component filtering-related information may include a CCALF enable flag, a flag related to whether a CCALF is enabled for the Cb (or Cr) color component, a Cb (or Cr) filter signal flag related to whether cross-component filters for the Cb (or Cr) color component are signaled, information on the number of cross-component filters for the Cb (or Cr) color component, information on the values of the cross-component filter coefficients for the Cb (or Cr) color component, information on the absolute values of the cross-component filter coefficients for the Cb (or Cr) color component, information on the signs of the cross-component filter coefficients for the Cb (or Cr) color component, and/or information on whether the cross-component filter is applied to the current block of the Cb (or Cr) color component in the information about the coding tree unit (coding tree unit syntax).

The encoding apparatus may encode video/image information (S1450). The image information may include the residual information and/or the ALF-related information. The encoded video/image information may be output in the form of the bitstream. The bitstream may be transmitted to the decoding apparatus through a network or a storage medium.

The image/video information may include various information according to the embodiment of the present disclosure. For example, the image/video information may include information disclosed in at least one of Tables 1 to 28 described above.

In an embodiment, the image information may include a first adaptation parameter set (APS) including first ALF data and a second APS including second ALF data. The first ALF data may include information on the number of cross-component filters for the Cb color component. The second ALF data may include information on the number of cross-component filters for the Cr color component.

In an embodiment, the image information may include header information and an adaptation parameter set (APS). The header information may be slice header information. The slice header information may include information related to an identifier of an APS including ALF data. For example, the cross-component filter coefficients may be derived based on the ALF data.

In an embodiment, the image information may include a sequence parameter set (SPS). The SPS may include the CCALF enable flag related to whether the cross-component filtering is enabled. For example, based on the CC-ALF enable flag, ID information of adaptation parameter sets (APSs) including the ALF data used for the derivation of the cross-component filter coefficients for the CC-ALF may be derived.

In an embodiment, the image information may include general constraint information. For example, the general constraint information may include a CCALF constraint flag for constraining the cross-component filtering based on the value of the CCALF enable flag included in the SPS. When the value of the CCALF constraint flag is 0, the CCALF constraint may not be applied. The CCALF constraint flag having a value of 1 may indicate that the value of the CCALF enable flag included in the SPS is 0.

In an embodiment, the slice header information may include a first flag related to whether the CCALF is enabled for the Cb color component of the filtered reconstructed chroma samples, and a second flag related to whether the CCALF is enabled for the Cr color component of the filtered reconstructed chroma samples.

In an embodiment, the image information may include the adaptation parameter sets (APSs). In an example, based on the determination that the value of the first flag is 1, the slice header information may include ID information of a first APS including first ALF data used for the derivation of the cross-component filter coefficients for the Cb color component. In an example, based on the determination that the value of the first flag is 1, the slice header information may include ID information of a second APS including second ALF data used for the derivation of the cross-component filter coefficients for the Cr color component.

In an embodiment, the first ALF data may include a Cb filter signal flag related to whether the cross-component filters for the Cb color component are signaled. Based on the Cb filter signal flag, the first ALF data may include information related to the number of cross-component filters for the Cb color component. Based on the information related to the number of cross-component filters for the Cb color component, the first ALF data may include the information on the absolute values of the cross-component filter coefficients for the Cb color component and the information on the signs of the cross-component filter coefficients for the Cb color component. Based on the information on the absolute values of the cross-component filter coefficients for the Cb color component and the information on the signs of the cross-component filter coefficients for the Cb color component, the cross-component filter coefficients for the Cb color component may be derived.

In an embodiment, the information related to the number of cross-component filters for the Cb color component may be zero-order exponential Golomb ($0^{th}$ EG) coded.

In an embodiment, the second ALF data may include a Cr filter signal flag related to whether the cross-component filters for the Cr color component are signaled. Based on the Cr filter signal flag, the second ALF data may include information related to the number of cross-component filters for the Cr color component. Based on the information related to the number of cross-component filters for the Cr color component, the second ALF data may include the information on the absolute values of the cross-component filter coefficients for the Cr color component and the information on the signs of the cross-component filter coefficients for the Cr color component. Based on the information on the absolute values of the cross-component filter coefficients for the Cr color component and the information on the signs of the cross-component filter coefficients for the Cr color component, the cross-component filter coefficients for the Cr color component may be derived.

In an embodiment, the information related to the number of cross-component filters for the Cr color component may be zero-order exponential Golomb ($0^{th}$ EG) coded.

In an embodiment, the image information may include the information on the coding tree unit. The information on the coding tree unit may include the information on whether the cross-component filter is applied to the current block of the Cb color component and/or the information related to whether the cross-component filter is applied to the current block of the Cr color component.

In an embodiment, the information on the coding tree unit may include information on a filter set index of the cross-component filter applied to the current block of the Cb color component, and/or the information on the filter set index of the cross-component filter applied to the current block of the Cr color component.

Figure 16:
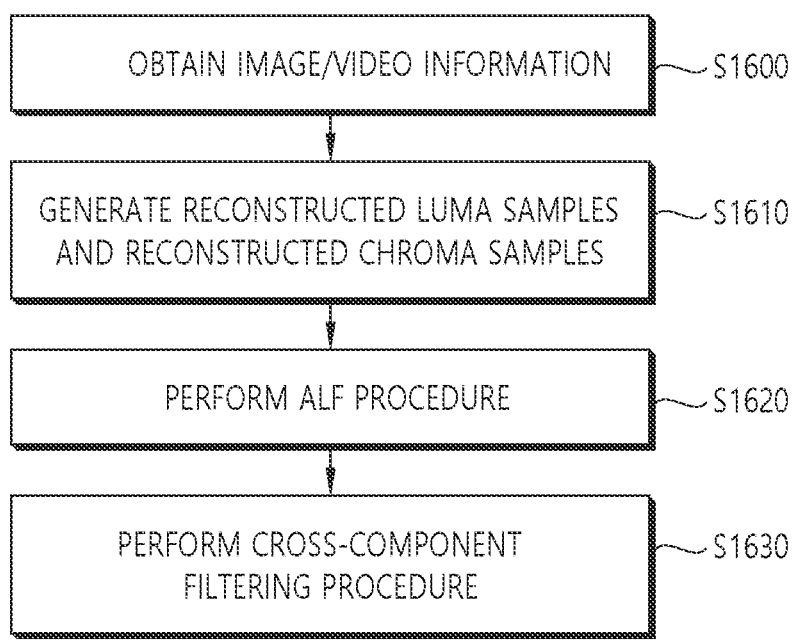
FIGS. 16 and 17 are diagrams schematically illustrating an example of an image/video decoding method and related components according to embodiment(s) of the present disclosure.
Figure 17:
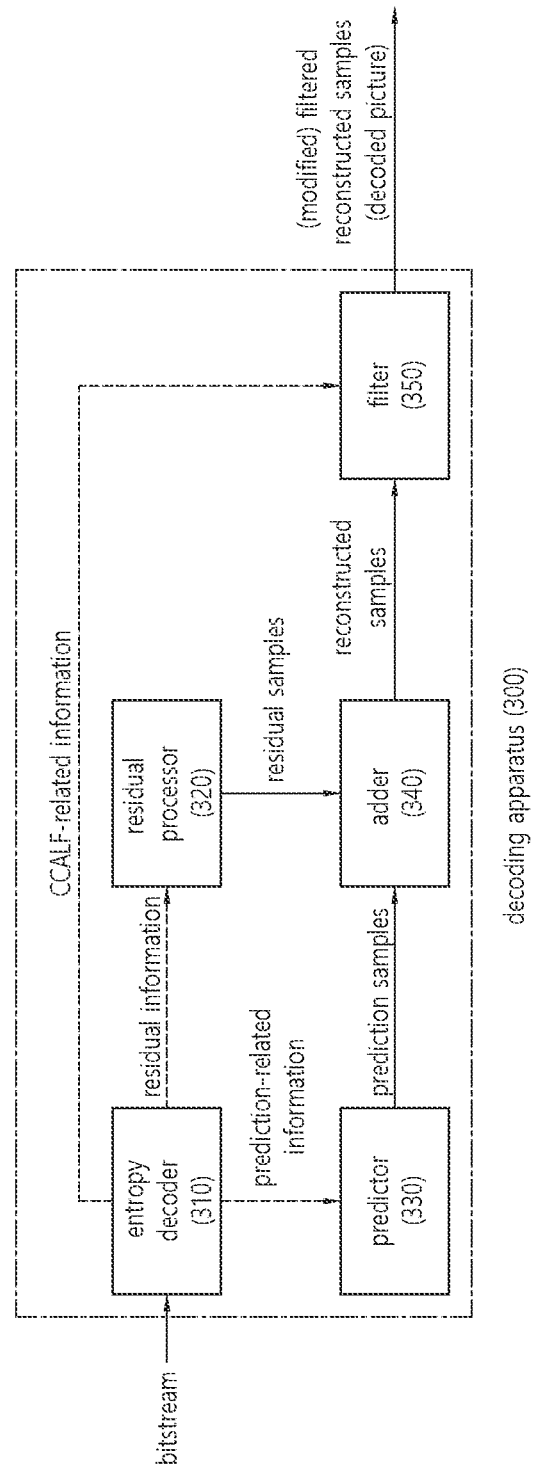

FIGS. 16 and 17 are diagrams schematically illustrating an example of a video/image decoding method and related components according to embodiment(s) of the present disclosure. The method disclosed in FIG. 16 may be performed by the decoding apparatus illustrated in FIG. 3 or 17. Specifically, for example, S1600 of FIG. 16 may be performed by the entropy decoder 310 of the decoding apparatus, S1610 may be performed by the adder 340 of the encoding apparatus, and S1620 and S1630 may be performed by the filter 350 of the encoding apparatus.

Referring to FIG. 16, the decoding apparatus may receive/obtain the video/image information (S1600). The video/image information may include the prediction-related information and/or the residual information. The decoding apparatus may receive/obtain the image/video information through the bitstream. The residual information may be generated through various encoding methods such as exponential Golomb, CAVLC, and CABAC. In an example, the video/image information may further include the CCAL-related information. For example, the CCALF-related information may include a CCALF enable flag, a flag related to whether the CCALF is enabled for the Cb (or Cr) color component, a Cb (or Cr) filter signal flag related to whether the cross-component filters for the Cb (or Cr) color component are signaled, information related to the number of cross-component filters for the Cb (or Cr) color component, information on the absolute values of the cross-component filter coefficients for the Cb (or Cr) color component, information on the signs of the cross-component filter coefficients for the Cb (or Cr) color component, and/or information on whether the cross-component filter is applied to the current block of the Cb (or Cr) color component in the information (coding tree unit syntax) on the coding tree unit.

The image/video information may include various information according to the embodiment of the present disclosure. For example, the image/video information may include information disclosed in at least one of Tables 1 to 28 described above.

The decoding apparatus may derive the transform coefficients. Specifically, the decoding apparatus may derive the quantized transform coefficients based on the residual information. The quantized transform coefficients may have a one-dimensional vector form based on a coefficient scan order. The decoding apparatus may derive the transform coefficients based on the dequantization process for the quantized transform coefficients.

The decoding apparatus may derive the residual samples. The decoding apparatus may derive the residual samples based on the transform coefficients. In addition, the residual samples for the current block may be derived based on the original samples and the prediction samples of the current block.

The decoding apparatus may perform prediction based on the image/video information and derive the prediction samples of the current block. The decoding apparatus may derive the prediction samples of the current block based on the prediction mode information. The decoding apparatus may determine whether the inter prediction or intra prediction is applied to the current block based on the prediction mode information, and may perform prediction based thereon.

The decoding apparatus may generate/derive the reconstructed luma samples and/or the reconstructed chroma samples (S1610). The decoding apparatus may generate/derive the reconstructed luma samples and/or the reconstructed chroma samples based on the image information. The decoding apparatus may generate the reconstructed luma (or chroma) samples from the above-described image information-based residual samples. The luma component of the reconstructed samples may correspond to the reconstructed luma samples, and the chroma component of the reconstructed samples may correspond to the reconstructed chroma samples.

The decoding apparatus may perform the adaptive loop filtering (ALF) process on the reconstructed chroma samples to generate the filtered reconstructed chroma samples (S1620). In the ALF process, the decoding apparatus may derive the ALF filter coefficients for the ALF process of the reconstructed chroma samples. In addition, the decoding apparatus may derive the ALF filter coefficients for the ALF process of the reconstructed chroma samples. The ALF filter coefficients may be derived based on the ALF parameters included in the ALF data in the APS.

The decoding apparatus may generate the filtered reconstructed chroma samples. The decoding apparatus may generate the filtered reconstructed samples based on the reconstructed chroma samples and the ALF filter coefficients.

The decoding apparatus may perform the cross-component filtering process on the filtered reconstructed chroma samples to generate the modified filtered reconstructed chroma samples (S1630). In the cross-component filtering process, the decoding apparatus may derive the cross-component filter coefficients for the cross-component filtering. The cross-component filter coefficients may be derived based on the CCALF-related information in the ALF data included in the above-described APS, and the identifier (ID) information of the corresponding APS may be included in (may be signaled through) the slice header.

The decoding apparatus may generate the modified filtered reconstructed chroma samples. The decoding apparatus may generate the modified filtered reconstructed chroma samples based on the reconstructed luma samples, the filtered reconstructed chroma samples, and the cross-component filter coefficients. In an example, the decoding apparatus may derive a difference between two of the reconstructed luma samples, and multiply the difference by a filter coefficient of one of the cross-component filter coefficients. Based on the result of the multiplication and the filtered reconstructed chroma samples, the decoding apparatus may generate the modified filtered reconstructed chroma samples. For example, the decoding apparatus may generate the modified filtered reconstructed chroma samples based on a sum between the multiplication and one of the filtered reconstructed chroma samples.

In an embodiment, the image information may include the adaptation parameter set (APS) including the ALF data including the information on the cross-component filtering. The ALF data may include information on the number of cross-component filters for the cross-component filtering and information on the cross-component filter coefficients. The modified filtered reconstructed chroma samples may be generated based on the filtered reconstructed chroma samples and the cross-component filter coefficients.

In an embodiment, the cross-component filters may include cross-component filters for the Cb color component and cross-component filters for the Cr color component. The image information may include a first adaptation parameter set (APS) including first ALF data and a second APS including second ALF data. The first ALF data may include information on the number of cross-component filters for the Cb color component. The second ALF data may include information on the number of cross-component filters for the Cr color component.

In an embodiment, the image information may include the header information and the adaptation parameter set (APS). The header information may be slice header information. The slice header information may include information related to an identifier of an APS including ALF data. For example, the cross-component filter coefficients may be derived based on the ALF data.

In an embodiment, the image information may include a sequence parameter set (SPS). The SPS may include a cross-component adaptive loop filter (CCALF) enable flag related to whether the cross-component filtering is enabled. For example, based on the CC-ALF enable flag, ID information of adaptation parameter sets (APSs) including the ALF data used for the derivation of the cross-component filter coefficients for the CC-ALF may be derived.

In an embodiment, the image information may include general constraint information. For example, the general constraint information may include a CCALF constraint flag for constraining the cross-component filtering based on the value of the CCALF enable flag included in the SPS. When the value of the CCALF constraint flag is 0, the CCALF constraint may not be applied. The CCALF constraint flag having a value of 1 may indicate that the value of the CCALF enable flag included in the SPS is 0.

In an embodiment, the slice header information may include a first flag related to whether the CCALF is enabled for the Cb color component of the filtered reconstructed chroma samples, and a second flag related to whether the CCALF is enabled for the Cr color component of the filtered reconstructed chroma samples.

In an embodiment, the image information may include the adaptation parameter sets (APSs). In an example, based on the determination that the value of the first flag is 1, the slice header information may include ID information of a first APS including first ALF data used for the derivation of the cross-component filter coefficients for the Cb color component. In an example, based on the determination that the value of the first flag is 1, the slice header information may include ID information of a second APS including second ALF data used for the derivation of the cross-component filter coefficients for the Cr color component.

In an embodiment, the first ALF data may include a Cb filter signal flag related to whether the cross-component filters for the Cb color component are signaled. Based on the Cb filter signal flag, the first ALF data may include information related to the number of cross-component filters for the Cb color component. Based on the information related to the number of cross-component filters for the Cb color component, the first ALF data may include the information on the absolute values of the cross-component filter coefficients for the Cb color component and the information on the signs of the cross-component filter coefficients for the Cb color component. Based on the information on the absolute values of the cross-component filter coefficients for the Cb color component and the information on the signs of the cross-component filter coefficients for the Cb color component, the cross-component filter coefficients for the Cb color component may be derived.

In an embodiment, the information related to the number of cross-component filters for the Cb color component may be zero-order exponential Golomb ($0^{th}$ EG) coded.

In an embodiment, the second ALF data may include a Cr filter signal flag related to whether the cross-component filters for the Cr color component are signaled. Based on the Cr filter signal flag, the second ALF data may include information related to the number of cross-component filters for the Cr color component. Based on the information related to the number of cross-component filters for the Cr color component, the second ALF data may include the information on the absolute values of the cross-component filter coefficients for the Cr color component and the information on the signs of the cross-component filter coefficients for the Cr color component. Based on the information on the absolute values of the cross-component filter coefficients for the Cr color component and the information on the signs of the cross-component filter coefficients for the Cr color component, the cross-component filter coefficients for the Cr color component may be derived.

In an embodiment, the information related to the number of cross-component filters for the Cr color component may be zero-order exponential Golomb ($0^{th}$ EG) coded.

In an embodiment, the image information may include the information on the coding tree unit. The information on the coding tree unit may include the information on whether the cross-component filter is applied to the current block of the Cb color component and/or the information related to whether the cross-component filter is applied to the current block of the Cr color component.

In an embodiment, the information on the coding tree unit may include information on a filter set index of the cross-component filter applied to the current block of the Cb color component, and/or the information on the filter set index of the cross-component filter applied to the current block of the Cr color component.

When the residual sample for the current block exists, the decoding apparatus may receive the information on the residual for the current block. The information on the residual may include the transform coefficients on the residual samples. The decoding apparatus may derive the residual samples (or residual sample array) for the current block based on the residual information. Specifically, the decoding apparatus may derive the quantized transform coefficients based on the residual information. The quantized transform coefficients may have a one-dimensional vector form based on a coefficient scan order. The decoding apparatus may derive the transform coefficients based on the dequantization process for the quantized transform coefficients. The decoding apparatus may derive the residual samples based on the transform coefficients.

The decoding apparatus may generate a reconstructed samples based on the (intra) prediction samples and residual samples, and may derive the reconstructed block or the reconstructed picture based on the reconstructed samples. Specifically, the decoding apparatus may generate reconstructed samples based on a sum between the (intra) prediction samples and the residual samples. Thereafter, as described above, the decoding apparatus may apply an in-loop filtering process such as deblocking filtering and/or SAO process to the reconstructed picture in order to improve the subjective/objective picture quality, if necessary.

For example, the decoding apparatus may obtain image information including all or parts of the above-described pieces of information (or syntax elements) by decoding the bitstream or the encoded information. Further, the bitstream or the encoded information may be stored in a computer readable storage medium, and may cause the above-described decoding method to be performed.

Although methods have been described on the basis of a flowchart in which steps or blocks are listed in sequence in the above-described embodiments, the steps of the present document are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present disclosure.

The aforementioned method according to the present disclosure may be in the form of software, and the encoding apparatus and/or decoding apparatus according to the present disclosure may be included in a device for performing image processing, for example, a TV, a computer, a smart phone, a set-top box, a display device, or the like.

When the embodiments of the present disclosure are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present disclosure may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

In addition, the decoding apparatus and the encoding apparatus to which the embodiment(s) of the present document is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, a camcorder, a video on demand (VoD) service provider, an Over The Top (OTT) video device, an internet streaming service provider, a 3D video device, a Virtual Reality (VR) device, an Augment Reality (AR) device, an image telephone video device, a vehicle terminal (for example, a vehicle (including an autonomous vehicle) terminal, an airplane terminal, or a ship terminal), and a medical video device; and may be used to process an image signal or data. For example, the OTT video device may include a game console, a Bluray player, an Internet-connected TV, a home theater system, a smartphone, a tablet PC, and a Digital Video Recorder (DVR).

In addition, the processing method to which the embodiment(s) of the present document is applied may be produced in the form of a program executed by a computer and may be stored in a computer-readable recording medium. Multimedia data having a data structure according to the embodiment(s) of the present document may also be stored in the computer-readable recording medium. The computer readable recording medium includes all kinds of storage devices and distributed storage devices in which computer readable data is stored. The computer-readable recording medium may include, for example, a Bluray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (for example, transmission over the Internet). In addition, a bitstream generated by the encoding method may be stored in the computer-readable recording medium or transmitted through a wired or wireless communication network.

In addition, the embodiment(s) of the present document may be embodied as a computer program product based on a program code, and the program code may be executed on a computer according to the embodiment(s) of the present document. The program code may be stored on a computer-readable carrier.

Figure 18:
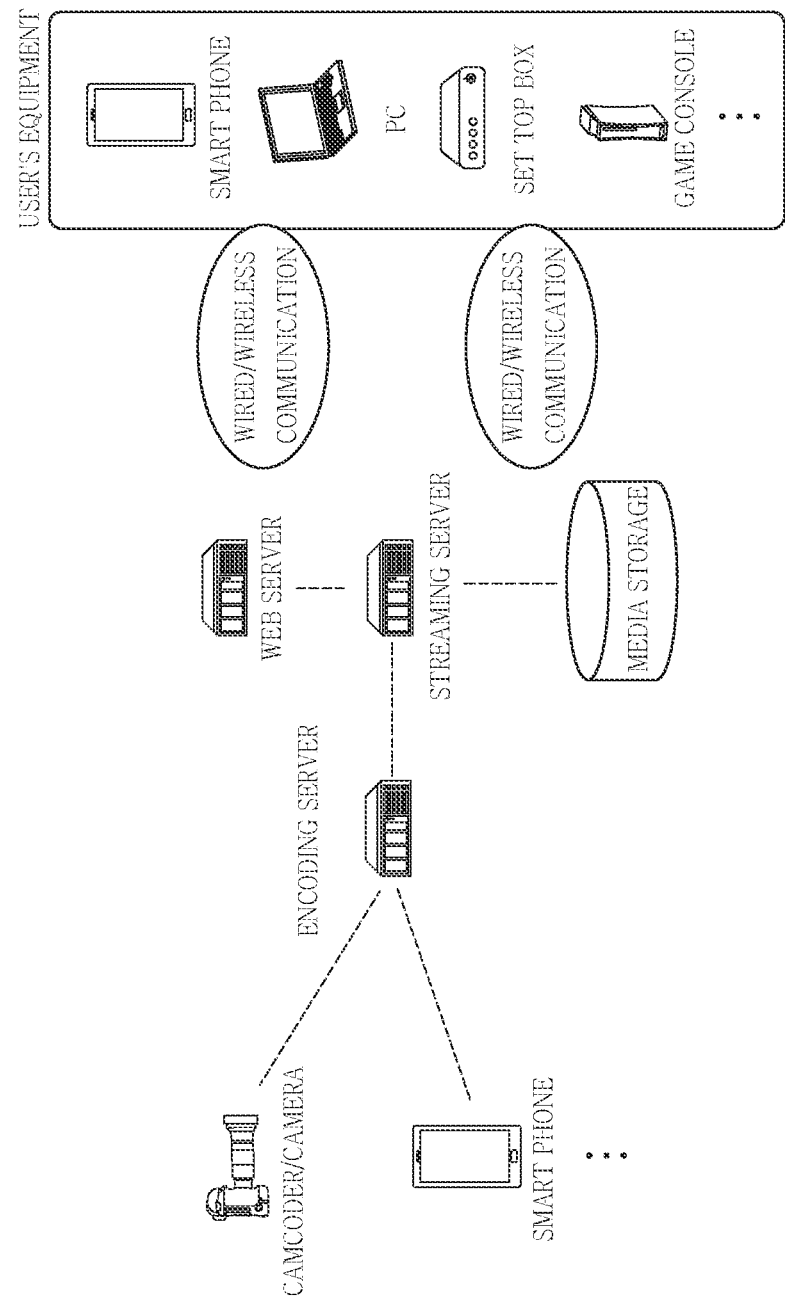
FIG. 18 is a diagram illustrating an example of a content streaming system to which embodiments disclosed in the present disclosure may be applied.

FIG. 18 represents an example of a contents streaming system to which the embodiment of the present document may be applied.

Referring to FIG. 18, the content streaming system to which the embodiments of the present document is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

Claims in the present description can be combined in a various way. For example, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. An image decoding method performed by a decoding apparatus, the image decoding method comprising:
  receiving image information through a bitstream;
  generating reconstructed luma samples and reconstructed chroma samples based on the image information;
  performing an adaptive loop filtering (ALF) process on the reconstructed chroma samples to generate filtered reconstructed chroma samples; and
  performing a cross-component filtering process on the filtered reconstructed chroma samples to generate modified filtered reconstructed chroma samples,
  wherein the image information includes an adaptation parameter set (APS) including ALF data including information on cross-component filtering,
  wherein the ALF data includes information on the number of cross-component filters for cross-component filtering and information on the cross-component filter coefficients, and wherein the modified filtered reconstructed chroma samples are generated based on the filtered reconstructed chroma samples and the cross-component filter coefficients.

2. The image decoding method of claim 1, wherein:
the cross-component filters include cross-component filters for a Cb color component and cross-component filters for a Cr color component,
the image information includes a first APS including first ALF data and a second APS including second ALF data,
the first ALF data includes information on the number of cross-component filters for the Cb color component, and
the second ALF data includes information on the number of cross-component filters for the Cr color component.

3. The image decoding method of claim 2, wherein:
based on the information on the number of cross-component filters for the Cb color component, the first ALF data includes information on absolute values of the cross-component filter coefficients for the Cb color component and information on signs of the cross-component filter coefficients for the Cb color component, and
based on the information on the absolute values of the cross-component filter coefficients for the Cb color component and the information on the signs of the cross-component filter coefficients for the Cb color component, the cross-component filter coefficients for the Cb color component are derived.

4. The image decoding method of claim 1, wherein:
the image information includes information on a coding tree unit, and
the information on the coding tree unit includes:
information on whether a cross-component filter is applied to the current block of a Cb color component; and
information on whether a cross-component filter is applied to the current block of a Cr color component.

5. The image decoding method of claim 1, wherein:
the image information includes information on a coding tree unit, and
the information on the coding tree unit includes:
information on a filter set index of a cross-component filter that is applied to the current block of a Cb color component; and
information on a filter set index of a cross-component filter that is applied to the current block of a Cr color component.

6. The image decoding method of claim 1, wherein:
the image information includes a sequence parameter set (SPS), and
the SPS includes a cross-component adaptive loop filter (CCALF) enable flag related to whether the cross-component filtering is enabled.

7. The image decoding method of claim 6, wherein:
the image information includes general constraint information, and
the general constraint information includes a CCALF constraint flag for constraining the cross-component filtering based on the value of the CCALF enable flag.

8. The image decoding method of claim 6, wherein:
based on the determination that the CCALF enable flag is 1, the ID information of the APS is derived.

9. An image encoding method performed by an encoding apparatus, the image encoding method comprising:
generating reconstructed luma samples and reconstructed chroma samples of a current block in a current picture;
deriving ALF filter coefficients for an adaptive loop filtering (ALF) process;
generating ALF-related information based on the ALF filter coefficients;
deriving cross-component filters and cross-component filter coefficients for a cross-component filtering process;
generating cross-component filtering-related information based on the cross-component filters and the cross-component filter coefficients; and
encoding image information including information for generating the reconstructed samples, the ALF-related information, and the cross-component filtering-related information,
wherein the cross-component filtering-related information includes information on the number of cross-component filters and information on cross-component filter coefficients.

10. The image encoding method of claim 9, wherein:
the cross-component filters include cross-component filters for a Cb color component and cross-component filters for a Cr color component,
the image information includes a first adaptation parameter set (APS) including first ALF data and a second APS including second ALF data,
the first ALF data includes information on the number of cross-component filters for the Cb color component, and
the second ALF data includes information on the number of cross-component filters for the Cr color component.

11. The image encoding method of claim 9, wherein:
the image information includes information on a coding tree unit, and
the information on the coding tree unit includes:
information on whether a cross-component filter is applied to the current block of a Cb color component; and
information on whether a cross-component filter is applied to the current block of a Cr color component.

12. The image encoding method of claim 9, wherein:
the image information includes information on a coding tree unit, and
the information on the coding tree unit includes:
information on a filter set index of a cross-component filter that is applied to the current block of a Cb color component; and
information on a filter set index of a cross-component filter that is applied to the current block of a Cr color component.

13. The image encoding method of claim 9, wherein:
the image information includes a sequence parameter set (SPS), and
the SPS includes a cross-component adaptive loop filter (CCALF) enable flag related to whether the cross-component filtering is enabled.

14. The image encoding method of claim 13, wherein:
the image information includes general constraint information, and
the general constraint information includes a CCALF constraint flag for constraining the cross-component filtering based on the value of the CCALF enable flag.

15. The image encoding method of claim 13, wherein:
based on a determination that the CCALF enable flag is 1, ID information of adaptation parameter sets (APSs)

including ALF data used for deriving the cross-component filter coefficients is derived.

16. A non-transitory computer-readable storage medium storing a bitstream generated by an image encoding method, the method comprising:

generating reconstructed luma samples and reconstructed chroma samples of a current block in a current picture;

deriving ALF filter coefficients for an adaptive loop filtering (ALF) process;

generating ALF-related information based on the ALF filter coefficients;

deriving cross-component filters and cross-component filter coefficients for a cross-component filtering process;

generating cross-component filtering-related information based on the cross-component filters and the cross-component filter coefficients; and encoding image information to generate the bitstream, wherein the image information includes information for generating the reconstructed samples, the ALF-related information, and the cross-component filtering-related information, wherein the cross-component filtering-related information includes information on the number of cross-component filters and information on cross-component filter coefficients.

* * * * *